US012683913B2

(12) United States Patent
McLaughlin et al.

(10) Patent No.: US 12,683,913 B2
(45) Date of Patent: **\*Jul. 14, 2026**

(54) SYSTEMS AND METHODS FOR EXECUTING BIFURCATED DIGITAL SIGNING PROCESSES FOR COMPLEX COMMUNICATIONS ACROSS MULTIPLE COMPUTER NETWORKS USING SEPARATE REQUEST ADDRESSING

(71) Applicant: Citibank, N.A., New York, NY (US)

(72) Inventors: Anthony McLaughlin, New York, NY (US); Ryan Rugg, New York, NY (US); Sawyer Uzzell, New York, NY (US)

(73) Assignee: Citibank, N.A., New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/179,987

(22) Filed: Apr. 15, 2025

(65) Prior Publication Data

US 2026/0113285 A1     Apr. 23, 2026

Related U.S. Application Data

(63) Continuation-in-part of application No. 19/096,675, filed on Mar. 31, 2025, now Pat. No. 12,500,852, (Continued)

(51) Int. Cl.
*H04L 9/32*          (2006.01)
*H04L 41/16*        (2022.01)
(Continued)

(52) U.S. Cl.
CPC .............. *H04L 47/822* (2013.01); *H04L 9/32* (2013.01); *H04L 41/16* (2013.01); *H04L 47/781* (2013.01)

(58) Field of Classification Search
CPC ...... H04L 47/822; H04L 41/16; H04L 47/781
See application file for complete search history.

(56) References Cited

U.S. PATENT DOCUMENTS 11,770,263 B1 \*   9/2023   Singh ........................ H04L 9/50
                                                                713/168
2022/0318907 A1 \*  10/2022  Bleznak .............. G06Q 20/065
(Continued)

*Primary Examiner* — Aftab N. Khan
(74) *Attorney, Agent, or Firm* — Foley & Lardner LLP

(57) ABSTRACT

Systems and methods for executing multi-party validations for complex communications across multiple computer networks using bifurcated digital signing processes. For example, the system may receive a first request, at a bifurcated digital signing process, to perform a first multi-party validation action, wherein the first request has a first processing characteristic. The system may, in response to receiving the first request, process the first request with a first signing routine of the bifurcated digital signing process. The system may determine, based on the first signing routine, whether the first processing characteristic corresponds to a predetermined processing characteristic. The system may, in response to determining that the first processing characteristic corresponds to the predetermined processing characteristic, process the first request with a second signing routine of the bifurcated digital signing process to perform the first multi-party validation action.

19 Claims, 13 Drawing Sheets

Related U.S. Application Data which is a continuation-in-part of application No. 19/069,109, filed on Mar. 3, 2025, which is a continuation of application No. 18/923,507, filed on Oct. 22, 2024, now Pat. No. 12,244,515, which is a continuation-in-part of application No. 18/434,687, filed on Feb. 6, 2024, now Pat. No. 12,126,546, application No. 19/179,987 is a continuation-in-part of application No. 18/920,721, filed on Oct. 18, 2024, which is a continuation of application No. 18/434,687, filed on Feb. 6, 2024, now Pat. No. 12,126,546, application No. 19/179,987 is a continuation-in-part of application No. 18/596,273, filed on Mar. 5, 2024, now Pat. No. 12,346,905, which is a continuation of application No. 17/498,622, filed on Oct. 11, 2021, now Pat. No. 11,935,052, application No. 19/179,987 is a continuation-in-part of application No. 19/076,983, filed on Mar. 11, 2025, which is a continuation of application No. 18/648,156, filed on Apr. 26, 2024, now Pat. No. 12,277,109, which is a continuation of application No. 18/487,971, filed on Oct. 16, 2023, now Pat. No. 11,971,881, application No. 19/179,987 is a continuation-in-part of application No. 18/820,107, filed on Aug. 29, 2024, now Pat. No. 12,615,160, which is a continuation of application No. 18/465,942, filed on Sep. 12, 2023, now Pat. No. 12,113,914, which is a continuation of application No. 18/189,907, filed on Mar. 24, 2023, now Pat. No. 11,770,263, which is a continuation-in-part of application No. 18/062,090, filed on Dec. 6, 2022, now Pat. No. 11,658,833.

(60) Provisional application No. 63/781,319, filed on Mar. 31, 2025.

(51) Int. Cl.
  H04L 47/70           (2022.01)
  H04L 47/78           (2022.01)

(56)                    References Cited

U.S. PATENT DOCUMENTS

| | | | |
|---|---|---|---|
| 2023/0245111 A1* | 8/2023 | Everspaugh ....... | G06Q 20/3829 |
| | | | 705/64 |
| 2023/0421396 A1* | 12/2023 | Ocegueda ................. | H04L 9/50 |
| 2023/0421397 A1* | 12/2023 | Ocegueda ............. | H04L 9/0825 |
| 2023/0421540 A1* | 12/2023 | Ocegueda .............. | G06F 9/547 |
| 2024/0187256 A1* | 6/2024 | Singh .................... | H04L 9/3255 |

* cited by examiner

Figure 1B:
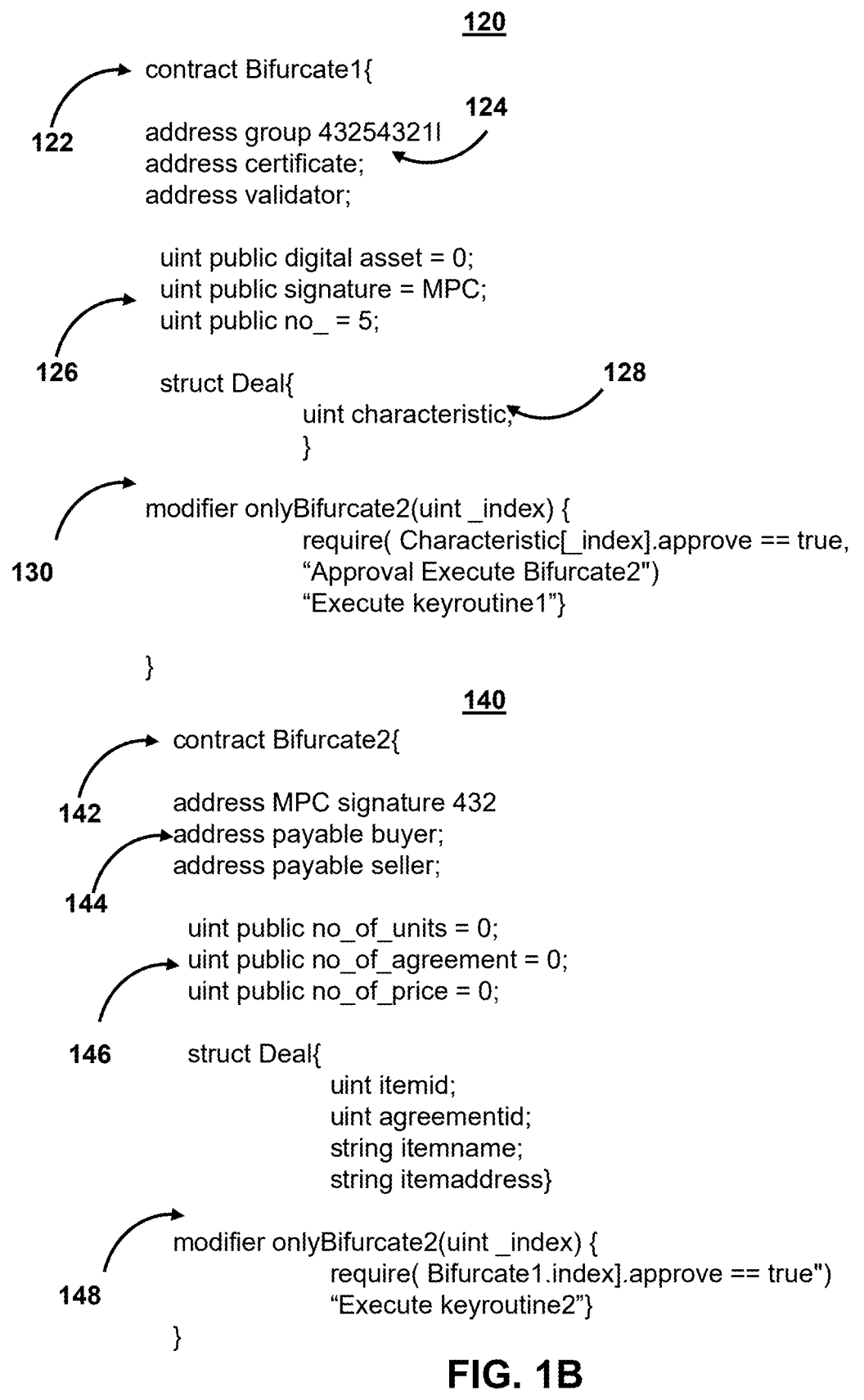

120

```
contract Bifurcate1{ address group 4325432ll
address certificate;
address validator;

uint public digital asset = 0;
uint public signature = MPC;
uint public no_ = 5;

struct Deal{
        uint characteristic;
        } modifier onlyBifurcate2(uint _index) {
        require( Characteristic[_index].approve == true,
        "Approval Execute Bifurcate2")
        "Execute keyroutine1"}

}
```

122

124

126

128

130

140

```
contract Bifurcate2{ address MPC signature 432
address payable buyer;
        address payable seller;

uint public no_of_units = 0;
    uint public no_of_agreement = 0;
    uint public no_of_price = 0;

struct Deal{
                uint itemid;
                uint agreementid;
                string itemname;
                string itemaddress} modifier onlyBifurcate2(uint _index) {
                require( Bifurcate1.index].approve == true")
                "Execute keyroutine2"}
        }
```

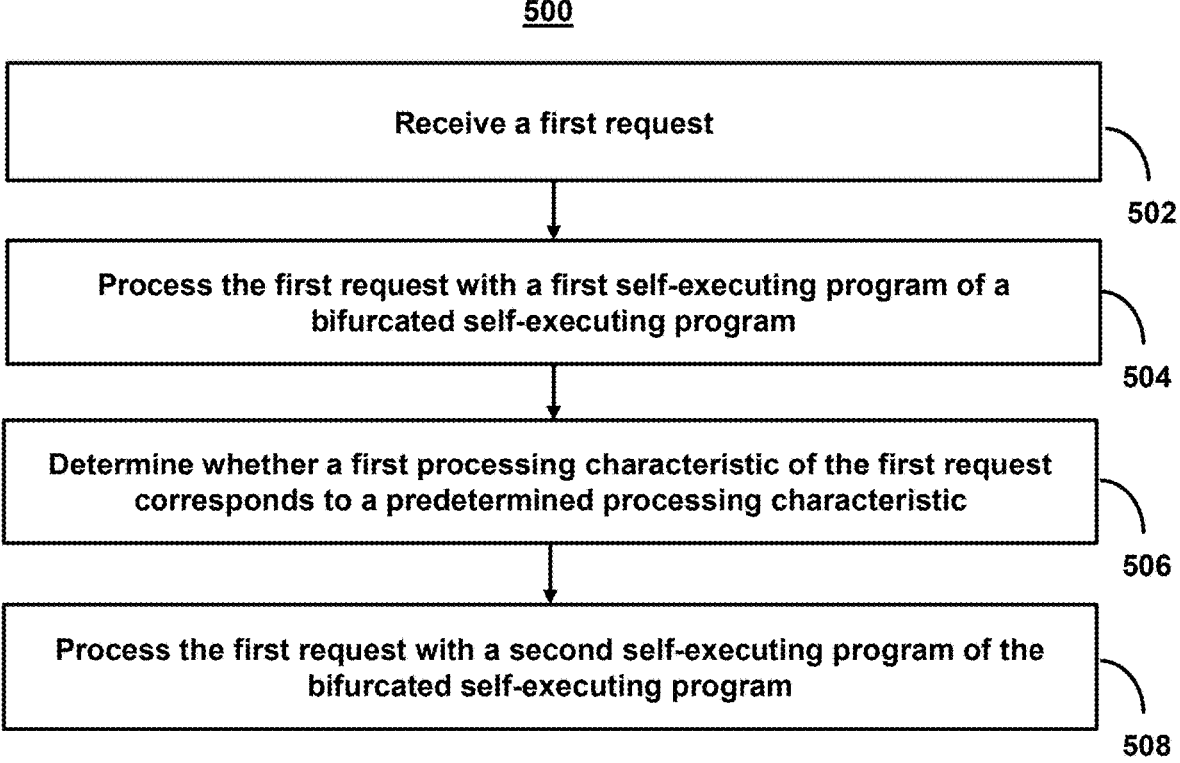

500

Receive a first request

502

Process the first request with a first self-executing program of a bifurcated self-executing program

504

Determine whether a first processing characteristic of the first request corresponds to a predetermined processing characteristic

506

Process the first request with a second self-executing program of the bifurcated self-executing program

Receive a first instruction comprising a transaction request from a first account

602

Freeze a source account

604

Receive a second instruction comprising a receive request from a second account

606

Match the first instruction to the second instruction

608

Complete the transaction request using the source account

Receive a request to perform a blockchain action using a resource

702

Determine a condition for performing the blockchain action

704

Receive a tokenized availability of the resource from a blockchain network

706

Determine whether to perform the blockchain action based on the tokenized availability

708

Execute the blockchain action

710

<u>800</u>

900

Receive a first Multi-Party Computation (MPC) signature component

902

Receive a second MPC signature component

904

Determine that the MPC signature components correspond to respective participant groups

906

Using the MPC signature components to generate a composite MPC signature

908

Complete a bifurcated digital signing process using the composite MPC signature

910

SYSTEMS AND METHODS FOR EXECUTING BIFURCATED DIGITAL SIGNING PROCESSES FOR COMPLEX COMMUNICATIONS ACROSS MULTIPLE COMPUTER NETWORKS USING SEPARATE REQUEST ADDRESSING

CROSS-REFERENCE TO RELATED APPLICATIONS

This application claims the benefit of priority of U.S. Provisional Application No. 63/781,319, filed Mar. 31, 2025. The content of the foregoing application is incorporated herein in its entirety by reference.

This application is also a continuation-in-part of U.S. patent application Ser. No. 19/096,675, filed Mar. 31, 2025, which is a continuation-in-part of U.S. patent application Ser. No. 19/069,109, filed Mar. 3, 2025, which is a continuation of U.S. patent application Ser. No. 18/923,507, filed Oct. 22, 2024, which is a continuation-in-part of U.S. patent application Ser. No. 18/434,687, filed Feb. 6, 2024. The content of the foregoing applications is incorporated herein in its entirety by reference.

This application is also a continuation-in-part of U.S. patent application Ser. No. 18/920,721, filed Oct. 18, 2024, which is a continuation of U.S. patent application Ser. No. 18/434,687, filed Feb. 6, 2024. The content of the foregoing applications is incorporated herein in its entirety by reference.

This application is also a continuation-in-part of U.S. patent application Ser. No. 18/596,273, filed Mar. 5, 2024, which is a continuation of U.S. patent application Ser. No. 17/498,622, filed Oct. 11, 2021. The content of the foregoing applications is incorporated herein in its entirety by reference.

This application is also a continuation-in-part of U.S. patent application Ser. No. 19/076,983, filed Mar. 11, 2025, which is a continuation of U.S. patent application Ser. No. 18/648,156, filed Apr. 26, 2024, which is a continuation of U.S. patent application Ser. No. 18/487,971, filed Oct. 16, 2023. The content of the foregoing applications is incorporated herein in its entirety by reference.

This application is also a continuation-in-part of U.S. patent application Ser. No. 18/820,107, filed Aug. 29, 2024, which is a continuation of U.S. patent application Ser. No. 18/465,942, filed Sep. 12, 2023, which is a continuation of U.S. patent application Ser. No. 18/189,907, filed Mar. 24, 2023, which is a continuation-in-part of U.S. patent application Ser. No. 18/062,090, filed Dec. 6, 2022. The content of the foregoing applications is incorporated herein in its entirety by reference.

This application is also related to U.S. patent application Ser. No. 18/295,055, filed Apr. 3, 2023, which is a continuation of U.S. patent application Ser. No. 18/062,090, filed Dec. 6, 2022. The content of the foregoing applications is incorporated herein in its entirety by reference.

This application is further related to International Patent Application No. PCT/US2023/082698, filed Dec. 6, 2023, which claims the benefit of priority of U.S. patent application Ser. No. 18/465,942, filed Sep. 12, 2023, U.S. patent application Ser. No. 18/295,055, filed Apr. 3, 2023, U.S. patent application Ser. No. 18/189,907, filed Mar. 24, 2023, and U.S. patent application Ser. No. 18/062,090, filed Dec. 6, 2022. The content of the foregoing applications is incorporated herein in its entirety by reference.

BACKGROUND

Modern computer systems have grown increasingly complex due to the expanding scope of their capabilities and the diverse requirements they are expected to meet. With the evolution of technology, computers are now tasked with handling vast amounts of data, supporting intricate software applications, and maintaining seamless connectivity across global networks, cloud computing resources, and one or more microservices. The rise of cloud computing, IoT (Internet of Things), and artificial intelligence adds additional layers, as systems must interact with distributed resources and incorporate intelligent processing. This interactivity often means that multiple components of the system must exchange communications to facilitate one or more actions. These communications must therefore be resilient against a growing landscape of cybersecurity threats. One avenue addressing these threats is to use digital signing procedures with exchanging communications.

For example, multi-signature (multisig) and multi-party computation (MPC) digital signing are both cryptographic techniques used to enhance security and control over digital assets, but they function differently. Multisig requires multiple distinct private keys to authorize a transaction, meaning that a predetermined number of signatures from different parties must be collected before execution. It is commonly used in cryptocurrency wallets and blockchain applications to reduce the risk of a single point of failure or fraud. On the other hand, MPC enables multiple parties to collectively compute a digital signature without revealing their individual private key shares. Unlike multisig, MPC does not require blockchain-native support, making it more flexible across different digital asset applications. It enhances privacy since no single entity has full control over a private key, reducing risks associated with key compromise.

Both multi-signature (multisig) and multi-party computation (MPC) digital signing have their drawbacks, which can impact their usability and security. Multisig relies on blockchain-native support, meaning that not all cryptocurrencies or platforms accommodate it, limiting its applicability. Additionally, changing or revoking signers in a multisig setup can be cumbersome, often requiring creating a new wallet and redistributing funds. This can lead to operational inefficiencies and added costs. Furthermore, because multisig transactions are recorded on-chain, they expose details such as the number of required signers, which can be a privacy concern. MPC, while more flexible and blockchain-agnostic, comes with higher computational complexity and requires secure communication between participants. This added complexity can introduce potential attack vectors, such as network-based threats or vulnerabilities in the cryptographic protocol itself. Setting up and maintaining an MPC-based system demands specialized knowledge, which can increase implementation costs and create barriers for adoption. Additionally, because MPC systems rely on distributed key shares, the loss or corruption of a participant's share without proper recovery mechanisms can result in losing access to assets.

SUMMARY

Systems and methods are described herein for novel uses and/or improvements to digital signing procedures for complex communications across multiple computer networks. For example, due to the logistical and computational challenges associated with coordinating multiple signers, both multisig and MPC digital signing are limited to small groups of users dedicated to approving a single transaction or communication in a single computer network. For example, in a multisig setup, each participant must have a distinct private key and manually approve transactions, which can become impractical as the number of signers grows, leading to delays and increased administrative overhead. Managing key distribution, signer roles, and policy enforcement also becomes more complex with larger groups, making it difficult to scale beyond a certain number of participants without compromising efficiency. Similarly, MPC requires secure coordination between multiple parties to jointly compute a digital signature without revealing individual key shares. As the number of participants increases, the cryptographic computations and network communication required for coordination become more complex, introducing latency and potential failure points. Ensuring that all participants are online, available, and able to securely contribute to the signing process can be prohibitory, especially in large-scale environments as the risk of a participant failing to respond or being compromised increases with the larger group.

To overcome these technical deficiencies in digital signing procedure for complex communications across multiple computer networks, the systems and methods introduce a novel hub-and-spoke digital signing procedure that integrates components of both multi-signature (multisig) and multi-party computation (MPC) to overcome the technical drawbacks that limit their applicability to small groups within a single network. In this "bifurcated digital signing process," each participant operates within a distinct "participant group" that includes a sub-participant known only to them, forming a local multisig validation layer. This local multisig ensures that each participant's decision-making is independently secured, leveraging private knowledge shared only between the participant and their sub-participant. Moreover, each participant is free to enforce its own local rules on the participant group. Once the individual multisig signatures within each participant group are used to complete a "multi-party validation action," they are validated collectively through a composite MPC process that spans all participant groups. This approach allows decentralized verification while preserving the security benefits of both multisig and MPC, as each participant group retains control over its private information while still contributing to the broader signing process.

The composite MPC then integrates these individual multi-party validation actions to finalize the transaction or communication, creating a system where each participant group contributes to the final signature without exposing sensitive data. The bifurcated digital signing process enhances security by ensuring that no single participant holds complete control over the signing process, reducing risks of insider threats and key compromises. Additionally, the final signed message or transaction can result in different outputs being issued to each participant group, meaning that each party may receive contextually relevant information based on their unique contributions. This increases system flexibility and accessibility, allowing for more scalable applications without the traditional coordination bottlenecks found in standard multisig or MPC implementations. By distributing validation responsibilities across multiple layers while maintaining local confidentiality, this hybrid approach significantly improves the practicality of decentralized signing in large and complex systems.

In some aspects, systems and methods for executing multi-party validations for complex communications across multiple computer networks using bifurcated digital signing processes are described. For example, the system may receive a first request, at a bifurcated digital signing process, to perform a first multi-party validation action, wherein the first request has a first processing characteristic. The system may, in response to receiving the first request, process the first request with a first signing routine of the bifurcated digital signing process. The system may determine, based on the first signing routine, whether the first processing characteristic corresponds to a predetermined processing characteristic. The system may, in response to determining that the first processing characteristic corresponds to the predetermined processing characteristic, process the first request with a second signing routine of the bifurcated digital signing process to perform the first multi-party validation action.

In some aspects, systems and methods for executing bifurcated digital signing processes for complex communications across multiple computer networks using separate request addressing are described. For example, the system may receive a first Multi-Party Computation (MPC) signature component, wherein the first MPC signature component comprises a first signature address corresponding to a composite MPC signature and a first group address corresponding to a first participant group, and wherein the first MPC signature component is based on a first multi-party validation action between a first participant and a first sub-participant in the first participant group. The system may receive a second MPC signature component, wherein the second MPC signature component comprises a second signature address corresponding to the composite MPC signature and a second group address corresponding to a second participant group, and wherein the second MPC signature component is based on a second multi-party validation action between a second participant and a second sub-participant in the second participant group. The system may determine that the first MPC signature component corresponds to the first participant group and that the second MPC signature component corresponds to the second participant group. The system may, in response to determining that the first MPC signature component corresponds to the first participant group and that the second MPC signature component corresponds to the second participant group, use the first MPC signature component and the second MPC signature component to generate the composite MPC signature. The system may complete a bifurcated digital signing process for a first cross-network action based on the composite MPC signature.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1B shows illustrative pseudocode that may be used for a bifurcated-signing process, in accordance with one or more embodiments.

FIG. 5 shows a flowchart of the steps involved in conducting secure blockchain actions, in accordance with one or more embodiments.

FIG. 6 shows a flowchart of the steps involved in a process for detokenization, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
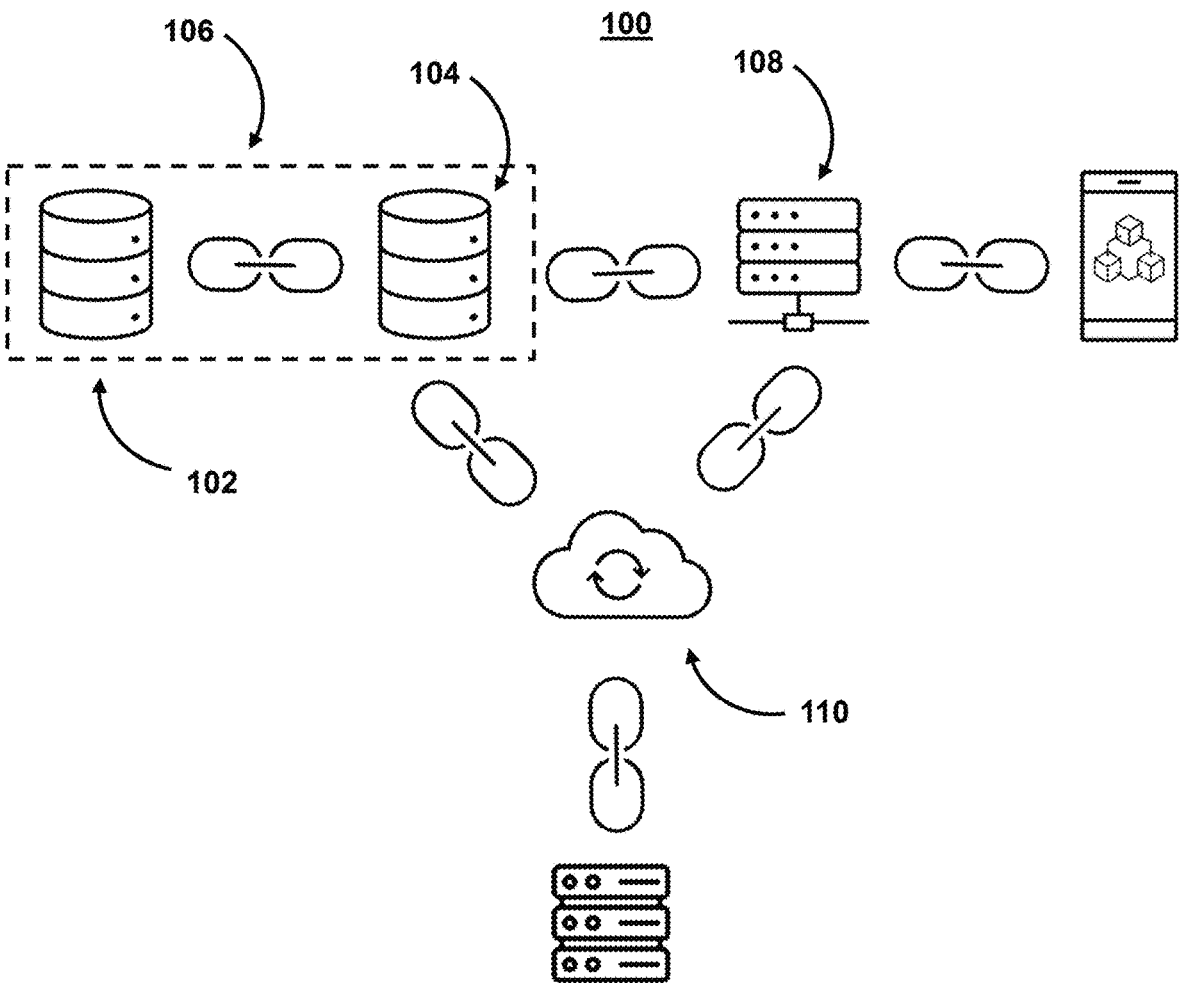
FIG. 1A shows an illustrative diagram for a hub-and-spoke digital signing procedure, in accordance with one or more embodiments.

FIG. 1A shows an illustrative diagram for a hub-and-spoke digital signing procedure, in accordance with one or more embodiments. For example, the hub-and-spoke digital signing procedure may be used for executing multi-party validations and/or executing bifurcated digital signing processes (e.g., in order to facilitate a stablecoin redemption platform).

For example, a bifurcated digital signing process may be a two-step cryptographic procedure that involves multiple participants to validate and authorize a digital action, such as a cross-network transaction. In this process, an initial signing routine takes place between a first participant and a first sub-participant within a participant group to verify and confirm critical information required for executing the intended action.

System 100 includes participant group 106, which includes participant 104 and sub-participant 102. For example, a participant group may include a primary participant that may interact with one or more sub-participants to conduct one or more cross-network actions. For example, a participant may represent a first network of the cross-network action. The sub-participant may be limited to communicating only with participants in the participant group, whereas participant may interact with other entities and/or components of system 100 outside its participant group. For example, participant 104 may interact with participant 108 and/or participant 110, which are located in other participant groups.

In the context of a banking network, a participant group can represent a financial institution facilitating a wire transaction with another banking network while maintaining the privacy of its clients. For example, a first participant group may include a primary participant, such as Bank A, and one or more sub-participants, which represent individual client accounts or clients of Bank A. When initiating a wire transfer, a client (sub-participant) provides transaction details to Bank A (participant), which verifies and processes the request internally without exposing sensitive client information outside the participant group. Once verified, Bank A communicates with a second participant group, which consists of Bank B as the primary participant and its respective client accounts or clients as sub-participants. Bank B follows a similar structure, ensuring that client details remain confidential while still obtaining the necessary transaction information. Throughout the process, only the primary participants, Bank A and Bank B, interact directly to facilitate the wire transfer, while sub-participants remain protected within their respective participant groups. This structured approach enables secure and efficient cross-network transactions while safeguarding client privacy and ensuring compliance with financial regulations.

In another example of a participant group structure can be seen in a supply chain network where a manufacturer (first participant group) coordinates with a retailer (second participant group) to fulfill an order while preserving the confidentiality of their respective suppliers and customers. In this scenario, the first participant group consists of a primary participant, such as a manufacturing company, and sub-participants, which represent individual suppliers that provide raw materials or components for production. When a retailer places an order, the manufacturer (primary participant) verifies inventory and supply chain logistics by interacting with its sub-participants (suppliers) without exposing their identities or specific contract details outside the participant group. Once the manufacturer is ready to fulfill the order, it communicates with the second participant group, which consists of the retailer as the primary participant and its sub-participants, such as distribution centers or end customers. The retailer, like the manufacturer, ensures that sensitive details about customer identities and purchase patterns remain within its participant group while still providing the necessary transaction details to the manufacturer. By structuring the interaction in this way, each organization preserves proprietary business relationships and data while seamlessly executing cross-network actions, such as order fulfillment and shipment coordination.

In some embodiments, system 100 can support a Stablecoin Redemption Platform by facilitating a secure, efficient, and privacy-preserving multi-party validation process that addresses the technical challenges of synchronization, data integrity, and confidentiality. Given that stablecoin redemptions involve multiple stakeholders—including financial institutions, regulatory bodies, and intermediaries—each entity must independently validate the request based on different criteria such as compliance, fund verification, or regulatory approvals. However, because these validations may arrive at different times due to network latency and varying operational speeds, system 100 must handle these discrepancies without introducing bottlenecks or delays.

To achieve this, system 100 may implement a bifurcated validation approach where a first validation occurs within a participant group, ensuring that internal checks—such as client verification within a bank—are completed before engaging with external validators. The system may then execute a second validation routine involving cross-network multi-party validation. Given the privacy concerns associated with sharing sensitive client data among multiple entities, System 100 can leverage cryptographic techniques like zero-knowledge proofs (ZKPs) or Multi-Party Computation (MPC) to allow participants to verify the legitimacy of a redemption request without revealing confidential information.

For synchronization, the system can use a distributed coordination protocol that ensures validation responses are aggregated efficiently without creating bottlenecks. Instead of relying on a central governing authority that could introduce a single point of failure, system 100 may enable a decentralized validation mechanism where each participant contributes to an aggregated or threshold signature. Each participant in the validation process may receive a unique private key that allows them to generate a partial signature. These signatures are then cryptographically combined into a single aggregated signature that confirms the transaction's validity while preserving the confidentiality of each participant's contribution. By structuring the multi-party validation process in this way, system 100 ensures that stablecoin redemptions are executed in a manner that is secure, private, and resistant to delays, allowing seamless coordination among financial institutions, regulatory entities, and blockchain networks without exposing sensitive data.

Once this information is verified, the system proceeds with a second signing routine, which involves a multi-party validation action. This validation action ensures that multiple entities collectively contribute to the authorization process, enhancing security and integrity. As part of this step, a Multi-Party Computation (MPC) signature component is generated, which serves as an essential element in finalizing the digital signing process. The overall bifurcated approach culminates in forming a composite MPC signature that is composed of multiple MPC signature components, ensuring the completion of the digital signing process while leveraging distributed cryptographic techniques for secure and reliable execution.

The participant group structure enables each participant group to independently validate information known only to them while maintaining privacy and security by leveraging controlled communication and cryptographic techniques. Each group consists of a primary participant that can interact externally and one or more sub-participants whose data remains confined within the group. When a cross-network action, such as a financial transaction or supply chain operation, is initiated, the primary participant verifies relevant information internally with its sub-participants before engaging with another participant group. This ensures that sensitive details, such as client identities or proprietary business relationships, are never exposed beyond the participant group.

To further enhance security, cryptographic techniques such as Multi-Party Computation (MPC) or Zero-Knowledge Proofs (ZKP) can be used. These methods allow one participant group to prove the validity of a piece of information to another participant group without revealing the underlying data. For example, in a banking transaction, Bank A can confirm that a client has sufficient funds without disclosing the exact account balance to Bank B. Similarly, in a supply chain scenario, a manufacturer can prove that it has the necessary inventory to fulfill an order without exposing specific supplier agreements.

By maintaining strict communication boundaries and employing advanced cryptographic validation methods, the participant group structure ensures that each group independently verifies the authenticity of its information while minimizing the risk of data exposure, unauthorized access, or breaches of privacy. This approach enables secure and trust-driven interactions across different networks while preserving the confidentiality of sensitive data.

FIG. 1B shows illustrative pseudocode that may be used for a bifurcated-signing process, in accordance with one or more embodiments. For example, pseudocode 120 and pseudocode 140 may correspond to the different aspects of the bifurcated-signing process. Pseudocode 120 may correspond to a first multi-party validation action between a first participant and a first sub-participant in the first participant group. Pseudocode 120 may include a group address (e.g., address 124) for this participant group. Pseudocode 140 may include a first signature address (e.g., signature address 144) corresponding to a composite MPC signature.

For example, different addresses are needed in the bifurcated digital-signing process to ensure proper segregation of responsibilities, controlled communication, and enhanced security throughout the multi-party validation and signing stages. The group address (e.g., address 124) in pseudocode 120 is used to facilitate secure interactions within a specific participant group, ensuring that validation between a participant and its sub-participants remains contained within its designated network. This prevents unauthorized access to sensitive internal data while allowing the participant group to independently verify necessary transaction details.

On the other hand, the signature address (e.g., signature address 144) in pseudocode 140 is required to manage the composite MPC signature, which represents the finalized authorization of the cross-network action. This address ensures that only authorized entities can access and verify the completed multi-party signature without exposing details of the internal validation process. By using separate addresses for group validation and final signing, the system maintains a layered security approach, where internal validations remain private while allowing external parties to verify the legitimacy of the transaction without compromising sensitive information. This structure enhances both security and efficiency, ensuring that different stages of the signing process operate independently yet cohesively within the broader system.

In some embodiments, pseudocode 120 may represent one example of uncompiled code that may be used for generating a bifurcated self-executing program. For example, pseudocode 120 includes first self-executing program 122. First self-executing program 122 includes address 124 and public variables 126.

Pseudocode 120 and pseudocode 140 may include multiple variables and details. For example, address 124 includes and public variables 126 may include various predetermined processing characteristics. The predetermined processing characteristics may represent processing characteristics of any request to execute the bifurcated digital signing process. For example, address 124 includes and public variables 126 may include requirements for a required security certificate, a specific request origination, a specific request validator, a specific digital asset, a specific signing procedure, a number of signatures, and/or other processing characteristics described herein.

As described herein, a "processing characteristic" may comprise any characteristic of a request and/or a blockchain action that distinguishes the request and/or blockchain action from another request and/or blockchain action. For example, a processing characteristic may be compared against a "predetermined processing characteristic" in a bifurcated digital signing process. Based on the comparison, the bifurcated digital signing process may determine whether or not to execute.

In some embodiments, a processing characteristic may comprise a digital signature characteristic. For example, the digital signature characteristic may comprise any characteristic of a digital signature characteristic request and/or a blockchain action based on a digital signature characteristic or requirement that distinguishes the request and/or the blockchain action from another request and/or blockchain action. For example, a digital signature characteristic may be compared against a digital signature requirement in a self-executing program. Based on the comparison, the self-executing program may determine whether or not to execute. For example, a digital signature is a mathematical technique used to validate the authenticity and integrity of a digital document, message, or software. The digital signatures may provide, to the system, evidence of origin, identity, and status of electronic documents, transactions, or digital messages. Signers may also use them to acknowledge informed consent.

The digital signature characteristic may comprise a parameter that must be satisfied prior to the bifurcated digital signing process performing the blockchain action (e.g., each action may have a specific rule, privacy requirement, government regulations, contract vetting status, etc., that is a prerequisite for executing the blockchain action using the bifurcated self-executing program). By doing so, the system may ensure that the prerequisite is achieved prior to the bifurcated digital signing process executing the blockchain action. For example, the digital signature characteristic may comprise a signature based on an accountable subgroup multi-signature (ASM) scheme. In another example, the digital signature characteristic may comprise a signature based on a Schnorr signature scheme. A Schnorr signature is produced by the Schnorr signature algorithm. For example, the digital signature characteristic comprises a signature based on a Boneh-Lynn-Shacham (BLS) digital signature scheme. A BLS signature is a cryptographic signature scheme which allows a user to verify that a signer is authentic.

For example, the digital signature characteristic may comprise a private key and/or a corresponding public key. For example, the authenticity of a signature generated from a fixed message and fixed private key can be verified by using the corresponding public key. In another example, it is computationally infeasible to generate a valid signature for a party without knowing that party's private key. In another example, the digital signature characteristic may comprise a characteristic based on a signature algorithm.

For example, the system may use digital signatures that are based on public key cryptography, also known as asymmetric cryptography. Using a public key algorithm, such as Rivest-Shamir-Adleman (RSA), two keys are generated, creating a mathematically linked pair of keys: one private and one public. Digital signatures work through public key cryptography's two mutually authenticating cryptographic keys. For encryption and decryption, the user that creates the digital signature uses a private key to encrypt signature-related data, and the only way to decrypt that data is with the signer's public key.

Digital certificates, also called public key certificates, are used to verify that the public key belongs to the issuer. Digital certificates contain the public key, information about its owner, expiration dates, and the digital signature of the certificate's issuer. Digital certificates are issued by trusted third-party certificate authorities (CAs). The party sending the document and the user signing it must agree to use a given CA. Accordingly, a first self-executing program of the bifurcated self-executing program may enforce a digital signature requirement (e.g., based on a digital certificate) prior to execution of a second self-executing program of the bifurcated self-executing program.

For example, to create a digital signature, signing software is used to provide a one-way hash of the electronic data to be signed. The hash may be a fixed-length string of letters and numbers generated by an algorithm. The digital signature creator's private key is used to encrypt the hash. The encrypted hash, along with other information, such as the hashing algorithm, may be the digital signature. The reason for encrypting the hash instead of the entire message or document is because a hash function can convert an arbitrary input into a fixed-length value, which is usually much shorter. Accordingly, the system saves time, as hashing is much faster than signing. The value of a hash is unique to the hashed data. For example, any change in the data, even a modification to a single character, results in a different value. This attribute enables others to use the signer's public key to decrypt the hash to validate the integrity of the data.

If the decrypted hash matches a second computed hash of the same data, it proves that the data has not changed since it was signed. But, if the two hashes do not match, the system (e.g., a first self-executing program) may determine that either the data has been tampered with in some way and is compromised or the signature was created with a private key that does not correspond to the public key presented by the signer (e.g., failing the digital signature requirement).

First self-executing program 122 also includes details 128. For example, first self-executing program 122 may create various details for first self-executing program 122 that may define additional processing characteristics and/or information related to processing characteristics that are required to be completed prior to the execution of first self-executing program 122. First self-executing program 122 also includes modifier 130. For example, modifier 130 indicates that if a given condition is not satisfied (e.g., the predetermined processing characteristic is not met), a function of first self-executing program 122 will not execute.

For example, modifier 130 may indicate that a function to generate, use, and/or execute a private key will not trigger. For example, the function that generates, uses, and executes a private key may follow a structured cryptographic process to ensure security and proper functionality. When generating a private key, the function relies on a strong random number generator (RNG) to produce an unpredictable, high-entropy value, ensuring that the key is resistant to brute-force attacks. This key is then formatted according to cryptographic standards, such as the elliptic curve (e.g., secp256k1) or RSA key specifications, depending on the intended use case. Once generated, the private key is securely stored, often encrypted or protected within a hardware security module (HSM) or a secure enclave to prevent unauthorized access.

To use the private key, the function typically interacts with cryptographic libraries to perform signing operations, decryption, or authentication. When signing a transaction or message, the function applies a secure hashing algorithm (e.g., SHA-256) to the data and then uses the private key in conjunction with a digital signature algorithm (e.g., ECDSA, EdDSA, or RSA) to generate a unique signature. This signature can then be verified by others using the corresponding public key, ensuring the integrity and authenticity of the signed message without exposing the private key itself. Executing a private key includes its role in cryptographic operations, such as signing transactions on a blockchain, decrypting encrypted messages, or authenticating access to a secure system. The function handling this execution must ensure that the key is never exposed in plaintext and that access controls prevent unauthorized usage.

In some embodiments, self-executing program 122 may provide a privacy layer in addition to an additional security layer. For example, self-executing program 122 may comprise a second self-executing program (e.g., second self-executing program 142) that is digitally wrapped by self-executing program 122 in an encrypted state and/or in a state where details about the second self-executing program are not publicly available.

In some embodiments, the system may mask one or more details related to a self-executing program in the bifurcated self-executing programs. For example, the system may mask a payload of a self-executing program as well as a recipient. The system may provide this masking via hashing data in the self-executing program. For example, details may be completely obfuscated and represented by hash in one embodiment, which would completely obscure details in the self-executing programs (e.g., sender, recipient, etc.). The self-executing program may then invoke an agreed offline address and compute a local hash to match a hash in the self-executing program. Additionally or alternatively, a self-executing program may be encrypted using a public-private key pair as described herein. Additionally or alternatively, the system may use oracles to validate details from agreed off-chain or on-chain sources including the same or other blockchains.

Additionally or alternatively, to mask recipient oracle constructs could use external input to be executed in one or more of the self-executing programs to perform blockchain actions (e.g., move assets to relevant blockchain accounts, obfuscating recipient identifiers (including by requesting recipients to create new accounts and/or addresses with no trace history). For example, the system may be used by users to move assets using random logic.

For example, self-executing program 122 may maintain the second self-executing program in an encrypted state through the use of homomorphic encryption. As such, the second self-executing program would remain private in a public, non-permissioned blockchain, prior to self-executing program 122 being executed. Alternatively or additionally, the second self-executing program could be hosted external to the blockchain in a protected processing environment.

In such cases, any API (Application Programming Interface) connections to a second self-executing program could be encrypted and secured, so that they could not be intercepted. It should be noted that the API may be applied consistently across a decentralized network. For example, the API may act as, or be integrated with, a blockchain oracle. A blockchain oracle is any device or entity that connects a deterministic blockchain with off-chain data. These oracles enter every data input through an external transaction. This way, we can be sure that the blockchain itself contains all of the information required to verify itself. Accordingly, embodiments described herein referring to APIs may equally be applied to oracles.

In some embodiments, the oracles may comprise a decentralized oracle. A decentralized oracle or decentralized oracle network is a group of independent blockchain oracles that provide data to a blockchain. Every independent node or oracle in the decentralized oracle network independently retrieves data from an off-chain source and brings it on-chain. The data is then aggregated so the system can come to a deterministic value of truth for that data point.

Data received and/or transmitted to one or more locations (e.g., an oracle) may be encrypted. Furthermore, the protected processing environment would prevent leakage of data. With respect to outputs, the output API path could also be protected. In some embodiments, a third self-executing program which is on the blockchain and processes the output from second self-executing program.

Pseudocode 140 may represent one example of uncompiled code that may be used for generating a bifurcated self-executing program. For example, pseudocode 140 includes second self-executing program 142. Second self-executing program 142 includes address 144 and public variables 146. For example, address 144 includes and public variables 146 may include various processing characteristic for second self-executing program 142 such as a specific address for a buyer and/or a specific address for seller. Address 144 and public variables 146 may indicate various terms and rules for second self-executing program 142. For example, address 144 and public variables 146 may indicate specific unites, prices, etc., corresponding to second self-executing program 142.

Second self-executing program 142 also includes additional details. For example, second self-executing program 142 may create various details for second self-executing program 142. Second self-executing program 142 also includes modifier 148. For example, modifier 148 indicates that if a given condition is not satisfied (e.g., first self-executing program 122 has been executed), a function of second self-executing program 142 will not execute.

The system may further compile self-executing program 122 and self-executing program 142 into a bifurcated self-executing program. For example, the system may compile self-executing program 122 and self-executing program 142 into a bifurcated self-executing program by converting self-executing program 122 and self-executing program 142 into a single bytecode representation (e.g., the bifurcated self-executing program). The system may then deploy the compiled bifurcated self-executing program onto the blockchain. This single bytecode representation of the self-executing program 122 and self-executing program 142 is then stored on a blockchain. Additionally or alternatively, the single bytecode representation of the self-executing program 122 and self-executing program 142 may have a single address assigned to it.

In some embodiments, address 124 and address 144 may be used for a Stablecoin Redemption Platform. For example, specialized addressing plays a critical role in supporting a Stablecoin Redemption Platform by enabling seamless integration between blockchain transactions and the necessary off-chain processes such as regulatory compliance, multi-party validation, and confidential identity handling. Unlike standard blockchain addresses that merely facilitate token transfers, the redemption process requires an advanced addressing scheme that incorporates metadata such as unique request IDs, reference numbers, or encoded party identifiers. These elements help establish a direct link between on-chain transactions and off-chain requirements like KYC (Know Your Customer), AML (Anti-Money Laundering), and other compliance checks, reducing the number of database queries and streamlining validation workflows.

For instance, when a user submits a redemption request, the specialized addressing scheme can embed a unique identifier that directly maps to a pre-verified database entry, eliminating the need for extensive searches or redundant validation steps. Additionally, the inclusion of multi-party references allows the system to associate the request with the appropriate financial institutions or intermediaries without exposing confidential relationships. This not only enhances transaction efficiency but also preserves privacy by leveraging zero-knowledge proofs or other cryptographic techniques to verify compliance requirements without disclosing sensitive data. Furthermore, by embedding structured metadata within the addressing framework, the redemption platform can automate key steps such as seeking third-party validations, associating transactions with participant banks, and ensuring that only authorized entities can process redemption requests. This advanced approach to addressing enhances security, operational efficiency, and regulatory compliance, making the stablecoin redemption process both scalable and privacy-preserving.

Figure 1C:
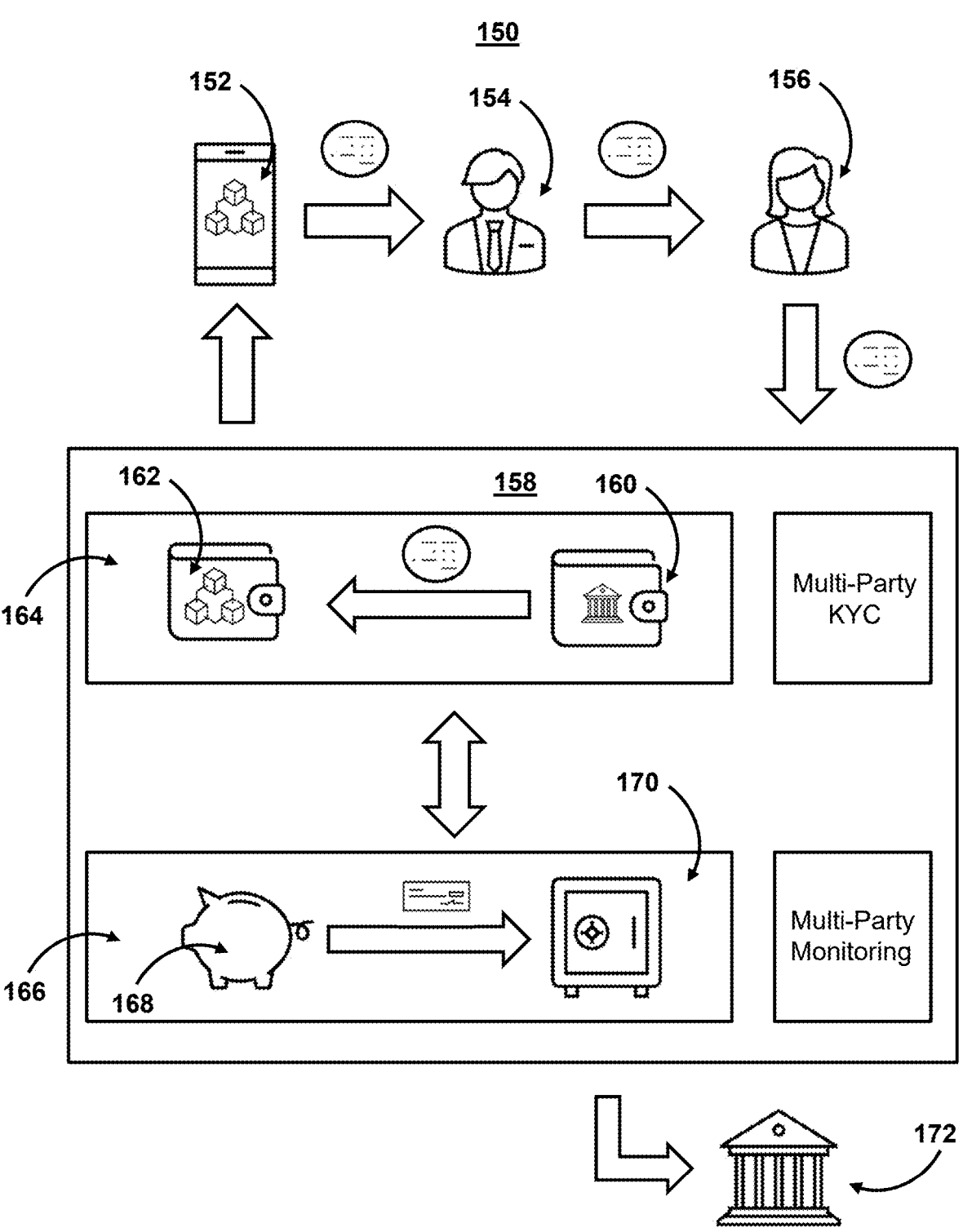
FIG. 1C shows an illustrative diagram for a stablecoin redemption platform, in accordance with one or more embodiments.

FIG. 1C shows an illustrative diagram for a stablecoin redemption platform, in accordance with one or more embodiments. For example, system 150 may comprise a stablecoin redemption platform. System 150 may be facilitated by executing multi-party validations and/or bifurcated digital signing processes.

For example, a stablecoin redemption platform may be a financial system that enables users to exchange stablecoins for their underlying fiat currency or other assets in a secure, efficient, and compliant manner. Unlike simple blockchain transactions, the redemption process involves multiple steps, including identity verification, regulatory compliance checks, liquidity verification, and coordination between different financial entities. The platform typically integrates with banks, payment processors, and regulatory bodies to ensure that redemptions adhere to legal and financial standards, such as KYC (Know Your Customer) and AML (Anti-Money Laundering) regulations. Given that stablecoin transactions often operate on decentralized networks, the redemption platform must bridge the gap between blockchain-based digital assets and traditional financial infrastructure. This requires specialized addressing schemes, multi-party validation, and cryptographic techniques such as zero-knowledge proofs or MPC to maintain privacy and security. By streamlining these processes, the platform ensures that users can efficiently convert their stablecoins into fiat while financial institutions and regulators can validate transactions without exposing sensitive data.

System 150 includes user interface 152, which may comprise a virtual asset provider (e.g., a stablecoin provider, wallet, etc.). User 154 may access a stablecoin from user interface 152 and request redemption of the stablecoin by user 156. For example, user 156 may comprise a bank, merchant, etc.

User 156 may submit the redemption request to stablecoin redemption platform 158. Stablecoin redemption platform 158 may perform one or more multi-party validations and/or use one or more bifurcated digital signing processes. Upon receipt of a request from user 156, stablecoin redemption platform 158 may access a group address and signature address in the request. The system may use the addresses to route communications to different participants and/or participant groups.

Stablecoin redemption platform 158 may include and/or access wallet 160, which may be hosted by a participant bank and wallet 162, which is a hosted wallet for the stablecoin issuer. Wallet 160 and wallet 162 may act as a first participant group (e.g., participant group 164). In such an instance wallet 162 may be a sub-participant, while wallet 160 is a participant in participant group 164. Upon transfer of a stablecoin (e.g., a processing characteristic) for a first signing routine, participant group 164 processing the first request with a second signing routine of the bifurcated digital signing process to perform the first multi-party validation action.

Stablecoin redemption platform 158 may include and/or access bank account 170, which may be hosted by a participant bank and bank account 168, which is a hosted by the stablecoin issuer. Bank account 170 and bank account 168 may act as a second participant group (e.g., participant group 166). In such an instance, bank account 168 may be a sub-participant, while bank account 170 is a participant in participant group 166. Upon transfer of a currency (e.g., a processing characteristic) for a first signing routine, participant group 166 processing the first request with a second signing routine of the bifurcated digital signing process to perform a second multi-party validation action.

Participant group 166 and participant group 164 may then each submit an MPC signature component for use in completing a bifurcated digital signing process for the cross-network action (e.g., a stablecoin redemption) based on a composite MPC signature. For example, upon receipt of the composite MPC signature, stablecoin redemption platform 158 may send a notification to user 154 via user interface 152 and credit a bank account of user 154 (e.g., bank 172).

Figure 2A:
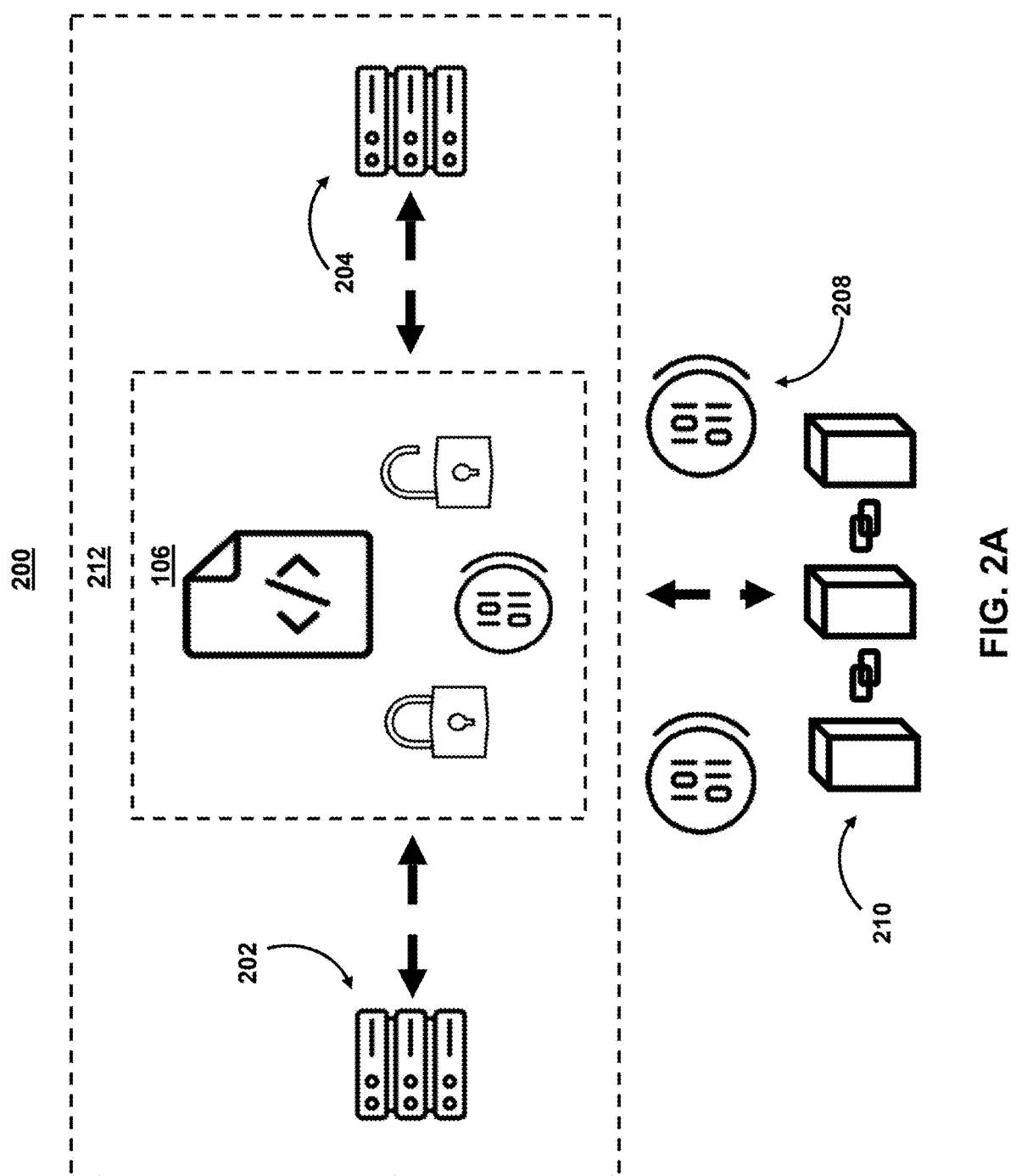
FIGS. 2A-2C show an illustrative diagram for managing resources, in accordance with one or more embodiments.
Figure 2B:
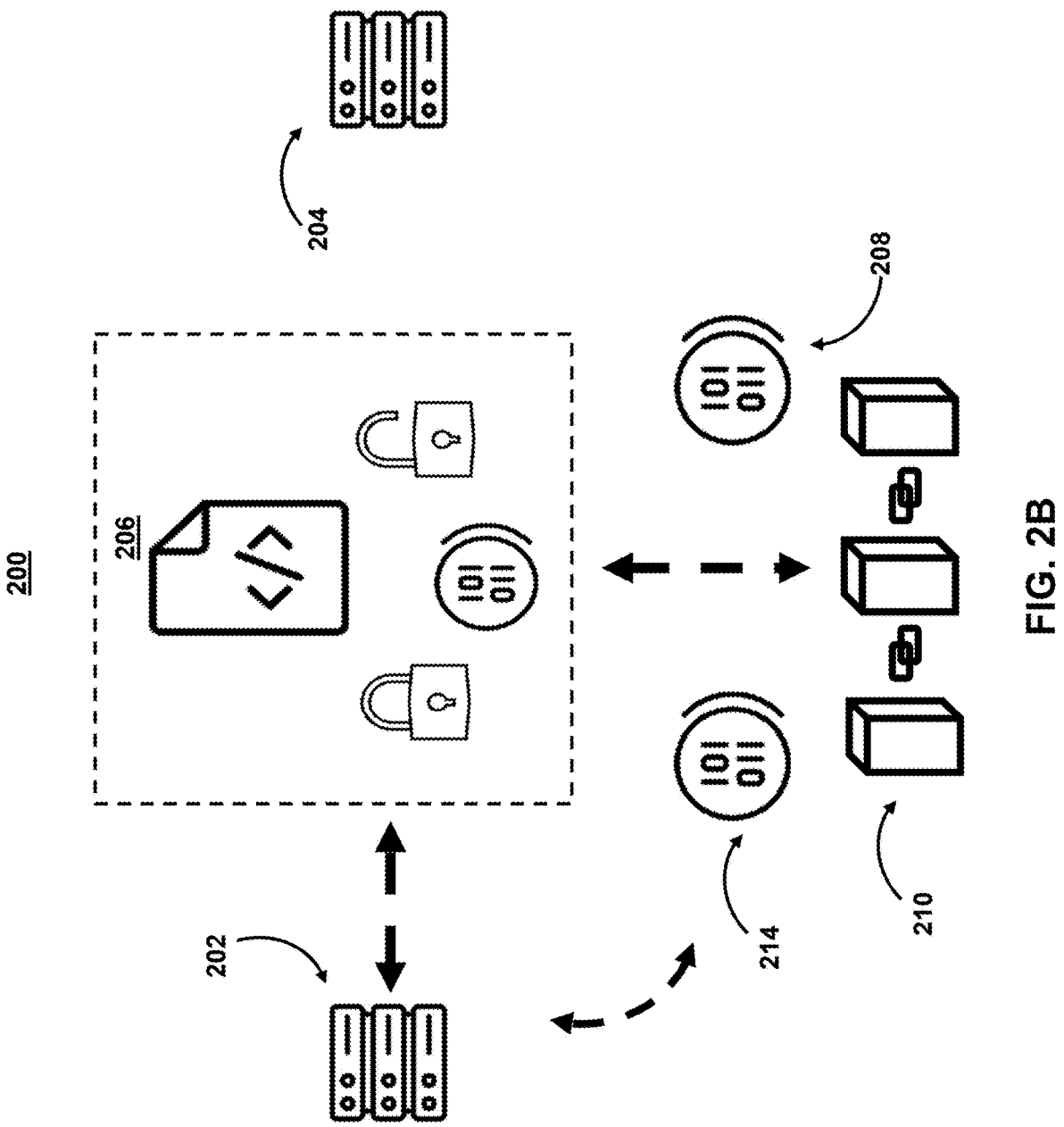
Figure 2C:
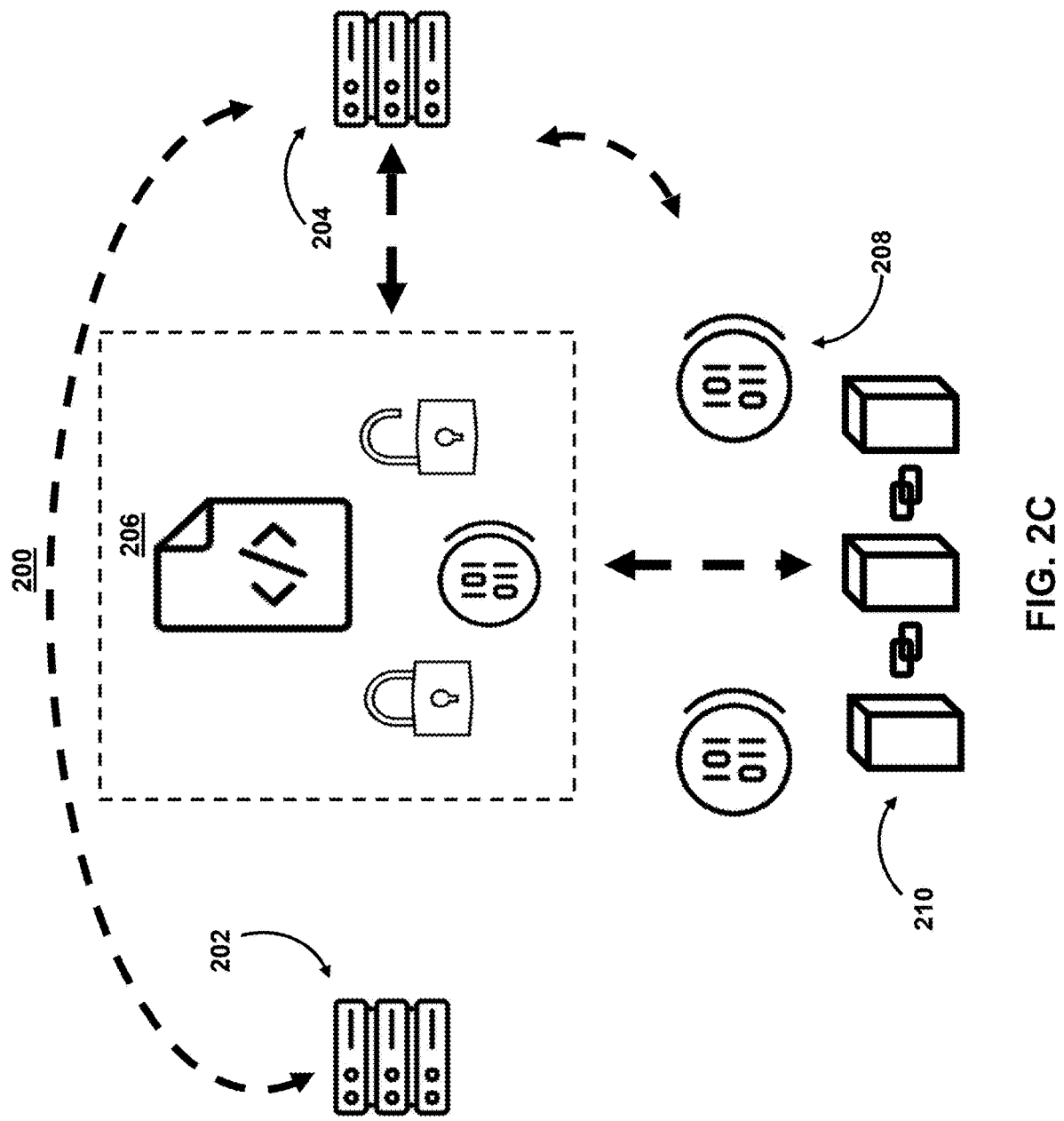

FIGS. 2A-2C show an illustrative diagram for managing resources, in accordance with one or more embodiments. For example, FIGS. 2A-C may show resource management that may be used for executing multi-party validations and/or executing bifurcated digital signing processes (e.g., in order to facilitate a stablecoin redemption platform). FIG. 2A shows an illustrative architecture for managing resources across global or cloud networks, in accordance with one or more embodiments. For example, system 200 includes a network between two resources (e.g., resource 202 and resource 204). As described herein, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS—Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some embodiments, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some embodiments, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some embodiments, system 200 may illustrate one or more communications between resource 202 and resource 204 as managed by a platform application. For example, a platform application may be used to facilitate one or more blockchain actions (e.g., via self-executing program 206) to conduct the communications across computer network 212. In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. In some embodiments, the self-executing program may be a program in which rules for execution are written into lines of code that is executed in response to a trigger.

As referred to herein, a computer network may refer to a collection of interconnected computers and other devices that are linked together to share resources, information, and services. These networks can be established using various technologies and configurations, allowing devices to communicate and exchange data with each other. In some embodiments, the computer network may comprise a network for a financial services firm.

In some embodiments, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some embodiments, the computer network may comprise a global payment network that facilitates credit and debit card transactions. The network may connect issuing banks, acquiring banks, merchants, and cardholders, enabling electronic payments at point-of-sale terminals and online. In some embodiments, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some embodiments, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some embodiments, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some embodiments, the platform application may be used to manage the availability of devices in a computer network (e.g., a "platform management application"). This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some embodiments, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), mobile and online banking (e.g., mobile applications and online banking portals).

In some embodiments, the system receives the first request may comprise receiving, at a platform management application, a user request to perform a first off-chain action. The system may then determine that the first blockchain action corresponds to first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcasted to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 200 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, certain computations or processes needed to support a decentralized application (DApp) might be handled off-chain to improve performance and reduce latency, with only the final outcome or necessary data being recorded on the blockchain.

For example, in the context of blockchain technology, on-chain data and assets are those that are recorded and stored directly on the blockchain. In contrast, off-chain data or assets are not directly stored on the blockchain but are instead managed off the blockchain. For example, off-chain data may be information that is not stored on the blockchain but is referenced or linked to it. This could include data stored in traditional databases, external files, or other systems. Off-chain assets may be assets that are represented or exist in the physical world or in other systems, but their ownership or status is tracked and managed on the blockchain. This could include real-world assets like real estate, commodities, or even digital assets that are not stored directly on the blockchain.

In some embodiments, off-chain actions may also comprise state channels, rollups, and/or sidechains. For example, these are off-chain scaling solutions that enable parties to conduct transactions or execute self-executing programs off the main chain. State channels allow participants to interact directly with each other off-chain, updating the state between them, while sidechains are separate blockchains that can be connected to the main blockchain, facilitating faster and more scalable transactions. In the context of blockchain and cryptocurrency, a "rollup" may be a layer 2 scaling solution. It is designed to improve the efficiency and scalability of blockchain networks. Rollups work by processing and bundling multiple transactions off-chain, and then submitting a single transaction to the main blockchain. This helps reduce congestion and lower transaction costs.

In some embodiments, off-chain actions may also comprise usage of off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some embodiments, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 200 may use one or more on-chain actions related to network 210. Network 210 may comprise a blockchain. As described herein, a blockchain is a decentralized ledger of transactions built upon a combination of cryptography techniques (e.g., secret keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the practically impossible to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology have become a foundation of many decentralized applications.

For example, network 210 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some embodiments, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed Ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 210 may be used by system 200 to manage and/or facilitate one or more cryptographically secure digital assets (e.g., asset 208). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries. Users may access and manage these assets using cryptographic keys. Public and private keys allow users to securely interact with the assets, sign transactions, and prove ownership without revealing sensitive information.

Network 210 may be used to facilitate communications (e.g., blockchain actions) irrespective of whether a resource is online. For example, a resource in a network may be "online," whether it is a device, service, and/or application, when it is currently connected and available for communication and interaction within the network. In contrast, a resource may be offline when it is not online. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in embodiments, in which the resource is a bank account, bank branch, etc., the resource may be online when the resource (or assets held by the resource) are reachable and responsive to requests or communication attempts from other devices or users on the network.

In some embodiments, system 200 may be used to manage resources across network 210. For example, system 200 may manage resources based on the availability of resources in network 210. In some embodiments, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some embodiments, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position. For example, a tokenized availability of a resource may correspond to assets available at a given resource (e.g., a digital account). The transfer of this may correspond to the assets being transferred from one resource to another.

In some embodiments, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the self-executing program's code to validate the possession or existence of the digital asset before executing certain actions or operations. For example, developers encode conditions within the self-executing program's code using a programming language suitable for self-executing programs (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the program may check this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability of a resource) from other availability (or availability of another resource). In some embodiments, characteristics of availability of resources within a computer network may refer to attributes or factors that define the accessibility, reliability, and continuity of these resources. For example, in embodiments describing the transfer of availability, the availability may be transferred by a change (or transfer) of a characteristic of the availability being transferred.

For example, a characteristic may refer to uptime and reliability as availability is associated with the ability of resources to remain operational and accessible over time without unexpected interruptions. High availability implies minimal downtime and consistent reliability. In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some embodiments, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/ or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some embodiments, the system may employ decision models or algorithms that factor in the weighted criteria and analysis to generate a scoring system or rank the assets based on their suitability for the system's requirements.

FIG. 2B shows an illustrative architecture for managing resources across global or cloud networks, in accordance with one or more embodiments. For example, in FIG. 2B, system 200 may receive, at a platform application, a first user request to perform a first off-chain action. For example, the off-chain action may represent resource 202 (e.g., a buyer) creating a self-executing program (e.g., self-executing program 206). The system may determine a first blockchain action that corresponds to first off-chain action. As referred to herein, a self-executing program (or smart contract) may comprise a program with predefined terms (e.g., terms of an agreement between buyer and seller) written into the code of the program. The self-executing program may be implemented on blockchain platforms, such as Ethereum, which allows for decentralized and automated execution of terms without the need for intermediaries. The self-executing program may be programmed to automatically enforce, verify, and/or facilitate the negotiation or performance of a predefined term (e.g., contract), eliminating the need for a trusted third party. These programs may run on a blockchain, which is a distributed and immutable ledger that records all transactions across a network of computers.

System 200 may receive a first request, at a first action specific self-executing program, to perform a first blockchain action using a first resource, wherein the first blockchain action is encoded in the first action specific self-executing program. The request (e.g., a computer request) may refer to a communication or a query made by a computer or a software application to another computer, server, and/or device on a network. This request is typically initiated by a client computer seeking specific information, data, resources, or services from a server or another computing device. As described herein, an action-specific self-executing program may refer to a type of self-executing program designed to execute or facilitate a specific action, task, or set of predefined operations within a blockchain network. Unlike general-purpose self-executing programs that can handle various functions, an action-specific self-executing program is tailored to perform a particular action or a limited range of actions based on predefined conditions.

The system may also receive a transfer of cash or other assets that are tokenized on network 210 as cryptographically secure digital asset 214. For example, the system may determine, at the first action specific self-executing program (e.g., self-executing program 206), a first condition for performing the first blockchain action, wherein the first condition is encoded in the first action specific self-executing program. For example, the first condition may comprise a required amount of available digital assets (or cash or other assets) at a given resource.

In a self-executing program, a condition may refer to a predefined rule, criteria, or set of instructions written into the program's code that determines how the program operates or executes. Conditions establish the logic and parameters that must be met for the self-executing program to perform specific actions or trigger certain outcomes. Conditions define the logic or decision-making process within the self-executing program. They specify the circumstances under which the program will perform certain functions, make decisions, or execute predefined actions.

Conditions are often associated with trigger events or specific states within the blockchain network. When these trigger events occur, the conditions embedded in the self-executing program are evaluated, and corresponding actions are executed if the conditions are met. Conditions can depend on various input parameters, such as timestamps, user input, external data feeds, or the state of other programs or variables within the blockchain network. Based on the fulfillment or non-fulfillment of conditions, a self-executing program may execute specific actions, proceed with a transaction, release funds, transfer tokens, update states, or terminate its execution.

In some embodiments, the condition may be a time-based conditions (e.g., a self-executing program might have conditions that execute a particular action only after a specific date, time, or a defined duration has elapsed), threshold conditions (e.g., conditions might specify that a certain number of participants need to approve an action or that a certain amount of tokens needs to be accumulated before an action is executed), external data conditions (e.g., self-executing programs can incorporate external data sources, and conditions may rely on data retrieved from these sources to trigger actions).

Conditions in a self-executing program are encoded using programming languages and specific syntax within the code of the self-executing program. Self-executing programs are typically written in specialized programming languages, such as Solidity for Ethereum or Chaincode for Hyperledger Fabric, and these languages have their syntax and structures to encode conditions. In response to a user request, the system may write self-executing programs using programming languages specifically designed for blockchain platforms. They use the language's syntax and logic to encode conditions within the contract's code. Programming languages used for self-executing programs offer conditional statements (if, else if, else) that allow developers to specify conditions and define the actions or behaviors to be executed based on the evaluation of these conditions. The user request may define the logic, rules, and parameters for conditions within the contract's code. This includes specifying trigger events, input variables, comparison operations, and logical operators to create the conditions. Some self-executing program languages allow the creation of event handlers that can detect external triggers or changes in the blockchain state. These event handlers can be associated with specific conditions to execute actions when triggered.

Self-executing program 206 may then monitor for the tokenized availability (e.g., cryptographically secure digital assets corresponding to a sale price in self-executing program 206). For example, the system may receive, by the first action specific self-executing program, a first tokenized availability of the first resource from a first blockchain network. Tokenized availability may refer to the representation or conversion of the availability of assets, resources, or services into digital tokens or cryptographic tokens on a blockchain or digital ledger. It involves using tokens as a representation or proof of ownership, access rights, or availability of certain resources within a decentralized network.

FIG. 2C shows an illustrative architecture for managing resources across global or cloud networks, in accordance with one or more embodiments. For example, system 200 may determine, by the first action specific self-executing program, whether to perform the first blockchain action based on comparing the first condition to the first tokenized availability. For example, the system may determine whether or not to execute the self-executing program. The system may make this determination based on one or more criteria.

As shown in FIG. 2C, the system may determine whether conditions of the self-executing program have been completed. In some embodiments, in response to determining whether to perform the first blockchain action, the system may transmit a second user request to complete the first off-chain action. For example, the system may determine whether a seller delivers services or goods to buyer in accordance with the self-executing program terms and conditions. In such cases, the system may query a buyer and/or seller or request other information of an off-chain action.

The system may execute the first blockchain action, by the first action specific self-executing program, based on determining that the first off-chain action is completed, wherein executing the first blockchain action causes the first tokenized availability of the first resource to be transferred to a second resource.

The system may receive, at the platform application, a confirmation of the first blockchain action being executed. A confirmation of a blockchain action being executed may refer to the acknowledgment or verification that a specific transaction or operation has been successfully processed and added to the blockchain.

Figure 3:
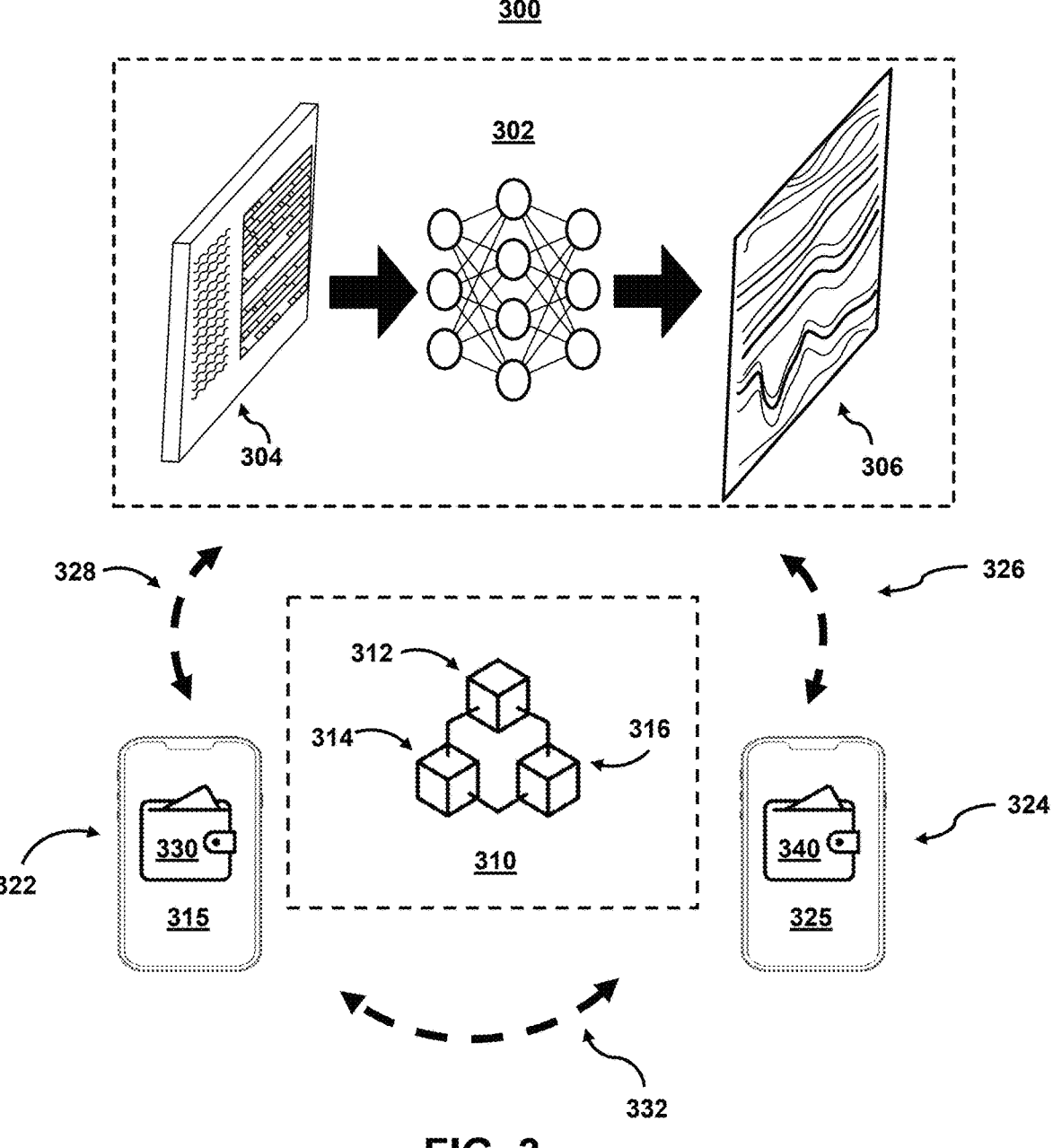
FIG. 3 shows illustrative components for a system used to facilitate multi-party validations, in accordance with one or more embodiments.

FIG. 3 shows illustrative components for a system used to execute multi-party validations and/or bifurcated digital signing processes, in accordance with one or more embodiments. As shown in FIG. 3, system 300 may include user device 322 and user device 324. While shown as a smartphone, respectively, in FIG. 3, it should be noted that user device 322 and user device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of user device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of user device 322 and user device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both user device 322 and user device 324 include a display upon which to display data.

Additionally, as user device 322 and user device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

In some embodiments, system 300 and/or one or more models herein may be implemented using an application-specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application-specific such that design of the circuit is customized for a given application. In some embodiments, system 300 may use an integrated circuit system where one or more integrated circuits are spread throughout a system, network, and/or one or more devices. In such case, the system design may ensure that the circuits are integrated with other electronic components like connectors, power supplies, and sensors to form a complete and functional electronic system. This integration allows for the implementation of sophisticated tasks in devices needed for one or more specified applications.

FIG. 3 also includes communication paths 328, 326, and 332. Communication paths 328, 326, and 332 may include the Internet, a mobile phone network, a mobile voice or data network (e.g., a 5G or LTE network), a cable network, a public switched telephone network, or other types of communications networks or combinations of communications networks. Communication paths 328, 326, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 30a6, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction.

In a variety of embodiments, model 302 may update its configurations (e.g., weights, biases, or other parameters) based on the assessment of its prediction (e.g., outputs 306)

and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, the model (e.g., model 302) may automatically perform actions based on outputs 306. In some embodiments, the model (e.g., model 302) may not perform any actions. In some embodiments, model 302 may be trained by taking inputs 304 and provide outputs 306. Model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

Model 302 is shown as a convolutional neural network. A convolutional neural network consists of an input layer (e.g., input 304), hidden layers, and an output layer (e.g., output 306). The middle layers are called hidden because their inputs and outputs are masked by the activation function and final convolution. In a convolutional neural network, the hidden layers include layers that perform convolutions. Model 302 may comprise convolutional layers that convolve the input and pass its result to the next layer. Model 302 includes local and/or global pooling layers along with traditional convolutional layers. Pooling layers reduce the dimensions of data by combining the outputs of neuron clusters at one layer into a single neuron in the next layer. Model 302 may comprise fully connected layers that connect every neuron in one layer to every neuron in another layer.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3 includes system 300, which includes user device 322 and user device 324, although other devices and/or components may also be featured in system 300 (e.g., one or more of devices and/or components shown in FIG. 2). User device 322 includes user interface 315. User device 324 includes user interface 325. As referred to herein, a "user interface" may comprise a mechanism for human-computer interaction and communication in a device and may include display screens, keyboards, a mouse, and the appearance of a desktop. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

User device 322 and user device 324 may conduct blockchain actions across blockchain 310. Blockchain 310 may comprise a type of distributed ledger technology that consists of a growing list of records, called blocks (e.g., block 312, block 314, and block 316), that are securely linked together using cryptography. Each block may contain a cryptographic hash of the previous block (e.g., block 316 may contain a cryptographic hash of block 314), and that cryptographic hash may itself be based on a state of a preceding block (e.g., the cryptographic hash of block 316 is based not only on the state of block 314, but also block 312). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains may be managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 322 and/or communicate with an API implemented on user device 324. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to execute multi-party validations and/or execute bifurcated digital signing processes (e.g., in order to facilitate a stablecoin redemption platform). For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging into the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiment, a cryptography-based, storage application may include, or have access to, a key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 322, user interface 315, and/or cryptography-based, storage application 330) may comprise, control, and/or have access to a private key and/or digital signature. For example, system 300 may use cryptographic systems for conducting blockchain actions such as stablecoin redemption. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 322 may request a blockchain action (e.g., conduct a transaction). The blockchain action may be authenticated by user device 322 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 310) as part of a new block. System 300 may perform this based on a consensus of the user devices within system 300. For example, system 300 may rely on a majority (or other metric) of the nodes in the community network to determine that the blockchain action is valid. In response to validation of the block, a node user device (e.g., user device 324) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 310, and the blockchain action is completed. For example, to add the blockchain action to blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 322) to share files, access, and/or perform a blockchain action with another user device (e.g., user device 324) and/or cryptography-based, storage application (e.g., cryptography-based, storage application 340). For example, the peer-to-peer architecture and decentralized nature allow blockchain actions to be conducted between the user devices, without the need of any intermediaries or central authorities.

Figure 4:
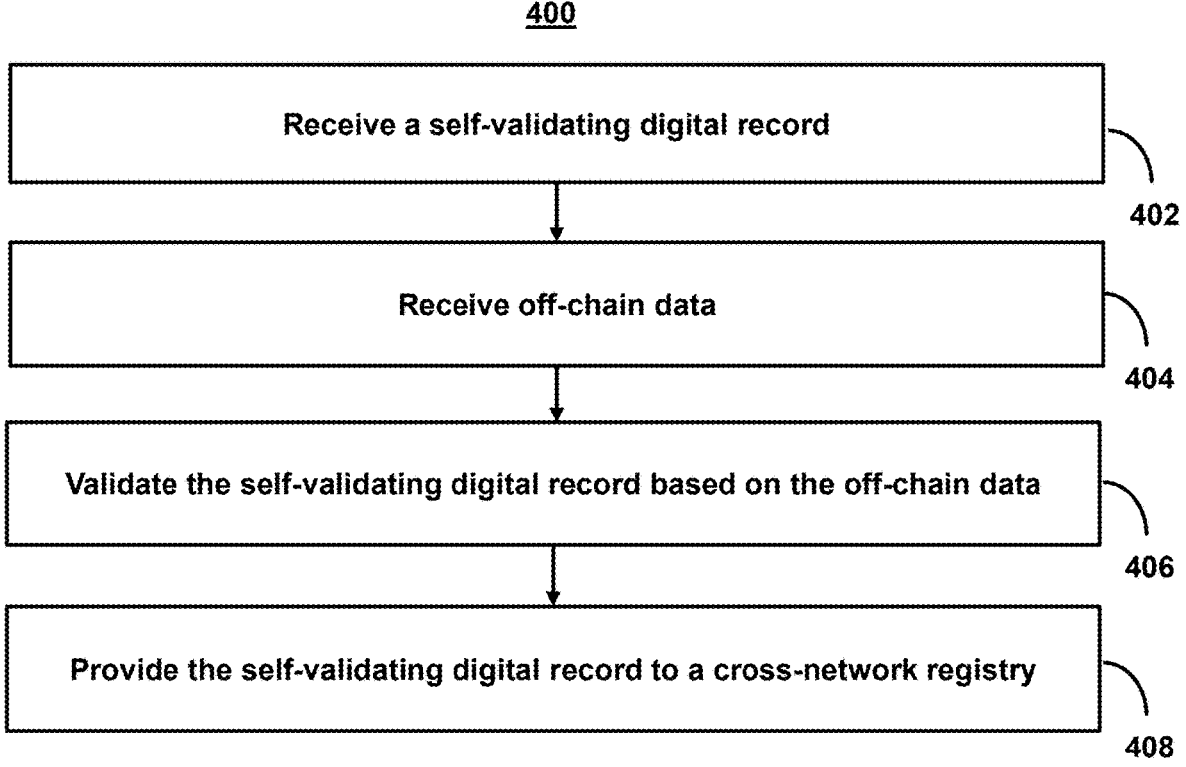
FIG. 4 shows a flowchart of the steps involved in recording transfers of self-validating digital records, in accordance with one or more embodiments.

FIG. 4 shows a flowchart of the steps involved in recording transfers of self-validating digital records across cryptographically secure networks using cross-network registries, in accordance with one or more embodiments. Process

400 may be used for executing multi-party validations and/or executing bifurcated digital signing processes (e.g., in order to facilitate a stablecoin redemption platform). For example, process 400 may describe exchanging self-validating digital records related to a stablecoin for an off-chain access (e.g., fiat currency) using a cross-network registry (e.g., used by a stablecoin redemption platform).

At step 402, process 400 (e.g., using one or more components described above) receives a self-validating digital record. For example, the system may receive, at a first off-chain server, a first self-validating digital record from a first entity, wherein the first self-validating digital record corresponds to a first off-chain record designated by the first entity to be transferred to a second entity, and wherein the first self-validating digital record comprises a first validation requirement for validating the first self-validating digital record prior to creation. As described herein, a "self-validating digital record" is a digital document or piece of data that contains built-in mechanisms for ensuring its authenticity, integrity, and validity without relying on external verification sources of the digital record. In essence, the self-validating digital record can verify itself without the need for third-party validation to do so. The self-validating digital record may validate itself using a plurality of pre-deployment validations encoded by the issuer in the self-validating digital record. The plurality of pre-deployment validations may be based on one or more pre-deployment validation characteristics.

For example, a pre-deployment validation characteristic may comprise a digital signature from one or more parties. The self-validating digital records may include digital signatures, which are cryptographic techniques used to verify the authenticity and integrity of the document. A digital signature may be generated using a private key and can be verified using a corresponding public key. If the digital signature is valid, it means the document has not been tampered with and was signed by the expected party. Accordingly, the pre-deployment validation characteristic may validate the self-validating digital record based on matching the digital signature to a predetermined digital signature.

As another example, a pre-deployment validation characteristic may comprise a timestamp. To prove the pre-deployment validation characteristic temporal authenticity, a self-validating digital record may include a timestamp that records when the document was created or modified. This timestamp is typically generated by a trusted timestamping authority, providing a reliable reference point for the self-validating digital record's existence at a particular time. Accordingly, the pre-deployment validation characteristic may validate the self-validating digital record based on matching the timestamp to a predetermined timestamp and/or range.

As another example, a pre-deployment validation characteristic may comprise a hashing. The pre-deployment validation characteristic may include a hash value, which is a fixed-length string of characters generated from the content of the document using a cryptographic hash function. Any change in the content of the self-validating digital record will result in a different hash value. By comparing the hash value with the stored value, the self-validating digital record can verify if the self-validating digital record has been altered. Accordingly, the pre-deployment validation characteristic may validate the self-validating digital record based on matching the hash to a predetermined hash.

As another example, a pre-deployment validation characteristic may comprise an embedded verification logic.

Some self-validating digital records incorporate embedded code or logic that allows the self-validating digital record to verify its integrity and authenticity automatically. For example, a pre-deployment validation characteristic may include self-executing code that checks the validity of the self-validating digital record and ensures compliance with predefined conditions. Accordingly, the pre-deployment validation characteristic may validate the self-validating digital record based on matching the embedded verification logic (or a result of the embedded logic) to a predetermined embedded verification logic.

As another example, a pre-deployment validation characteristic may comprise a blockchain action and/or blockchain characteristic. A self-validating digital record may incorporate embedded code or logic that allows the self-validating digital record to verify its integrity and authenticity automatically. For example, a pre-deployment validation characteristic may include self-executing code that checks the validity of the self-validating digital record and ensures compliance with predefined conditions. Accordingly, the pre-deployment validation characteristic may validate the self-validating digital record based on matching the blockchain action and/or blockchain characteristic (or a result thereof) to a predetermined blockchain action and/or blockchain characteristic.

As another example, a pre-deployment validation characteristic may comprise a Public Key Infrastructure (PKI). Self-validating digital records may leverage PKI systems to manage digital certificates, keys, and trust relationships, allowing for secure verification of the document's authenticity and the identity of the parties involved. Accordingly, the pre-deployment validation characteristic may validate the self-validating digital record based on matching the PKI to a predetermined PKI.

At step 404, process 400 (e.g., using one or more components described above) receives off-chain data. For example, the system may receive, at the first off-chain server, first off-chain data. In some embodiments, the system may determine a secure location for holding an off-chain record. By determining this location prior to deployment of the self-validating digital record, the system may encode the secure location (and/or mechanisms for validating data from the secure location) into the self-validating digital record.

In some embodiments, the system may determine an encoding format for a self-executing program of the self-validating digital record, wherein the self-executing program is used to process the first off-chain data. The system may format the first off-chain data based on the encoding format. Self-executing programs on blockchain networks can request data in a specific format by interacting with external data sources or oracles. Self-executing programs typically do not have direct access to external data sources, as they operate within a closed, deterministic environment (e.g., within the self-validating digital record). To request data in a specific format, they rely on oracles, which are external services or entities that provide data from off-chain sources to on-chain self-executing programs. When a self-executing program needs specific data, it makes a request to a trusted oracle service. This request includes details about the required data format, source, and any other relevant parameters. The oracle service receives the request and verifies its authenticity. This may involve checking the request against predefined criteria to ensure that it is legitimate and authorized. After verifying the request, the oracle retrieves the requested data from the off-chain source. The oracle service is responsible for formatting the data as per the specified format or converting it to the required format if necessary. The oracle provides the formatted data as a response to the self-executing program's request. This response is typically in a standardized format that the self-executing program can process. The self-executing program receives the data response from the oracle. It can then process the data according to its logic and rules, taking into account the requested format. The self-executing program can use this data to make decisions or trigger actions within the blockchain network. The trustworthiness of the oracle is crucial in this process. Self-executing programs often rely on multiple oracles or a network of oracles to provide data from diverse and reliable sources. Some blockchain platforms also implement mechanisms for aggregating and validating data from multiple oracles to ensure accuracy.

In some embodiments, the system may extract, by the first off-chain server, implementation details for creating the first self-validating digital record. The system may then generate the first validation requirement based on the implementation details. The implementation details may refer to the blockchain action and/or the asset transfers. For implantation details may include blockchain selections, wallet setups (e.g., wallet creation and management functionality, including key generation, storage, and security measures), transfer details (e.g., that define the sender's and recipient's addresses, specify the asset or token to be transferred, set the amount to be transferred, and include any additional parameters or data required for the transfer), signing details (e.g., how transactions must be digitally signed by the sender using their private key to prove ownership and authorization), block confirmation (e.g., after verification, the transaction is included in a block, and the block is added to the blockchain, and the number of confirmations can vary depending on the blockchain's security requirements), notification and status (e.g., feedback to the sender and recipient about the transaction's status), error handling (e.g., error handling and recovery mechanisms to address issues such as transaction failures, network congestion, and gas limit errors), transaction monitoring (e.g., how to monitor the blockchain for transaction events or changes in account balances to trigger additional actions or notifications), security measure (e.g., key management, encryption, and protection against common vulnerabilities such as replay attacks or double spending), user interface settings, and/or compliance requirements (e.g., to ensure compliance with legal and regulatory requirements, such as Know Your Customer (KYC) and Anti-Money Laundering (AML) regulations).

At step 406, process 400 (e.g., using one or more components described above) validates, by the first self-validating digital record, based on the off-chain data. For example, the system may determine, by the first self-validating digital record, that the first validation requirement is met based on the first off-chain data.

In some embodiments, the system may determine based on a first self-executing program of the self-validating digital record a pre-deployment validation characteristic for the first validation requirement. For example, the system may determine what criteria are required to be met to effectuate a transfer. In some embodiments, the system may determine that a given off-chain record (e.g., off-chain asset) is immobilized. The system may then determine (e.g., by the same self-executing program or another) that the pre-deployment validation characteristic corresponds to the off-chain data (e.g., data indicating that off-chain asset is immobilized at a secure location). As described herein "a pre-deployment validation characteristics," comprise a characteristic of a validation that is done prior to deployment of a self-validating digital record. The pre-deployment validation characteristic may comprise any characteristic that distinguishes it from another pre-deployment validation characteristic. For example, the pre-deployment validation characteristic may comprise a characteristic that is used to validate a digital record prior to deployment.

At step 408, process 400 (e.g., using one or more components described above) provides the self-validating digital record to a cross-network registry. For example, the system may, in response to determining that the first validation requirement is met, provide the first self-validating digital record to a cross-network registry, wherein the cross-network registry confirms transfer of the first off-chain record to the second entity by creating the first self-validating digital record on a first cryptographically secure network.

In some embodiments, the system may detect (e.g., by the first off-chain server) an instance of the first self-validating digital record on the first cryptographically secure network. The appearance of this instance on the blockchain may act as confirmation that the transfer is complete. As such, the system may generate a communication to the secure location to release the off-chain record to the second entity. For example, in some cases, asset locking may involve digital signatures and authorization mechanisms. For instance, when locking assets in a wallet for a specific transfer, the system may need to provide a digital signature to confirm the lock and verification may occur by checking the validity of the digital signature against the wallet owner's private key.

In some embodiments, the cross-network registry may also enforce one or more validation requirements. For example, the system may determine, by a fourth self-executing program at the cross-network registry, that a second validation requirement for validating the first self-validating digital record prior to creation is required. The system may determine based on a fourth self-executing program a second pre-deployment validation characteristic for the second validation requirement. The system may retrieve second off-chain data. The system may compare the second pre-deployment validation characteristic corresponds to the second off-chain data.

For example, the system may enforce geographic restrictions, wherein the second pre-deployment validation characteristic corresponds to a geographic restriction of transfers of the first off-chain record, and wherein the second off-chain data indicates a geographic location of the second entity. In another example, the system may enforce know-your-customer restriction of transfers, and the off-chain data may indicate a known customer number of the second entity. In yet another example, the system may enforce a temporal restriction of transfers, and the off-chain data may indicate a current time. In yet another example, the system may enforce a network route restriction (e.g., what networks, computer systems, geographic regions, etc.) of transfers, and the off-chain data may indicate a network route. In yet another example, the system may enforce an asset category restriction (e.g., what types of assets may be transferred) of transfers, and the off-chain data may indicate an asset type.

In some embodiments, the system may retrieve, at the cross-network registry, a compiler. The system may compile a fifth self-executing program for creating the first self-validating digital record on the first cryptographically secure network. By doing so, the system avoids the multi-chain issues with consensus mechanisms and atomicity.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

FIG. 5 shows a flowchart of the steps involved in conducting secure blockchain actions in public, non-permissioned blockchains, in accordance with one or more embodiments. For example, the system may use process 500 (e.g., as implemented on one or more system components described above) in order to conduct cryptographically secure actions in public, non-permissioned blockchains using a layer one blockchain solution featuring bifurcated self-executing programs that are compiled together. Process 500 may be used for executing multi-party validations and/or executing bifurcated digital signing processes (e.g., in order to facilitate a stablecoin redemption platform). For example, process 500 may describe conducting secure blockchain actions such as redeeming a stablecoin.

At step 502, process 500 (e.g., using one or more components described above) receives a first request. For example, the system may receive a first request, at a bifurcated self-executing program, to perform a first blockchain action, wherein the first request has a first processing characteristic. For example, the system may receive a request to perform a transaction. The bifurcated self-executing program may comprise a self-executing program that is created based on the compiling of two other self-executing programs. For example, the system may receive a first uncompiled version of the first self-executing program. The system may receive a second uncompiled version of the second self-executing program. The system may compile the first uncompiled version of the first self-executing program and the second uncompiled version of the second self-executing program to generate the bifurcated self-executing program.

At step 504, process 500 (e.g., using one or more components described above) process the first request with a first self-executing program of the bifurcated self-executing program. For example, the system may, in response to receiving the first request, process the first request with a first self-executing program of the bifurcated self-executing program. The processing characteristic may comprise a parameter that must be satisfied prior to the bifurcated self-executing program performing the blockchain action (e.g., each action may have a specific rule, privacy requirement, government regulations, contract vetting status, etc., that is a prerequisite for executing the blockchain action using the bifurcated self-executing program). By doing so, the system may ensure that the prerequisite is achieved prior to the bifurcated self-executing program executing the blockchain action.

At step 506, process 500 (e.g., using one or more components described above) may determine whether a first processing characteristic of the first request corresponds to a predetermined processing characteristic. For example, the system may determine, based on the first self-executing program, whether the first processing characteristic corresponds to a predetermined processing characteristic. The system may use this to apply various prerequisites and/or criteria for executing the bifurcated self-executing program.

In some embodiments, the system may determine whether a first request has a required security certificate. For example, the system may use the first self-executing program to ensure that required security measures are met prior to executing a blockchain action of the second self-executing program. For example, a security certificate may be used as a means to provide the security level of a program. The security certificate may comprise a digital certificate such as a Secure Socket Layer (SSL) certificate, a specific public and/or private key, etc.

For example, the system may determine, based on the first processing characteristic, a security certificate for the first request. The system may then determine, based on the predetermined processing characteristic, a security certificate requirement for the bifurcated self-executing program. The system may then determine whether the security certificate corresponds to the security certificate requirement.

In some embodiments, the system may determine whether a first request has a specific request origination. For example, the system may use the first self-executing program to ensure that only requests from a particular entity (e.g., indicated by the request origination requirement) are able to execute the second self-executing program. For example, the request origination may include an entity from which the request was issued. In some cases, the system may identify the entity based on a specific address and/or unique identifier.

For example, the system may determine, based on the first processing characteristic, a request origination for the first request. The system may determine, based on the predetermined processing characteristic, a request origination requirement for the bifurcated self-executing program. The system may determine whether the request origination corresponds to the request origination requirement.

In some embodiments, the system may determine whether a first request has a specific request validator. For example, the system may use the first self-executing program to ensure that only requests that have been vetted and/or validated by a particular entity (e.g., indicated by the request validator requirement) are able to execute the second self-executing program. For example, a request validator may be a specific entity that investigates/validates what a program does through the higher-level language the program is written in, without having to read machine code. In some cases, the system may identify the request validator based on a specific address and/or unique identifier.

For example, the system may determine, based on the first processing characteristic, a request validator for the first request. The system may determine, based on the predetermined processing characteristic, a request validator requirement for the bifurcated self-executing program. The system may determine whether the request validator corresponds to the request validator requirement.

In some embodiments, the system may determine whether a first request has a specific request validation procedure. For example, the system may use the first self-executing program to ensure that only requests that have been vetted and/or validated using a particular request validation procedure (e.g., indicated by the request validation procedure requirement) are able to execute the second self-executing program. For example, a request validation procedure may investigate/validate what a program does through the higher-level language the program is written in, without having to read machine code.

For example, the system may determine, based on the first processing characteristic, a request testing protocol procedure for the first request. The system may determine, based on the predetermined processing characteristic, a request testing protocol requirement for the bifurcated self-executing program. The system may determine whether the request testing protocol corresponds to the request testing protocol requirement.

In some embodiments, the system may determine whether a first request has met a specific notification requirement. For example, the system may use the first self-executing program to ensure that only requests that have met these additional requirements (e.g., indicated by the predetermined processing characteristic) are able to execute the second self-executing program. For example, the notification requirement may require another entity to be notified of the first request and/or the first blockchain action prior to execution. Additionally or alternatively, the notification requirement may require other information such as a confirmation of the notification, an approval of the first blockchain action, etc. For example, a third party may have an option to perform the first blockchain action (e.g., a right of first refusal) prior to the first blockchain action being executed in response to the first request.

For example, the system may determine, based on the first processing characteristic, a notification requirement for the first request, wherein the notification requirement notifies an entity of the first request. The system may receive a confirmation that the notification requirement has been satisfied. The system may determine that the response satisfies the predetermined processing characteristic.

In some embodiments, the system may determine whether a first request has a specific protocol and/or supports a specific protocol. For example, the system may use the first self-executing program to ensure that only requests that support specific protocols (e.g., know-your-customer protocols, cross-chain protocol, etc.) are able to execute the second self-executing program.

For example, the system may determine, based on the first processing characteristic, a supported protocol for the first request. The system may determine, based on the predetermined processing characteristic, a protocol requirement for the bifurcated self-executing program. The system may determine whether the supported protocol corresponds to the protocol requirement.

In some embodiments, the system may determine whether a first request and/or the blockchain action is using a specific digital asset type (e.g., a specific cryptocurrency, token type, etc.). For example, the system may use the first self-executing program to ensure that only requests and/or blockchain actions using a particular digital asset type are able to execute the second self-executing program.

For example, the system may determine, based on the first processing characteristic, a digital asset type for the first request. The system may determine, based on the predetermined processing characteristic, a digital asset type requirement for the bifurcated self-executing program. The system may determine whether the digital asset type corresponds to the digital asset type requirement.

In some embodiments, the system may determine whether a first request and/or the blockchain action supports synthetic assets. For example, the system may use the first self-executing program to ensure that only requests and/or blockchain actions that support synthetic assets are able to execute the second self-executing program. By doing so, the system may ensure that the self-executing program does not fail (e.g., if the self-executing program relies on a synthetic asset).

For example, the system may determine, based on the first processing characteristic, a synthetic asset support for the first request. The system may determine, based on the predetermined processing characteristic, a synthetic asset support requirement for the bifurcated self-executing program. The system may determine whether the synthetic asset support corresponds to the synthetic asset support requirement.

In some embodiments, the system may determine whether a first request has a required ring signature. A ring signature is a type of digital signature that can be performed by any member of a set of users that each have keys. The system may use the first self-executing program to ensure that at least one of the users has approved the first request prior to executing the blockchain action of the second self-executing program.

For example, the system may determine, based on the first processing characteristic, a ring signature for the first request. The system may determine, based on the predetermined processing characteristic, a ring signature requirement for the bifurcated self-executing program. The system may determine whether the ring signature corresponds to the ring signature requirement.

In some embodiments, a processing characteristic may comprise a digital signature characteristic. The digital signature characteristic may comprise a parameter that must be satisfied prior to the bifurcated self-executing program performing the blockchain action (e.g., each action may have a specific rule, privacy requirement, government regulations, contract vetting status, etc., that is a prerequisite for executing the blockchain action using the bifurcated self-executing program). By doing so, the system may ensure that the prerequisite is achieved prior to the bifurcated self-executing program executing the blockchain action. For example, by wrapping a first self-executing program (e.g., comprising the transaction details for the underlying transaction) within a second self-executing program (e.g., indicating specific digital signature requirements), the second self-executing program not only may enforce requirements for particular security credentials, certificates, and procedures that are enforced by the digital signature requirement but also may enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.) based on whether a digital signature requirement is met. For example, one self-executing program of the bifurcated self-executing program may add a specific privacy requirement that causes an interest rate in a transaction to be hidden, but still allows for the transaction itself to be validated and recorded on the blockchain upon receipt of a digital signature.

In some embodiments, the system may use an ASM scheme. An ASM scheme is a multi-signature scheme in which any subgroup, S, of an authorized group, G, may jointly sign a message M, ensuring that each member of S is accountable for the resulting signature. For example, the digital signature characteristic may comprise a signature based on an ASM scheme. In some embodiments, the system may use a Schnorr signature as a digital signature. A Schnorr signature is produced by the Schnorr signature algorithm. For example, the digital signature characteristic may comprise a signature based on a Schnorr signature scheme. In some embodiments, the system may use a BLS digital signature. A BLS signature is a cryptographic signature scheme which allows a user to verify that a signer is authentic. For example, the digital signature characteristic comprises a signature based on a BLS digital signature scheme.

In some embodiments, the system may use a threshold signature scheme. For example, in a (t,n)-threshold scheme, a threshold number of the group, t, is required to efficiently decrypt the ciphertext, while fewer than t have no useful information. In some embodiments, the (t,n)-threshold signature scheme may require at least t parties for creating a signature. For example, the first digital signature characteristic may be based on receiving a first portion of a private key, receiving a second portion of the private key, and generating the first digital signature characteristic based on the first portion and the second portion.

In some embodiments, the system may use a distributed key generation (DKG) scheme. A DKG scheme is a cryptographic process in which multiple parties contribute to the calculation of a shared public and private key set. Unlike most public key encryption models, distributed key generation does not rely on Trusted Third Parties. Instead, the participation of a threshold of honest parties determines whether a key pair can be computed successfully. Distributed key generation prevents single parties from having access to a private key. The involvement of many parties requires DKG to ensure secrecy in the presence of malicious contributions to the key calculation. For example, the digital signature requirement may be based on receiving a first contribution to a calculation of the digital signature requirement from a first user, receiving a second contribution to the calculation of the digital signature requirement from a second user, and calculating the digital signature requirement based on the first contribution and the second contribution.

In some embodiments, the system may use a digital signature scheme that comprises a plurality of algorithms. For example, the system may include a key generation algorithm that selects a private key uniformly at random from a set of possible private keys. The algorithm may output a private key and a corresponding public key. The scheme may also use a signature algorithm that, given a message and a private key, produces a signature. Additionally or alternatively, the scheme may use a signature verifying algorithm that, given the message, public key, and signature, either accepts or rejects the message's claim to authenticity. For example, the first digital signature characteristic may comprise a signature that is determined based on a private key, wherein the digital signature requirement comprises a determination of authenticity, by a signature verifying algorithm, based on a public key and the signature.

In some embodiments, the system may determine whether a first request has a required Multi-Party Computation (MPC) signature. MPC enables multiple parties to evaluate a computation without revealing any of their private data to computing parties. This allows for transactions to be processed without the need for private keys eliminating the only possible attack vector that could exist in a decentralized custody model. The system may use the first self-executing program to ensure that the request has been approved by the MPC signing protocol prior to executing the blockchain action of the second self-executing program. It should be noted that, as described above, communications with one or more of the self-executing programs may be encrypted to prevent data leakage. For example, signing parties, the number of signatures, and/or other details related to a signing protocol may be encrypted.

For example, the system may determine, based on the first processing characteristic, an MPC signature for the first request. The system may determine, based on the predetermined processing characteristic, an MPC signature requirement for the bifurcated self-executing program. The system may determine whether the MPC signature corresponds to the MPC signature requirement.

MPC involves the use of multiple parties, each of which holds respective private data that may be used to evaluate a computation without ever revealing any of the private data held by each party. For example, each party of the multiple parties may possess private data (e.g., $d_1$, $d_2$, . . . , $d_N$). Together, the parties may use their respective private data to compute a value of a public function: (e.g., $F(d_1, d_2, . . . , d_N)$). While the private data is used to compute a value based on the function, the private data is kept private during that process. In some embodiments, the bifurcated self-executing program may require a particular value that result from the MPC algorithm as a predetermined processing characteristic.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time. In some embodiments, the bifurcated self-executing program may require a particular storage type or storage configuration as a predetermined processing characteristic.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key). In some embodiments, the bifurcated self-executing program may require a particular storage location (or digital wallet type) as a predetermined processing characteristic.

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to twelve signature rounds, which can create latency issues. Second, they require the use of online storage for private keys. Due to the use of partial private keys (e.g., comprises an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security). In some embodiments, the bifurcated self-executing program may require a particular MPC algorithm be used by specifying the algorithm or result (e.g., in a format corresponding to the algorithm) as a predetermined processing characteristic.

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time. In some embodiments, the bifurcated self-executing program may require a particular threshold as a predetermined processing characteristic.

At step 508, process 500 (e.g., using one or more components described above) may process the first request with a second self-executing program of the bifurcated self-executing program. For example, the system may, in response to determining that the first processing characteristic corresponds to the predetermined processing characteristic, process the first request with a second self-executing program of the bifurcated self-executing program to perform the first blockchain action.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

FIG. 6 illustrates a flowchart of a process for detokenization, according to an embodiment. The process 600 describes how an application can facilitate a transaction with a conventional account and keep a record of the transaction on a distributed ledger. For example, the system may use process 600 (e.g., as implemented on one or more system components described above) in order to detokenization. Process 600 may be used for executing multi-party validations and/or executing bifurcated digital signing processes (e.g., in order to facilitate a stablecoin redemption platform). For example, process 600 may describe the detokenization process used to redeem a stablecoin.

At step 602, process 600 receives a deliver instruction from a first client device. The deliver instruction may be an instruction to transfer an asset from a source account hosted by the application (e.g., a digital wallet) into a destination account stored in a conventional system. The deliver instruction may include identifiers of the source account and the destination account. For example, the deliver instruction may be to transfer an asset to a particular transferee account from a given wallet. In some cases, the deliver instruction may include a BIC code for the application to enable the deliver instruction to be routed to the application using SWIFT messaging. In some embodiments, the application may validate the transaction request to verify that it is a valid request.

At step 604, the application may freeze the balance of the source account (e.g., the token). By doing so, the application may make the balance unavailable for any transfers. The application may then create a new deliver instruction. This new deliver instruction may indicate the destination account (which would be the same as the destination account in the original request received from the client), but the source account would now be indicated as the conventional account in the set of financial applications to which the balance in the wallet is mapped for the particular asset in question. This new deliver instruction may include details of the ultimate source account (e.g., a wallet ID). The application may then route the transaction request to the set of financial applications. The application may transmit the transaction request to the set of financial applications using conventional or custom messaging (e.g., via the sets of instructions).

In some embodiments, a set of financial applications may validate the request and route the request to a financial market infrastructure ("FMI"). The set of financial applications may validate the request using conventional request validation policies. The set of financial applications may then route the request to the FMI. The set of financial applications may do so using conventional messaging protocols (e.g., via the sets of instructions).

At step 606, the FMI may receive a receive instruction from a second client device. The FMI may receive the receive instruction from the second client device through the financial institution that maintains the destination account that was identified in the transaction request from the first client device. The FMI may receive the receive instruction after the financial institution validates the receive instruction and routes the receive instruction to the FMI via a conventional message protocol). The receive instruction may include identifications of the destination account, the source account, and the ultimate source account. The receive instruction may include a reference to the asset being transferred to the destination account.

At step 608, the FMI may match the receive instruction with the transaction request from the first client device. The FMI may match the receive instruction with the transaction request in a similar manner to the manner described above (e.g., compare the attributes (e.g., the different account identifiers and/or the identification of the asset) of the two requests and determine whether the attributes match). If the FMI determines the assets do not match, the FMI may generate an error message and stop the transaction from occurring. Otherwise, if the FMI determines the assets match, the FMI may settle the transaction by crediting the asset to the destination account and debiting the asset from the recipient account stored on the set of financial applications. The FMI may transmit (via the sets of instructions) a credit confirmation to the destination account being accessed by the second computing device and transmit (via the sets of instructions) a confirmation message for the debit to the set of financial applications.

At step 610, the application completes the transaction request. In some embodiments, the set of financial applications may receive the debit confirmation (i.e., the debit from the conventional account in the set of financial applications which maps to the wallet from which the asset is being transferred) from the FMI and then create and transmit to the application a new confirmation of the debit from the wallet. The set of financial applications may transmit the confirmation to the application using a conventional communication protocol or a custom messaging protocol (e.g., via the sets of instructions). In some embodiments, the application may receive the confirmation and burn the previously frozen token in the source account (e.g., debit the asset of the transaction from the source account).

In some embodiments, the application may transmit a debit confirmation in addition to other transaction details (e.g., transaction status messages, intraday statement, end of day statements, etc.) to the first computing device (e.g., to the source account that the first computing device is accessing). The application may do so using conventional messaging protocols (e.g., the sets of instructions) or custom messaging protocols (e.g., via the sets of instructions).

In some embodiments, if the same entity owns both the source account and the destination account (e.g., the transferor/transferee account), the user may request the application to initiate the 'receive instruction', which is usually received from a second client device. The system may only do so, in some cases, if the application is authorized to do so (e.g., has the appropriate account permissions). Further, in some cases, depending on the asset in question, a transfer over a conventional settlement network may not need matching instructions (for example, for transferring USD, it may suffice to just have a deliver instruction). In some embodiments, the recipient account in the set of financial applications is not an omnibus account. In such cases, the designation of the ultimate source account may not be needed at any stage.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
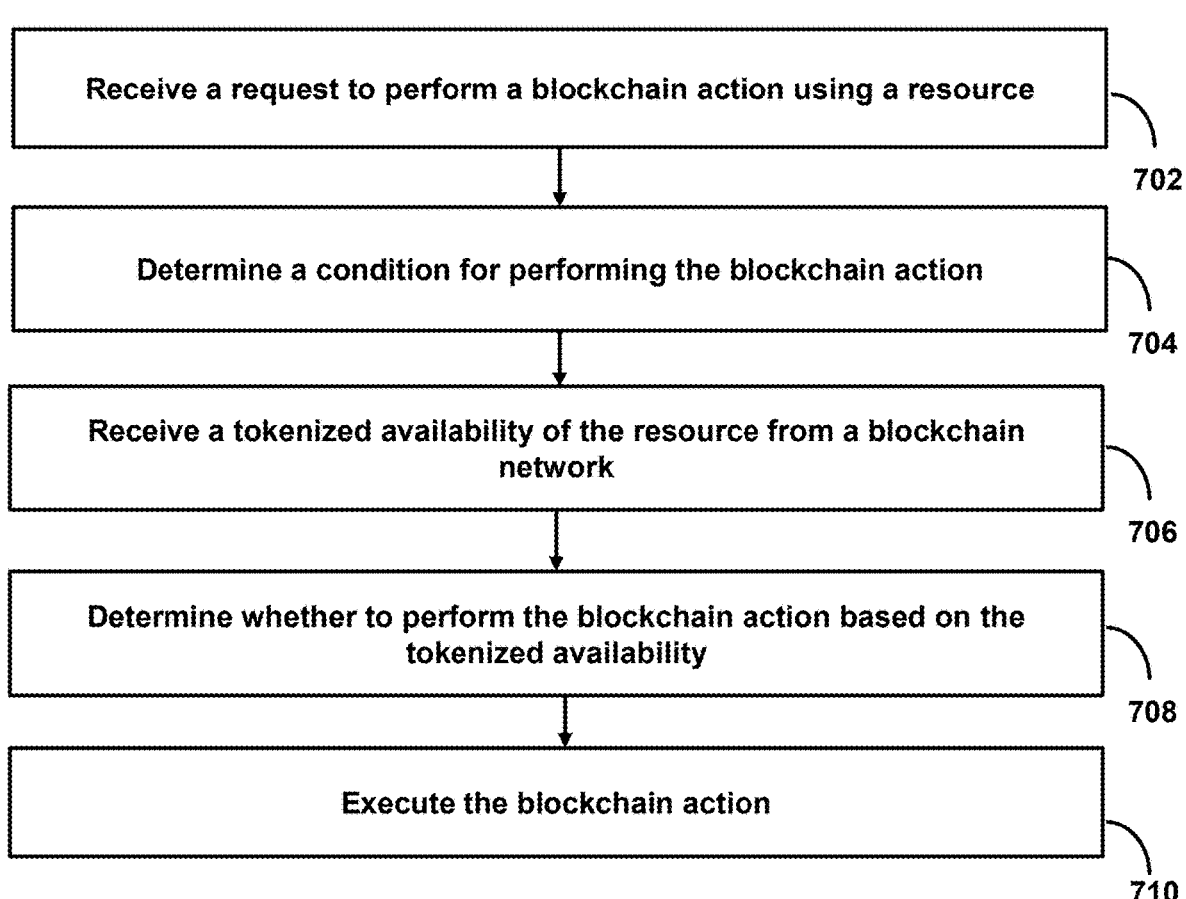
FIG. 7 shows a flowchart of the steps involved in determining availability of resources, in accordance with one or more embodiments.

FIG. 7 shows a flowchart of the steps involved in determining availability of resources across global or cloud computer networks, in accordance with one or more embodiments. For example, the system may use process 700 (e.g., as implemented on one or more system components described above) in order to determine availability of resources across global or cloud computer networks while mitigating issues related to providing services with unstable resources. For example, the system may use process 700 (e.g., as implemented on one or more system components described above) in order to in determining availability of resources executing multi-party validations and/or executing bifurcated digital signing processes (e.g., in order to facilitate a stablecoin redemption platform). For example, process 700 may describe determining an availability of resources when redeeming a stablecoin.

At step 702, process 700 (e.g., using one or more components described above) receives a request to perform a blockchain action using a resource. For example, the system may receive a first request, at a first action specific self-executing program, to perform a first blockchain action using a first resource, wherein the first blockchain action is encoded in the first action specific self-executing program.

In some embodiments, encoding the first blockchain action in the first action specific self-executing program may comprise the system (e.g., a self-executing program) receiving the first resource as a first statement in the first action specific self-executing program. A statement refers to a line or a set of instructions written in the code of the self-executing program. These statements represent specific actions, commands, or operations that the self-executing program is programmed to execute when certain conditions are met. Statements are fundamental building blocks of smart contract code. They are written using programming languages specific to the blockchain platform (e.g., Solidity for Ethereum, Chaincode for Hyperledger Fabric) and define the logic and operations of the self-executing program. Statements consist of commands, functions, or instructions that direct the smart contract on how to process data, interact with the blockchain network, manipulate variables, perform calculations, handle transactions, or execute conditional operations. Statements can include conditional structures (such as if-else statements), loops, variable assignments, function calls, event triggers, and other programming constructs that control the flow of execution within the self-executing program.

Additionally or alternatively, the system may receive a first logic in the first action specific self-executing program that determines the second resource upon execution of the first action specific self-executing program. Logic refers to the set of rules, conditions, and instructions encoded within the self-executing program's code that govern its behavior, decision-making process, and execution flow. It encompasses the logical operations, conditional statements, and procedural instructions that define how the self-executing program operates and responds to various inputs or conditions.

In some embodiments, encoding the first blockchain action in the first action specific self-executing program may comprise the system receiving a first value for satisfying the first condition. For example, the first value for satisfying the first condition may can incorporate information from external data sources, and conditions may rely on data retrieved from these sources to trigger actions. For instance, a weather-based insurance smart contract may pay out based on weather data obtained from an oracle. As another example, conditions might specify that a certain number of participants (e.g., indicated by the value) need to approve an action or that a certain amount of tokens needs to be accumulated before an action is executed. Additionally or alternatively, the system may receive a first time for satisfying a second condition. For example, the second value may be a particular action that executes the self-executing program only after a specific date, time, or a defined duration has elapsed.

At step 704, process 700 (e.g., using one or more components described above) determines a condition for performing the blockchain action. For example, the system may determine, at the first action specific self-executing program, a first condition for performing the first blockchain action, wherein the first condition is encoded in the first action specific self-executing program.

At step 706, process 700 (e.g., using one or more components described above) receives a tokenized availability of the resource from a blockchain network. For example, the system may receive, by the first action specific self-executing program, a first tokenized availability of the first resource from a first blockchain network.

At step 708, process 700 (e.g., using one or more components described above) determines whether to perform the blockchain action based on the tokenized availability. For example, the system may determine, by the first action specific self-executing program, whether to perform the first blockchain action based on comparing the first condition to the first tokenized availability.

In some embodiments, the system may determine whether to perform the first blockchain action is based on comparing the first condition to the first tokenized availability, determining a first actual availability for a first resource in a first computer network based on the first tokenized availability, and determining that the first condition corresponds to the first actual availability. For example, the system may define a specific condition or set of criteria that needs to be met for triggering a blockchain action. This condition can be related to resource availability, a specific value threshold, time-based parameters, or any other predefined rule. The system may maintain tokenized representations or digital tokens that signify the availability or capacity of resources within the computer network. These tokens could represent the available resources or their capacity in a digital form. The system may compare the condition set for the blockchain action with the tokenized availability. It checks if the condition aligns with the tokenized representation of resource availability in the network. The system may utilize the tokenized availability to derive or determine the corresponding actual availability of the resource within the computer network. This involves a process where tokenized availability is converted or mapped to reflect the real-time or current status of the resource. The system may then compare the condition specified for the blockchain action with the determined actual availability of the resource. It verifies whether the condition matches or corresponds to the verified real-time availability status of the resource within the network. Based on the comparison between the condition, tokenized availability, and actual availability, the system may make a decision regarding whether the condition aligns with the current state of the resource. If the condition matches the actual availability, the system proceeds to perform the blockchain action. If the comparison confirms that the condition corresponds to the verified actual availability, the system triggers the specified blockchain action, such as initiating a transaction, updating a smart contract, or executing a programmed function on the blockchain. The system may record the executed action on the blockchain and maintains a log or record of the process, documenting the correlation between the condition, tokenized availability, and actual resource availability for auditing or future reference.

In some embodiments, determining whether to perform the first blockchain action may be based on transmitting a second user request to complete a first off-chain action and determining that the first off-chain action is completed. For example, oracles are entities or services that provide off-chain data or trigger off-chain actions in a blockchain network. They act as bridges between the blockchain and external data sources or systems, enabling self-executing programs to interact with real-world information or execute actions that occur outside the blockchain. The self-executing program sends a request or query to the oracle, specifying the necessary information or action to be performed off-chain. This request could involve retrieving data from APIs, accessing databases, executing external systems, or any other action outside the blockchain. The oracle receives the request from the self-executing program and performs the necessary operations or accesses external resources to fulfill the requested action off-chain. This could involve interacting with external APIs, databases, sensors, or other systems.

In some embodiments, the system may select cryptographically secure digital assets (or amount thereof) based on actual availability. For example, the system may determine a first actual availability for the first resource in a first computer network. The system may determine a first cryptographically secure digital asset corresponding to the first actual availability. The system may record the first cryptographically secure digital asset in a digital log. The system may continuously monitor or periodically checks the status and availability of the resource within the computer network. This monitoring can involve network probes, status queries, or other monitoring tools to assess the resource's accessibility. Upon monitoring, the system may gather data or metrics to measure the resource's availability. It might include metrics like uptime, response time, network connectivity, or any other relevant parameters that define the resource's accessibility. Once the system determines the current availability status of the resource, it associates this verified status with a specific cryptographically secure digital asset. This asset serves as a representation or tokenization of the resource's availability. The system may employ cryptographic techniques such as hashing, encryption, digital signatures, or other secure methods to ensure the integrity, authenticity, and immutability of the digital asset associated with the resource's availability. This enhances the security and trustworthiness of the recorded information. The system may record the association between the cryptographically secure digital asset and the verified actual availability of the resource in a digital log or ledger. This log acts as a tamper-proof record of the resource's availability status over time. Each entry in the digital log is timestamped to indicate the time of recording. This helps in tracking changes, auditing the history of resource availability, and providing a chronological record of events for analysis or compliance purposes.

At step 710, process 700 (e.g., using one or more components described above) executes the blockchain action. For example, the system may execute the first blockchain action, by the first action specific self-executing program, based on determining whether to perform the first blockchain action, wherein executing the first blockchain action causes the first tokenized availability of the first resource to be transferred to a second resource.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.)

within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some embodiments, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party pays for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcasted to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

In some embodiments, executing the first blockchain action based on determining whether to perform the first blockchain action may comprise the system recording the first cryptographically secure digital asset in a digital log for the second resource. The system may determine a second actual availability for the second resource based on the first cryptographically secure digital asset. The system may transmit a second verification that the second resource has the second actual availability.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
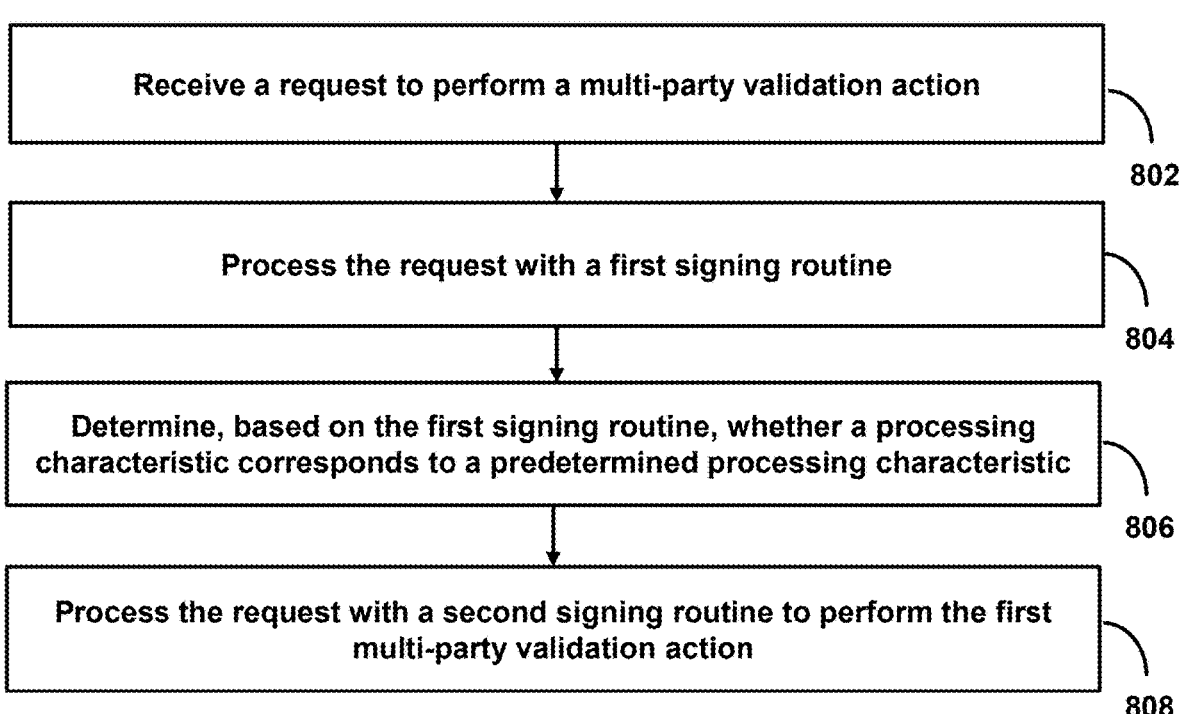
FIG. 8 shows a flowchart of the steps involved in executing multi-party validations, in accordance with one or more embodiments.

FIG. 8 shows a flowchart of the steps involved in executing multi-party validations, in accordance with one or more embodiments. For example, the system may use process 800 (e.g., as implemented on one or more system components described above) in order to execute multi-party validations. For example, process 800 may describe executing multi-party validations when redeeming a stablecoin.

At step 802, process 800 (e.g., using one or more components described above) receives a request to perform a blockchain action using a resource. For example, the system may receive a first request, at a bifurcated digital signing process, to perform a first multi-party validation action, wherein the first request has a first processing characteristic. The system may receive a first request at a bifurcated digital signing process to perform a first multi-party validation action by first identifying and processing the request based on its unique characteristics. The request may originate from a participant within a participant group and/or a user, such as a financial institution or a user initiating a transaction, and is transmitted to the system along with relevant metadata. This metadata includes information such as a unique transaction identifier, participant credentials, and cryptographic proofs required for validation. The system evaluates the request's first processing characteristic, which may define the type of validation needed, a digital record at issue, priority level, or specific compliance requirements. For instance, in a stablecoin redemption scenario, the first processing characteristic may indicate whether the request requires real-time verification or batch processing based on regulatory requirements. Once received, the system routes the request to the appropriate participant group, where the first multi-party validation action is executed. This initial validation ensures that internal checks—such as identity verification, balance confirmation, or risk assessment—are completed before progressing to the next phase of the bifurcated-signing process. The structured handling of the request, combined with cryptographic techniques like zero-knowledge proofs or multi-party computation, ensures secure and efficient validation without compromising privacy.

At step 804, process 800 (e.g., using one or more components described above) process the request with a first signing routine. For example, the system may, in response to receiving the first request, process the first request with a first signing routine of the bifurcated digital signing process. In response to receiving the first request, the system may process it using a first signing routine of the bifurcated digital signing process to validate and authenticate the request within the initiating participant group. This first signing routine ensures that the request meets predefined security, compliance, and operational criteria before progressing to a broader multi-party validation. The system first verifies the request's integrity by checking its associated metadata, such as the unique transaction identifier, participant credentials, and cryptographic proofs. It then engages with the relevant sub-participants within the participant group, such as financial institutions, client accounts, or internal validators, to confirm essential details like identity verification, fund availability, or regulatory compliance. During this stage, the system may generate an initial cryptographic signature using a partial key or threshold signature mechanism, ensuring that only authorized entities can validate and approve the request. This signature serves as proof that the first stage of verification has been successfully completed within the participant group without exposing sensitive information externally. Additionally, the system may log the validation details and timestamp the transaction to maintain an auditable trail. Once the first signing routine is completed, the system prepares the request for the second phase of the bifurcated digital signing process, where a multi-party validation action is performed across different networks or entities to finalize the transaction. By structuring the process in this way, the system ensures both security and efficiency while preserving privacy and maintaining compliance with regulatory requirements.

In some embodiments, the system may process the first request with the first signing routine of the bifurcated digital signing process by determining a first participant group corresponding to the first signing routine and verifying a first sub-participant and a first participant corresponding to the first participant group. For example, to process the first request with the first signing routine of the bifurcated digital signing process, the system begins by determining the first participant group associated with the request. This involves analyzing the request metadata, such as the group address, transaction type, participant credentials, and unique group identifier, to identify the appropriate participant group responsible for the initial validation. The participant group may include a primary participant, such as a financial institution or a service provider, and one or more sub-participants, such as individual client accounts or internal validators. Once the participant group is identified, the system proceeds to verify both the first sub-participant and the first participant to ensure that they meet the necessary authentication and authorization requirements. Verification of the first sub-participant may involve checking identity credentials, account balances, compliance status, or other validation parameters to confirm that the request is legitimate and adheres to regulatory standards. The system may use cryptographic techniques, such as zero-knowledge proofs or digital signatures, to verify this information without exposing sensitive data. Similarly, the system verifies the first participant by confirming its authorization to facilitate the signing process and ensuring that it is a recognized entity within the system's network. This may include validating its cryptographic keys, checking for prior approvals, or assessing its role in the transaction workflow. Once both the first sub-participant and the first participant are authenticated, the system proceeds with the first signing routine, generating an initial signature or threshold cryptographic proof that certifies the validation process within the participant group. This ensures that only verified and authorized requests move forward to the next stage of the bifurcated signing process, maintaining security, efficiency, and compliance throughout the transaction.

At step 806, process 800 (e.g., using one or more components described above) determine, based on the first signing routine, whether a processing characteristic corresponds to a predetermined processing characteristic. For example, the system may determine, based on the first signing routine, whether the first processing characteristic corresponds to a predetermined processing characteristic. To determine whether the first processing characteristic of the request corresponds to a predetermined processing characteristic, the system analyzes the request parameters as part of the first signing routine. The first processing characteristic may include factors such as transaction priority, regulatory classification, security level, or compliance requirements. The system may compare these characteristics against a set of predefined rules, thresholds, or policies stored within its validation framework. These predefined characteristics may be based on operational requirements, regulatory mandates, or risk assessment models. During the first signing routine, the system cross-references the request metadata—such as transaction type, participant group details, and cryptographic proofs—against the predetermined criteria. If the first processing characteristic aligns with the predefined characteristic, the system proceeds with the next phase of validation, ensuring that the request meets the necessary conditions for further multi-party processing. For example, in a stablecoin redemption scenario, if the first processing characteristic indicates that the request requires real-time processing due to high-value transactions or regulatory urgency, the system ensures that it is routed through an expedited approval workflow. If the characteristic does not match the predetermined criteria, the system may trigger additional verification steps, request further authentication from the participant group, or flag the request for manual review. This ensures that only valid, compliant, and properly authenticated requests advance to the next stage of the bifurcated digital signing process. By implementing this structured validation mechanism, the system maintains transaction integrity, reduces processing inefficiencies, and enhances security while ensuring compliance with operational and regulatory requirements.

In some embodiments, the system may determine whether the first processing characteristic corresponds to the predetermined processing characteristic by determining, based on the first processing characteristic, a security certificate for the first request, determining, based on the predetermined processing characteristic, a security certificate requirement for the bifurcated digital signing process, and determining whether the security certificate corresponds to the security certificate requirement. For example, to determine whether the first processing characteristic corresponds to the predetermined processing characteristic, the system evaluates the security requirements associated with the first request by analyzing its security certificate. This process begins by extracting and verifying the security certificate assigned to the request, which may include cryptographic credentials, digital signatures, or authentication tokens associated with the participant group. The security certificate serves as a proof of legitimacy, ensuring that the request originates from an authorized entity and adheres to the system's security policies. Next, the system identifies the security certificate requirement defined by the predetermined processing characteristic for the bifurcated digital signing process. This requirement may be established based on various factors, such as transaction type, participant risk level, regulatory classification, or system policies. For instance, high-value transactions or cross-border stablecoin redemptions may require a more stringent security certificate, such as a multi-signature verification or a certificate issued by a trusted financial authority. Conversely, lower-risk transactions may only require a basic cryptographic proof from the initiating participant. The system then compares the security certificate of the first request against the predefined security certificate requirement. If the certificate meets or exceeds the required security threshold, the system determines that the first processing characteristic aligns with the predetermined processing characteristic, allowing the request to proceed to the next phase of the bifurcated digital signing process. However, if the certificate does not meet the required standard, the system may take corrective actions such as requesting additional authentication, escalating the request for further verification, or rejecting the transaction outright. By implementing this layered validation mechanism, the system ensures that only secure, compliant, and properly authenticated requests are processed, enhancing the integrity, privacy, and trustworthiness of the overall digital signing process.

In some embodiments, the system may determine whether the first processing characteristic corresponds to the predetermined processing characteristic by determining, based on the first processing characteristic, a request origination for the first request, determining, based on the predetermined processing characteristic, a request origination requirement for the bifurcated digital signing process, and determining whether the request origination corresponds to the request origination requirement. For example, to determine whether the first processing characteristic corresponds to the predetermined processing characteristic, the system evaluates the request's origination details and verifies them against predefined requirements for the bifurcated digital signing process. This begins with the system identifying the request origination based on the first processing characteristic, which includes details such as the geographical location, network source, participant group, or initiating entity. The request origination may be extracted from metadata within the request, such as IP addresses, digital signatures, blockchain transaction records, or institutional identifiers. Once the request origination is determined, the system retrieves the corresponding request origination requirement associated with the predetermined processing characteristic. This requirement may be defined based on regulatory compliance policies, security risk levels, jurisdictional constraints, or network trust models. For example, a stablecoin redemption request originating from a high-risk jurisdiction or an unverified institution may require additional scrutiny or enhanced security checks, while a request from a pre-approved financial institution may be processed with standard validation. The system then compares the request origination with the predefined request origination requirement to assess whether they align. If the request origination meets the required conditions—such as coming from an authorized financial entity, an approved jurisdiction, or a known participant group—the system determines that the first processing characteristic matches the predetermined processing characteristic, allowing the transaction to proceed. However, if the request origination does not comply with the expected requirements, the system may trigger additional verification steps, request supplementary documentation, or flag the request for manual review. By enforcing these validation checks, the system ensures that only legitimate and properly sourced requests advance through the bifurcated digital signing process, enhancing security, compliance, and operational integrity.

In some embodiments, the system may determine whether the first processing characteristic corresponds to the predetermined processing characteristic by determining, based on the first processing characteristic, a request validator for the first request, determining, based on the predetermined processing characteristic, a request validator requirement for the bifurcated digital signing process, and determining whether the request validator corresponds to the request validator requirement. For example, to determine whether the first processing characteristic corresponds to the predetermined processing characteristic, the system evaluates the request validator responsible for verifying the first request and ensures that it meets the required standards for the bifurcated digital signing process. The process begins with the system identifying the request validator based on the first processing characteristic. This validator may be an internal entity within the participant group, such as a financial institution, regulatory body, or compliance system, or an external entity that is authorized to assess the legitimacy of the request. The system extracts relevant validation credentials from the request, such as digital signatures, cryptographic proofs, or institutional certifications, to establish the identity and authorization of the request validator. Next, the system determines the request validator requirement associated with the predetermined processing characteristic. This requirement specifies the level of authority, security credentials, or trustworthiness a validator must have to approve the request. For example, a high-value stablecoin redemption may require validation from a regulatory-approved financial institution or a multi-party consensus from multiple trusted entities, while a lower-risk request may only require validation from a single institutional participant. The system then compares the identified request validator against the predefined request validator requirement. If the request validator meets or exceeds the required validation criteria—such as possessing the necessary cryptographic keys, regulatory certifications, or institutional approval—the system determines that the first processing characteristic aligns with the predetermined processing characteristic, allowing the request to proceed. However, if the request validator does not satisfy the requirement, the system may escalate the request for further review, seek additional validation from authorized entities, or reject the transaction. By enforcing strict validator verification, the system ensures that only properly authenticated and authorized requests move forward, maintaining security, regulatory compliance, and trust in the bifurcated digital signing process.

In some embodiments, the system may determine whether the first processing characteristic corresponds to the predetermined processing characteristic by determining, based on the first processing characteristic, a request validation procedure for the first request, determining, based on the predetermined processing characteristic, a request validation procedure requirement for the bifurcated digital signing process, and determining whether the request validation procedure corresponds to the request validation procedure requirement. For example, to determine whether the first processing characteristic corresponds to the predetermined processing characteristic, the system evaluates the request validation procedure associated with the first request and ensures it aligns with the required validation procedure for the bifurcated digital signing process. This begins with the system identifying the request validation procedure based on the first processing characteristic. The validation procedure may include various steps such as identity verification, compliance checks, cryptographic proof generation, multi-party approvals, or regulatory reviews. The system extracts and analyzes the validation process details embedded in the request metadata, which may include timestamps, validator signatures, zero-knowledge proof attestations, or institutional verification records. Next, the system retrieves the request validation procedure requirement associated with the predetermined processing characteristic. This requirement defines the necessary validation steps and security measures based on transaction risk level, regulatory obligations, or security policies. For instance, a high-value stablecoin redemption or a transaction involving multiple jurisdictions may require enhanced validation procedures, such as multi-factor authentication, approval from multiple financial institutions, or real-time regulatory oversight. Conversely, a routine low-risk request may only require basic KYC verification and a single institutional approval. The system then compares the identified request validation procedure against the predefined validation procedure requirement. If the request validation procedure meets or exceeds the required standard—such as including all necessary approvals, cryptographic attestations, and security checks—the system determines that the first processing characteristic aligns with the predetermined processing characteristic, allowing the request to proceed through the bifurcated digital signing process. However, if the validation procedure does not fulfill the required criteria, the system may trigger additional validation steps, request further authentication from relevant entities, or flag the request for manual review. By ensuring strict adherence to the appropriate validation procedures, the system maintains the security, compliance, and integrity of the transaction while optimizing the efficiency of the bifurcated digital signing process.

In some embodiments, the system may determine whether the first processing characteristic corresponds to the predetermined processing characteristic by determining, based on the first processing characteristic, a request testing protocol procedure for the first request, determining, based on the predetermined processing characteristic, a request testing protocol requirement for the bifurcated digital signing process, and determining whether the request testing protocol corresponds to the request testing protocol requirement. For example, to determine whether the first processing characteristic corresponds to the predetermined processing characteristic, the system evaluates the request testing protocol procedure associated with the first request and ensures it aligns with the required testing protocol for the bifurcated digital signing process. This begins with the system identifying the request testing protocol procedure based on the first processing characteristic. The request testing protocol may involve various security and integrity checks, such as stress testing, fault tolerance assessments, cryptographic verification, simulated adversarial scenarios, or compliance stress tests. The system extracts relevant data from the request, including protocol logs, cryptographic test results, and validation timestamps, to assess whether the request has undergone the necessary pre-validation testing. Next, the system retrieves the request testing protocol requirement associated with the predetermined processing characteristic. This requirement specifies the level of testing and verification needed before a request can proceed in the bifurcated digital signing process. Depending on the complexity and sensitivity of the request, the required testing protocol may include rigorous security audits, penetration testing, blockchain consensus validation, or automated compliance simulations. For example, a high-value stablecoin redemption may require additional resilience testing to ensure it meets anti-fraud and liquidity risk standards, while a lower-risk transaction might only need basic cryptographic integrity checks. The system then compares the identified request testing protocol procedure against the predefined testing protocol requirement. If the request testing protocol meets or exceeds the required validation standard—such as passing all necessary security checks, cryptographic proofs, and regulatory compliance tests—the system determines that the first processing characteristic aligns with the predetermined processing characteristic, allowing the request to proceed to the next stage of the bifurcated digital signing process. However, if the testing protocol does not meet the expected requirement, the system may trigger additional testing, require further security assessments, or flag the request for further review. By ensuring that each request undergoes the necessary validation testing, the system strengthens the reliability, security, and compliance of the digital signing process, mitigating risks while maintaining efficiency.

In some embodiments, the system may determine whether the first processing characteristic corresponds to the predetermined processing characteristic by determining, based on the first processing characteristic, a notification requirement for the first request, wherein the notification requirement notifies an entity of the first request, receiving a confirmation that the notification requirement has been satisfied, and determining that the response satisfies the predetermined processing characteristic. For example, to determine whether the first processing characteristic corresponds to the predetermined processing characteristic, the system evaluates whether a notification requirement associated with the first request has been satisfied. This begins with the system identifying the notification requirement based on the first processing characteristic. The notification requirement specifies which entity or entities need to be informed about the request before it proceeds further in the bifurcated digital signing process. This could include financial institutions, regulatory bodies, compliance auditors, network validators, or other stakeholders who must acknowledge or approve the request before execution. The system extracts the relevant notification parameters from the request, such as recipient details, urgency level, or communication protocol, and triggers the appropriate notification process. Once the notification is sent, the system waits to receive a confirmation that the notification requirement has been fulfilled. This confirmation may come in the form of an acknowledgment receipt, a digital signature, a cryptographic attestation, or a compliance validation from the notified entity. The system verifies this confirmation against predefined response conditions, ensuring that it meets the expected security, timing, and regulatory requirements. Finally, the system determines whether the received confirmation satisfies the predetermined processing characteristic. If the response meets the expected validation criteria—such as timely acknowledgment, proper cryptographic authentication, or explicit approval from the notified entity—the system confirms that the first processing characteristic aligns with the predetermined processing characteristic. The request can then proceed to the next phase of the bifurcated digital signing process. However, if the confirmation does not meet the requirement—such as an expired acknowledgment, an unauthorized response, or a missing approval—the system may escalate the request for further review, resend the notification, or block the request from advancing. By incorporating a structured notification and acknowledgment mechanism, the system ensures transparency, regulatory compliance, and proper coordination among all necessary stakeholders, reinforcing the security and efficiency of the digital signing process.

In some embodiments, the system may determine whether the first processing characteristic corresponds to the predetermined processing characteristic by determining, based on the first processing characteristic, a supported protocol for the first request, determining, based on the predetermined processing characteristic, a protocol requirement for the bifurcated digital signing process, and determining whether the supported protocol corresponds to the protocol requirement. For example, to determine whether the first processing characteristic corresponds to the predetermined processing characteristic, the system evaluates whether the protocol used for the first request aligns with the required protocol for the bifurcated digital signing process. This process begins by identifying the supported protocol based on the first processing characteristic. The supported protocol may refer to the communication, cryptographic, or security standard used to process the request, such as a blockchain consensus mechanism, an encryption standard, a smart contract framework, or a digital signature scheme. The system extracts protocol details from the request metadata, including the transaction format, signature type, or network parameters, to establish the specific protocol utilized. Next, the system determines the protocol requirement based on the predetermined processing characteristic. The protocol requirement defines the necessary security, compatibility, and operational standards that a request must adhere to for successful processing. These requirements may vary depending on transaction sensitivity, regulatory constraints, or system security policies. For example, a high-value stablecoin redemption request may require a multi-party computation (MPC)-based signing protocol for enhanced security, while a lower-risk request might be processed using a standard elliptic curve digital signature algorithm (ECDSA). Similarly, cross-network transactions may need to comply with specific interoperability standards to ensure compatibility between different blockchain or financial networks. The system then compares the identified supported protocol against the predefined protocol requirement. If the supported protocol meets or exceeds the required standard—such as using an approved cryptographic algorithm, adhering to compliance frameworks, or following network-specific validation procedures—the system determines that the first processing characteristic aligns with the predetermined processing characteristic, allowing the request to proceed in the bifurcated digital signing process. However, if the protocol does not match the required standard—such as an unsupported signature format, an outdated encryption method, or a non-compliant transaction structure—the system may trigger a request for protocol conversion, require an additional layer of validation, or reject the request altogether. By enforcing strict protocol validation, the system ensures security, compatibility, and regulatory adherence while optimizing the efficiency and reliability of the digital signing process.

In some embodiments, the system may determine whether the first processing characteristic corresponds to the predetermined processing characteristic by determining, based on the first processing characteristic, a digital asset type for the first request, determining, based on the predetermined processing characteristic, a digital asset type requirement for the bifurcated digital signing process, and determining whether the digital asset type corresponds to the digital asset type requirement. For example, to determine whether the first processing characteristic corresponds to the predetermined processing characteristic, the system evaluates the digital asset type associated with the first request and ensures it aligns with the required digital asset type for the bifurcated digital signing process. This begins with the system identifying the digital asset type based on the first processing characteristic. The digital asset type refers to the specific category of asset involved in the transaction, such as a stablecoin, cryptocurrency, tokenized security, or non-fungible token (NFT). The system extracts the relevant metadata from the request, including blockchain network details, token standards (e.g., ERC-20, ERC-721, or ISO 20022-compliant assets), and asset issuer information, to determine the exact digital asset type. Next, the system determines the digital asset type requirement based on the predetermined processing characteristic. This requirement defines the acceptable asset types that can be processed within the bifurcated digital signing framework, ensuring compatibility, regulatory compliance, and proper validation procedures. For instance, a stablecoin redemption platform may only support redemptions for specific stablecoin issuers that comply with financial regulations, requiring the digital asset type to match approved token contracts or issuers. Similarly, certain transactions may require digital assets to be fungible, liquid, or meet predefined security and compliance standards before proceeding. The system then compares the identified digital asset type against the predefined digital asset type requirement. If the asset type meets the required standard—such as being issued on a supported blockchain, following an approved token standard, or complying with jurisdictional regulations—the system determines that the first processing characteristic aligns with the predetermined processing characteristic, allowing the request to proceed within the bifurcated digital signing process. However, if the asset type does not match the required standard—such as an unsupported token format, an unverified issuer, or a non-compliant digital security—the system may trigger additional verification steps, request asset conversion, or reject the request entirely. By enforcing strict digital asset validation, the system ensures security, regulatory compliance, and operational efficiency in digital asset transactions while maintaining the integrity of the bifurcated digital signing process.

In some embodiments, the system may determine whether the first processing characteristic corresponds to the predetermined processing characteristic by determining, based on the first processing characteristic, a Know-Your-Customer (KYC) metric for a first sub-participant of a first participant group, determining, based on the predetermined processing characteristic, a KYC requirement for the first participant group, and determining whether the KYC metric corresponds to the KYC requirement. For example, to determine whether the first processing characteristic corresponds to the predetermined processing characteristic, the system evaluates the KYC metric for a first sub-participant of a first participant group and ensures it aligns with the required KYC standard for the bifurcated digital signing process. This begins with the system identifying the KYC metric based on the first processing characteristic. The KYC metric refers to the level of identity verification and compliance status associated with the sub-participant, which may include identity authentication, financial history, risk assessment, regulatory classification, or sanctions screening. The system retrieves this information from internal records, third-party compliance databases, or blockchain-based identity verification solutions. Next, the system determines the KYC requirement for the first participant group based on the predetermined processing characteristic. This requirement defines the necessary level of KYC verification a sub-participant must meet for the request to proceed within the bifurcated digital signing process. The requirement may be based on regulatory obligations, institutional policies, or risk management standards. For instance, a high-value stablecoin redemption or cross-border transaction may require enhanced due diligence (EDD), including proof of source of funds and additional identity verification steps. Conversely, a lower-risk transaction may only require basic KYC, such as identity verification and proof of residency. The system then compares the identified KYC metric against the predefined KYC requirement. If the sub-participant's KYC metric meets or exceeds the required standard—such as having completed all necessary identity verification steps, passed compliance checks, and maintained an acceptable risk rating—the system determines that the first processing characteristic aligns with the predetermined processing characteristic, allowing the request to advance within the bifurcated digital signing process. However, if the KYC metric does not satisfy the requirement—such as an incomplete verification, an expired compliance status, or a high-risk classification—the system may trigger additional verification steps, request updated documentation, or flag the request for manual review. By enforcing strict KYC validation, the system ensures regulatory compliance, reduces fraud and financial crime risks, and maintains trust and security within the digital signing process.

In some embodiments, the system may determine whether the first processing characteristic corresponds to the predetermined processing characteristic by determining, based on the first processing characteristic, a first key for a first sub-participant in a first participant group in the multi-party validation action, determining, based on the predetermined processing characteristic, a first key requirement for the first participant group, and determining whether the first key corresponds to the first key requirement. For example, to determine whether the first processing characteristic corresponds to the predetermined processing characteristic, the system evaluates the cryptographic key used by a first sub-participant in a first participant group during the multi-party validation action and ensures it meets the required key standard for the bifurcated digital signing process. This begins with the system identifying the first key based on the first processing characteristic. The first key may be a private key, a public key, a threshold key share, or a multi-party computation (MPC) key fragment that the sub-participant uses to sign or validate the request within the participant group. The system retrieves this key from a secure key management system, a distributed key storage network, or an MPC protocol used within the validation process. Next, the system determines the first key requirement for the first participant group based on the predetermined processing characteristic. This requirement specifies the cryptographic properties the key must satisfy to ensure security, compliance, and interoperability within the bifurcated digital signing process. The requirement may include factors such as key length, encryption algorithm (e.g., RSA, ECDSA, Ed25519), security certification (e.g., FIPS 140-2 compliance), expiration policies, or the use of hardware security modules (HSMs). For example, a high-security financial transaction may require the use of an MPC-based key that ensures no single entity has full control over the signing process, while a lower-risk transaction may allow standard asymmetric cryptographic keys. The system then compares the identified first key against the predefined first key requirement. If the key meets or exceeds the necessary security and operational standards—such as using an approved cryptographic algorithm, having valid signatures from the required entities, and complying with key rotation policies—the system determines that the first processing characteristic aligns with the predetermined processing characteristic, allowing the request to proceed in the bifurcated digital signing process. However, if the key does not satisfy the requirement—such as using an outdated encryption method, failing validation checks, or being revoked due to security concerns—the system may request key reissuance, require additional authentication, or reject the request. By enforcing stringent cryptographic key validation, the system ensures secure multi-party validation, prevents unauthorized access, and maintains the integrity of the digital signing process.

In some embodiments, the system may determine whether the first processing characteristic corresponds to the predetermined processing characteristic by determining, based on the first processing characteristic, a first identity for a first sub-participant in a first participant group in the multi-party validation action, determining, based on the predetermined processing characteristic, a labeled identity for the first sub-participant known by a first participant in the first participant group, and determining whether the first identity corresponds to the labeled identity. For example, to determine whether the first processing characteristic corresponds to the predetermined processing characteristic, the system evaluates the identity of a first sub-participant in a first participant group during the multi-party validation action and ensures it aligns with the labeled identity known by the first participant in the group. This process begins with the system determining the first identity based on the first processing characteristic. The first identity may include verifiable attributes such as a unique identifier, digital signature, cryptographic proof, biometric data, or institutional account credentials. The system retrieves this identity from a secure identity management system, a decentralized identity (DID) network, or a blockchain-based authentication mechanism. Next, the system determines the labeled identity known by the first participant in the first participant group based on the predetermined processing characteristic. This labeled identity represents a pre-verified, authorized identity that the participant recognizes and trusts within the system. The labeled identity may be based on regulatory KYC (Know-Your-Customer) records, prior authentication logs, verified blockchain wallet addresses, or institutional account details associated with the sub-participant. This ensures that the sub-participant has a validated relationship with the participant group and is authorized to engage in the multi-party validation action. The system then compares the identified first identity against the labeled identity stored by the first participant. If the first identity matches or sufficiently corresponds to the labeled identity—such as through a cryptographic proof, a valid digital certificate, or an exact identifier match—the system determines that the first processing characteristic aligns with the predetermined processing characteristic, allowing the request to proceed in the bifurcated digital signing process. However, if the first identity does not correspond to the labeled identity—such as an unrecognized identifier, an expired credential, or a mismatch in authentication records—the system may trigger additional verification steps, request identity re-authentication, or flag the request for review. By enforcing strong identity validation, the system ensures that only verified and authorized sub-participants engage in the multi-party validation action, maintaining security, compliance, and trust within the digital signing process.

At step 808, process 800 (e.g., using one or more components described above) process the request with a second signing routine to perform the first multi-party validation action. For example, the system may, in response to determining that the first processing characteristic corresponds to the predetermined processing characteristic, process the first request with a second signing routine of the bifurcated digital signing process to perform the first multi-party validation action. In response to determining that the first processing characteristic corresponds to the predetermined processing characteristic, the system proceeds to process the first request using the second signing routine of the bifurcated digital signing process to execute the first multi-party validation action. This step ensures that the request, having passed the initial validation within the participant group, is now subjected to a broader multi-party verification process involving multiple independent entities. The system initiates this second signing routine by distributing the request to the relevant validators, which may include financial institutions, regulatory bodies, decentralized network participants, or other authorized stakeholders. Each participant involved in the multi-party validation action independently verifies the request using their own predefined criteria, such as compliance checks, fund verification, risk assessments, or security attestations. During this process, the system employs cryptographic techniques, such as Multi-Party Computation (MPC) or threshold signatures, to ensure that the validation is securely executed while maintaining the confidentiality of sensitive data. Each validator contributes a partial signature or cryptographic proof, which is aggregated into a composite MPC signature or threshold signature that serves as the final validation output. This ensures that no single entity has unilateral control over the signing process, enhancing security and decentralization. Once all necessary validators have completed their respective verification steps, the system assembles the collected cryptographic signatures and determines whether the multi-party validation criteria have been met. If the aggregated signatures meet the required threshold, the system finalizes the validation by recording the completed multi-party signing process on the applicable ledger or secure transaction log. The request is then approved for execution, allowing the cross-network action—such as a stablecoin redemption, asset transfer, or regulatory reporting—to be carried out. However, if the validation fails due to an insufficient number of valid signatures, inconsistencies in verification, or compliance issues, the system may trigger additional review steps, request re-validation from specific entities, or reject the request outright. By structuring the bifurcated digital signing process in this way, the system ensures that the request undergoes rigorous validation at multiple levels, combining internal verification with decentralized multi-party authorization. This approach enhances security, regulatory compliance, and transactional integrity while preserving the privacy of sensitive participant data throughout the process.

In some embodiments, the system may determine whether the first processing characteristic corresponds to the predetermined processing characteristic by determining a MPC signature component for the first multi-party validation action corresponding to the first request and submitting the MPC signature component to complete the first multi-party validation action. To determine whether the first processing characteristic corresponds to the predetermined processing characteristic, the system evaluates a MPC signature component generated during the first multi-party validation action and submits it to complete the validation process. This begins with the system identifying the MPC signature component associated with the first request, which serves as a cryptographic proof that multiple parties have independently verified and approved the request. Each participant in the multi-party validation action contributes to this process by using their respective cryptographic keys or secret shares to generate partial MPC signature components, which are then securely combined to form a composite signature. Once the MPC signature component is generated, the system verifies its integrity, ensuring that it was correctly formed based on the predetermined processing characteristic. This involves checking whether the required number of validators have participated in the signature generation process, whether the cryptographic computations meet the necessary security thresholds, and whether the aggregated signature satisfies the predefined validation criteria. For example, in a stablecoin redemption scenario, the system may require that at least a majority of financial institutions within a network contribute to the MPC signature before considering the request validated. After verification, the system submits the MPC signature component to finalize the first multi-party validation action. This submission may be recorded on a secure ledger, blockchain, or an internal transaction management system, ensuring that the validation outcome is immutable and transparent. If the submitted MPC signature successfully meets the validation requirements, the system determines that the first processing characteristic aligns with the predetermined processing characteristic, allowing the request to proceed to the next stage of execution. However, if the MPC signature component is incomplete, does not meet security thresholds, or fails to gather sufficient validator approvals, the system may trigger additional validation steps, request further participation from stakeholders, or reject the request. By leveraging MPC-based signature validation, the system ensures that no single entity has unilateral control over the authorization process, enhancing decentralization, security, and privacy in multi-party digital signing. This structured validation mechanism maintains the integrity of transactions while preventing unauthorized modifications or security breaches during cross-network actions.

In some embodiments, the system generates the bifurcated digital signing process based on receiving a first uncompiled version of the first signing routine, receiving a second uncompiled version of the second signing routine, and compiling the first uncompiled version of the first signing routine and the second uncompiled version of the second signing routine to generate the bifurcated digital signing process. For example, to generate the bifurcated digital signing process, the system integrates and compiles separate signing routines to create a cohesive, executable validation framework. This process begins with the system receiving a first uncompiled version of the first signing routine, which defines the initial validation steps within a participant group. This uncompiled version may be written in a high-level programming or scripting language and contain logic for internal participant verification, identity authentication, compliance checks, and initial cryptographic signing operations. The system stores this uncompiled version in a secure repository or development environment, preparing it for integration with the second signing routine. Simultaneously, the system receives a second uncompiled version of the second signing routine, which governs the multi-party validation process. This second signing routine includes logic for distributed cryptographic validation, multi-party computation (MPC) signature generation, external compliance verifications, and cross-network authorization steps. Since this routine is designed to engage multiple independent validators, it may contain distributed computing protocols, threshold cryptographic functions, and mechanisms for aggregating cryptographic proofs from different participant groups. Once both uncompiled versions are received, the system compiles them into a unified executable process, ensuring seamless interoperability between the first and second signing routines. The compilation process involves translating high-level code into machine-executable instructions, resolving dependencies between the routines, optimizing computational efficiency, and verifying security constraints. The system may also run pre-execution validation tests to detect errors, confirm compliance with cryptographic standards, and ensure that both routines function correctly within the overall digital signing process. After successful compilation, the system generates the bifurcated digital signing process as a fully integrated workflow that enables secure, stepwise validation of requests. The compiled process ensures that initial participant-level verifications occur in the first signing routine before progressing to the multi-party validation in the second signing routine. This approach allows for modular, efficient, and secure execution of the digital signing process, ensuring that transactions meet all security, compliance, and operational requirements before final authorization.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Figure 9:
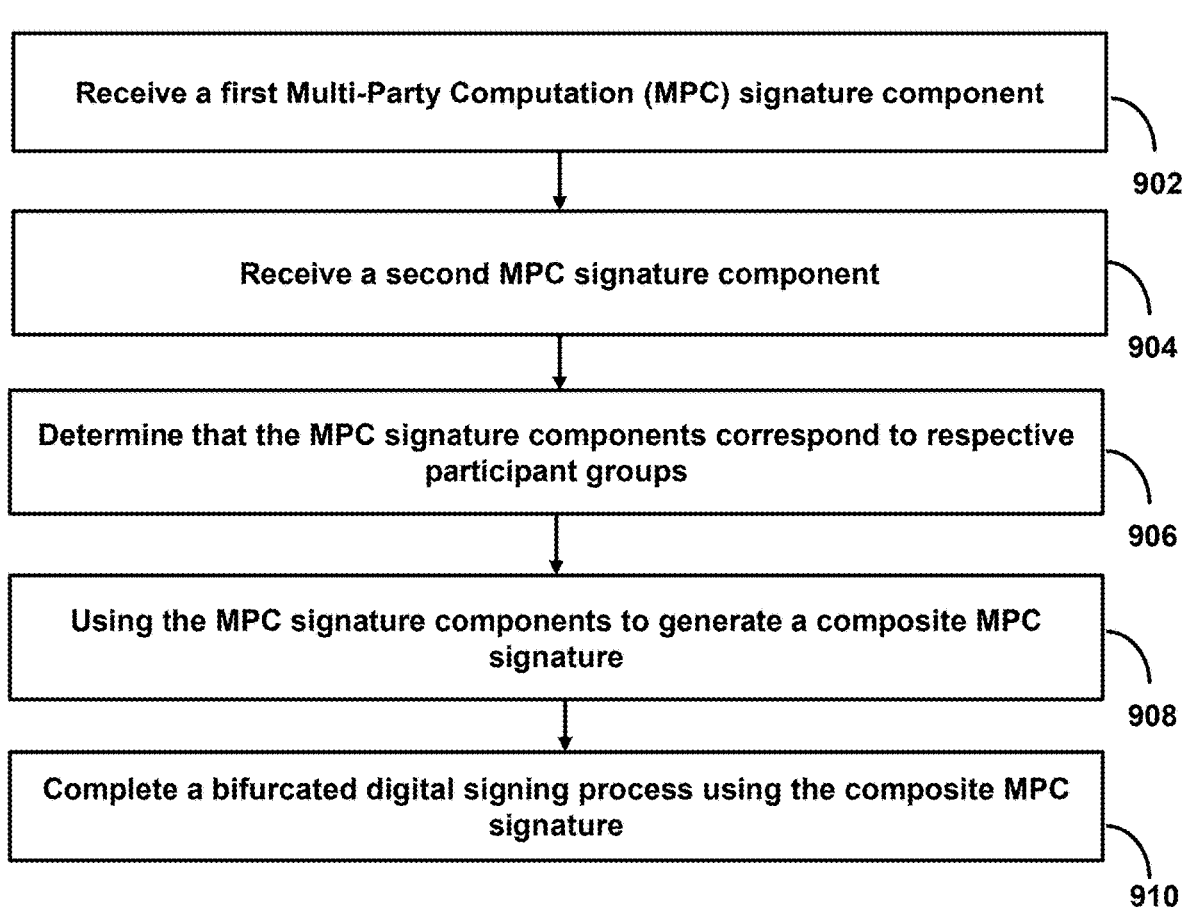
FIG. 9 shows a flowchart of the steps involved in executing multi-party validations, in accordance with one or more embodiments.

FIG. 9 shows a flowchart of the steps involved in executing multi-party validations, in accordance with one or more embodiments. For example, the system may use process 900 (e.g., as implemented on one or more system components described above) in order to execute multi-party validations. For example, process 900 may describe executing multi-party validations when redeeming a stablecoin.

At step 902, process 900 (e.g., using one or more components described above) receives a first MPC signature component. For example, the system may receive a first MPC signature component, wherein the first MPC signature component comprises a first signature address corresponding to a composite MPC signature and a first group address corresponding to a first participant group, and wherein the first MPC signature component is based on a first multi-party validation action between a first participant and a first sub-participant in the first participant group. For example, to receive a first MPC signature component, the system processes and verifies the cryptographic data generated during the first multi-party validation action within a participant group. This begins with the system identifying and receiving the first MPC signature component, which is a partial signature generated by a distributed cryptographic protocol involving a first participant and a first sub-participant in the first participant group. The MPC signature component serves as a crucial building block in constructing a final composite MPC signature that will authorize the transaction or cross-network action.

The received MPC signature component may contain a first signature address corresponding to the composite MPC signature. This signature address acts as a reference to the final cryptographic proof that will be formed once all necessary MPC components are aggregated. The system verifies that this signature address aligns with the expected cryptographic schema, ensuring that the MPC signature component contributes correctly to the overall signing process.

Additionally, the first MPC signature component may include a first group address that uniquely identifies the first participant group involved in the validation. This group address helps the system track which participant group contributed the signature component and ensures that the validation process remains properly structured. The system checks the integrity of this address to confirm that it correctly corresponds to an authorized and recognized participant group within the multi-party validation framework. Because the first MPC signature component is derived from a multi-party validation action, the system further verifies that the first participant and first sub-participant engaged in the cryptographic signing process as intended. This validation involves checking digital signatures, threshold encryption keys, or other cryptographic proofs to ensure that the signature component was generated securely and meets all required security standards.

In some embodiments, the system may receive a first cross-network action request to perform the first cross-network action, in response to receiving the first cross-network action request, determine a first network corresponding to the first cross-network action, determine the first participant group corresponding to the first network, and generate a first request for a first MPC signature component. For example, to receive and process a first cross-network action request, the system begins by capturing the request, which initiates an operation that spans multiple networks, such as a stablecoin redemption, cross-chain asset transfer, or interbank settlement. The first cross-network action request contains metadata defining the action, including transaction details, involved participants, required validations, and compliance requirements. Upon receiving this request, the system validates its format, authenticity, and integrity, ensuring that it meets the necessary cryptographic and operational criteria. Next, the system determines the first network associated with the cross-network action. This involves analyzing the request's parameters, such as blockchain identifiers, institutional routing details, or financial network metadata, to identify which network is responsible for initiating the transaction. For example, in a stablecoin redemption scenario, the system may determine that the request originates from a specific blockchain where the stablecoin is issued and needs to be settled in a corresponding financial network. Once the system identifies the first network, it determines the first participant group that corresponds to that network. The participant group consists of a primary participant—such as a bank, payment processor, or blockchain node—along with sub-participants, such as client accounts or internal verifiers. By mapping the cross-network request to the correct participant group, the system ensures that the appropriate entities handle the validation and authorization processes according to predefined security and regulatory standards.

In some embodiments, the system may receive the first MPC signature component by receiving a first request, processing the first request with a first self-executing program of a bifurcated self-executing program, determining whether a first processing characteristic of the first request corresponds to a predetermined processing characteristic, and processing the first request with a second self-executing program of the bifurcated self-executing program. For example, the system may process the first request using a first self-executing program within a bifurcated self-executing framework. This program operates as an automated smart contract or script designed to handle initial validation steps within a participant group. It evaluates critical parameters such as the request's origin, identity verification, compliance checks, and preliminary cryptographic authentication. The first self-executing program runs autonomously, ensuring that the request meets necessary conditions before advancing further in the digital signing process. Once the first self-executing program completes its validation, the system determines whether a first processing characteristic of the request corresponds to a predetermined processing characteristic. This involves checking whether key transaction attributes—such as security level, asset type, participant role, or jurisdictional requirements—align with predefined standards. If the first processing characteristic meets the predetermined criteria, the system proceeds with the next phase of the bifurcated process. Finally, the system processes the first request with a second self-executing program. This second program is responsible for facilitating the multi-party validation action required to generate the first MPC signature component. Unlike the first program, which focuses on internal validation, the second self-executing program orchestrates distributed cryptographic operations across multiple entities. It coordinates with different validators, aggregates partial cryptographic signatures, and ensures that the MPC signature component is securely generated according to threshold cryptographic protocols. Once the second self-executing program completes its operations, the system receives and records the first MPC signature component, which can then be used in the broader bifurcated digital signing process. This structured approach ensures a secure, automated, and privacy-preserving mechanism for multi-party validation, enhancing the integrity and efficiency of digital transactions.

At step 904, process 900 (e.g., using one or more components described above) receives a second MPC signature component. For example, the system may receive a second MPC signature component, wherein the second MPC signature component comprises a second signature address corresponding to the composite MPC signature and a second group address corresponding to a second participant group, and wherein the second MPC signature component is based on a second multi-party validation action between a second participant and a second sub-participant in the second participant group. For example, once the system successfully receives, verifies, and stores the first MPC signature component, it prepares for the next phase of the bifurcated digital signing process. This may involve collecting additional MPC signature components from other participants or aggregating the components to generate the final composite MPC signature required for transaction authorization. By structuring the process in this way, the system ensures secure, distributed, and privacy-preserving validation while maintaining compliance with cryptographic and operational standards.

In some embodiments, the system may execute the first multi-party validation action by receiving a first request, at a bifurcated digital signing process, to perform the first multi-party validation action, wherein the first request has a first processing characteristic, in response to receiving the first request, processing the first request with a first signing routine of the bifurcated digital signing process, determining, based on the first signing routine, whether the first processing characteristic corresponds to a predetermined processing characteristic, and, in response to determining that the first processing characteristic corresponds to the predetermined processing characteristic, processing the first request with a second signing routine of the bifurcated digital signing process to perform the first multi-party validation action.

In some embodiments, the system may perform the first multi-party validation action by receiving a self-validating digital record, receiving off-chain data, validating the self-validating digital record based on the off-chain data, and providing the self-validating digital record to a cross-network registry. For example, to perform the first multi-party validation action, the system integrates both on-chain and off-chain verification mechanisms to ensure the authenticity and compliance of the transaction before registering it in a cross-network registry. The process begins with the system receiving a self-validating digital record, which is a cryptographically signed data structure containing transaction details, participant identifiers, cryptographic proofs, and any necessary compliance attestations. This digital record may be generated on a blockchain, within a multi-party computation (MPC) framework, or through a decentralized identity verification protocol. Its self-validating nature means that it carries inherent cryptographic integrity, allowing validators to confirm its authenticity without relying on a central authority. Next, the system receives off-chain data to supplement and verify the digital record. This off-chain data may include KYC/AML compliance records, financial institution attestations, regulatory approvals, risk assessment reports, or external API feeds from trusted third-party sources. Since blockchain-based records alone may not always provide complete contextual information, integrating off-chain data ensures a more comprehensive validation process. The system securely retrieves this data through decentralized oracles, private institutional databases, or permissioned verification channels, ensuring privacy and data integrity. The system then validates the self-validating digital record based on the off-chain data by cross-referencing both datasets. It checks for consistency between the on-chain transaction details and the externally verified information, ensuring that identity credentials match, transaction limits are adhered to, and compliance checks are satisfied. This validation may involve cryptographic techniques such as zero-knowledge proofs (ZKPs) or hash-based attestations, which allow the system to confirm the integrity of the off-chain data without exposing sensitive information. If discrepancies or risks are detected, the system may trigger additional validation steps, request further documentation, or flag the transaction for manual review. Once validated, the system provides the self-validating digital record to a cross-network registry. This registry acts as a shared ledger or compliance database that maintains records of validated transactions across different networks, such as blockchain ecosystems, financial institutions, and regulatory bodies. By registering the validated digital record, the system ensures that all relevant stakeholders have access to a tamper-proof, auditable record of the transaction, enabling seamless interoperability and transparency between different networks. This final step completes the first multi-party validation action, allowing the transaction to proceed with confidence in its security, authenticity, and regulatory compliance.

In some embodiments, the system may perform the first multi-party validation action by determining a security certificate for the first sub-participant of the first participant group, determining a security certificate requirement for a bifurcated digital signing process for the first participant group, and determining whether the security certificate corresponds to the security certificate requirement. For example, to perform the first multi-party validation action, the system ensures that the first sub-participant in the first participant group meets the necessary security standards by verifying its security certificate against predefined requirements for the bifurcated digital signing process. This process begins with the system determining the security certificate for the first sub-participant, which serves as a cryptographic credential to authenticate its identity, validate its authority, and confirm its compliance with security protocols. The security certificate may be a digital signature, an SSL/TLS certificate, a blockchain-based identity credential, or an institutional authentication token. The system retrieves this certificate from a secure identity management system, a decentralized identity registry, or an on-chain smart contract to ensure that the sub-participant is recognized within the network. Next, the system determines the security certificate requirement for the bifurcated digital signing process within the first participant group. This requirement specifies the minimum security standards that the sub-participant must meet to participate in the multi-party validation action. These requirements may include cryptographic strength (e.g., RSA-2048, ECDSA, or post-quantum cryptography), certificate expiration policies, regulatory compliance (e.g., GDPR, SOC 2, ISO 27001), or institutional accreditation. The system may also assess whether the certificate is issued by a trusted certificate authority (CA) or derived from an on-chain decentralized identity framework. Once both the sub-participant's security certificate and the predetermined requirement are identified, the system determines whether the security certificate corresponds to the security certificate requirement by performing a cryptographic verification. This includes checking the certificate's validity, ensuring it has not expired or been revoked, confirming the issuing authority, and validating the signature using a public key infrastructure (PKI) or blockchain-based verification method. If the security certificate meets the required standard, the system confirms that the sub-participant is authorized to proceed within the multi-party validation action. However, if the certificate does not meet the requirement— due to expiration, an untrusted issuer, or insufficient cryptographic strength—the system may request an updated certificate, escalate the validation for manual review, or reject the request. By enforcing strict security certificate validation, the system ensures that only authorized, verified entities participate in the bifurcated digital signing process, thereby enhancing transaction integrity, security, and regulatory compliance within the multi-party validation framework.

In some embodiments, the system may perform the first multi-party validation action by determining a request origination for a first sub-participant of the first participant group, determining a request origination requirement for the bifurcated digital signing process for the first participant group, and determining whether the request origination corresponds to the request origination requirement. For example, to perform the first multi-party validation action, the system ensures that the request from the first sub-participant of the first participant group originates from an approved source by validating it against predefined request origination requirements for the bifurcated digital signing process. The process begins with the system determining the request origination for the first sub-participant, which involves identifying where the request was initiated. This could include extracting metadata such as the originating IP address, geographic location, network identifier, device signature, blockchain wallet address, or institutional account information. The system retrieves this data from secure transaction logs, blockchain records, or external authentication mechanisms to establish a verifiable request source. Next, the system determines the request origination requirement for the bifurcated digital signing process within the first participant group. This requirement defines the acceptable parameters for request origination, ensuring that only authorized sub-participants from approved jurisdictions, networks, or institutions can engage in the validation process. The requirement may specify approved IP ranges, geolocation constraints, blockchain network identifiers, institutional membership, or compliance with jurisdictional regulations such as KYC/AML standards. The system may also cross-reference the origination details against a whitelist of trusted sources or a blacklist of restricted locations. Once the request origination is identified and the requirement is determined, the system determines whether the request origination corresponds to the request origination requirement by performing a detailed verification check. If the request originates from an approved source—such as a recognized financial institution, a verified blockchain address, or a secure enterprise network—the system validates the request and allows the sub-participant to proceed with the multi-party validation action. However, if the request origination does not meet the required standards—such as originating from an untrusted IP address, a high-risk jurisdiction, an unauthorized network, or an unverified entity—the system may flag the request for further review, request additional authentication, or reject the transaction outright. By implementing strict request origination validation, the system ensures that only legitimate and authorized requests participate in the bifurcated digital signing process, enhancing security, regulatory compliance, and trust in the multi-party validation framework.

In some embodiments, the system may perform the first multi-party validation action by determining a notification requirement for the first multi-party validation action, wherein the notification requirement notifies a first sub-participant of the first participant group, and receiving a confirmation that the notification requirement has been satisfied. To perform the first multi-party validation action, the system ensures that all necessary participants are properly informed by enforcing a notification requirement before proceeding with the validation process. The system begins by determining the notification requirement for the first multi-party validation action, which specifies that a notification must be sent to a first sub-participant of the first participant group. This requirement ensures that the sub-participant is aware of and acknowledges their role in the validation process before contributing to the multi-party computation (MPC) signature or other cryptographic approval mechanisms. The notification requirement may vary based on the type of transaction, regulatory requirements, or security policies and may involve specific communication protocols such as encrypted messaging, API calls, blockchain event triggers, or institutional authentication alerts. Once the notification requirement is identified, the system notifies the first sub-participant through the designated communication channel. The notification may include transaction details, cryptographic challenge requests, compliance verification steps, or an authentication prompt requiring explicit confirmation from the sub-participant. Depending on the security policies, the system may require multi-factor authentication (MFA), biometric verification, or a digital signature to confirm receipt and approval of the request. After sending the notification, the system receives a confirmation that the notification requirement has been satisfied. This confirmation serves as proof that the sub-participant has acknowledged and, if necessary, authenticated the request before participating in the validation action. The confirmation may come in the form of a signed message, a cryptographic proof, a transaction acknowledgment recorded on-chain, or an institutional approval response. The system verifies the confirmation by checking its validity, timestamp, and authenticity against predefined security requirements. If the confirmation is successfully validated, the system proceeds with the first multi-party validation action, allowing the sub-participant to contribute to the MPC signature or other multi-party verification steps. However, if the confirmation is not received or fails validation—such as due to an expired request, unauthorized response, or missing authentication—the system may trigger additional security measures, escalate the request for further review, or reject the transaction outright. By enforcing a structured notification and confirmation process, the system ensures that all necessary participants are informed and actively engaged in the validation process, enhancing security, transparency, and compliance in the bifurcated digital signing framework.

In some embodiments, the system may perform the first multi-party validation action by determining a digital asset type for the first multi-party validation action, determining a digital asset type requirement for the first multi-party validation action, and determining whether the digital asset type corresponds to the digital asset type requirement. For example, to perform the first multi-party validation action, the system ensures that the digital asset involved in the transaction meets the necessary criteria by verifying its type against predefined requirements. The process begins with the system determining the digital asset type for the first multi-party validation action. This involves identifying the specific category of digital asset being processed, such as a stablecoin, cryptocurrency, tokenized security, central bank digital currency (CBDC), or non-fungible token (NFT). The system retrieves asset details from the transaction request, on-chain metadata, or smart contract interactions, confirming attributes such as asset class, issuing authority, blockchain network, and token standard (e.g., ERC-20, ERC-721, ISO 20022). Next, the system determines the digital asset type requirement for the first multi-party validation action. This requirement outlines the accepted asset types that can be processed under the bifurcated digital signing process and ensures compliance with regulatory, security, and operational policies. The requirement may specify supported blockchain networks, approved token standards, issuer verification rules, or compliance with financial regulations. For instance, a stablecoin redemption request may require the asset to be issued by a verified institution and comply with specific regulatory frameworks, while an NFT-related transaction may require verification of provenance and ownership records. After identifying the digital asset type and its corresponding requirement, the system determines whether the digital asset type corresponds to the digital asset type requirement by performing a structured validation. This includes checking whether the asset is on a supported blockchain, verifying that its token standard matches the required format, ensuring it is issued by an approved entity, and confirming that it adheres to compliance regulations. If the digital asset type satisfies the requirement, the system proceeds with the multi-party validation action, allowing participants to sign and authorize the transaction through cryptographic means such as Multi-Party Computation (MPC) or threshold signatures. However, if the digital asset type does not meet the requirement—such as an unsupported blockchain network, an unverified token issuer, or an asset failing compliance checks—the system may trigger additional verification steps, request reclassification, or reject the transaction. By enforcing strict digital asset validation, the system ensures that only authorized and compliant assets are processed, enhancing security, regulatory compliance, and trust in the multi-party validation framework.

In some embodiments, the system may perform the first multi-party validation action by determining a Know-Your-Customer (KYC) metric for the first sub-participant of the first participant group, determining a KYC requirement for the first participant group, and determining whether the KYC metric corresponds to the KYC requirement. For example, to perform the first multi-party validation action, the system ensures that the first sub-participant of the first participant group meets the necessary KYC requirements by evaluating the sub-participant's compliance status against predefined KYC standards. This process begins with the system determining a KYC metric for the first sub-participant, which includes retrieving relevant identity verification data such as government-issued identification, proof of address, financial transaction history, risk scoring, and regulatory compliance status. The KYC metric may also include biometric authentication records, digital identity credentials, or blockchain-based identity attestations. The system obtains this information from institutional records, third-party compliance providers, or decentralized identity verification platforms. Next, the system determines the KYC requirement for the first participant group, defining the minimum KYC standards that must be met for the sub-participant to take part in the bifurcated digital signing process. This requirement is set based on financial regulations, institutional policies, and risk management frameworks, ensuring that only verified and legally compliant entities participate in the validation process. The requirement may specify different levels of KYC compliance, such as basic KYC (requiring only identity verification), enhanced due diligence (EDD) (requiring proof of source of funds and detailed financial history), or continuous monitoring (requiring periodic updates and real-time risk scoring). The system retrieves these requirements from a pre-configured rule set, regulatory databases, or policy enforcement modules. The system then determines whether the KYC metric corresponds to the KYC requirement by cross-referencing the sub-participant's KYC status with the predefined compliance threshold. If the metric meets or exceeds the required standard—such as an individual or institution passing all identity verification checks, having an acceptable risk profile, and complying with jurisdictional regulations—the system approves the sub-participant for the multi-party validation action. This allows the participant to contribute to the cryptographic signing process, such as generating a Multi-Party Computation (MPC) signature component or approving a transaction. However, if the KYC metric does not meet the requirement—such as missing documentation, an expired verification status, or a high-risk classification due to suspicious activity—the system may take corrective actions. These actions could include requesting additional verification documents, escalating the review to compliance officers, flagging the transaction for further scrutiny, or outright rejecting the request. By enforcing strict KYC validation, the system ensures compliance with anti-money laundering (AML) regulations, reduces fraud risks, and enhances trust in the multi-party validation framework while maintaining the integrity and security of the digital signing process.

In some embodiments, the system may perform the first multi-party validation action by determining a first key for the first sub-participant in the first participant group, determining a first key requirement for the first participant group, and determining whether the first key corresponds to the first key requirement. For example, to perform the first multi-party validation action, the system ensures that the first sub-participant in the first participant group is using an authorized cryptographic key that meets predefined security and operational requirements. This process begins with the system determining the first key for the first sub-participant, which involves retrieving the cryptographic key used for authentication, signing, or encryption. The key may be a public-private key pair, a threshold key share in a Multi-Party Computation (MPC) protocol, or a hardware-backed key stored in a secure enclave or Hardware Security Module (HSM). The system verifies key attributes such as key type (e.g., RSA, ECDSA, Ed25519), key length, issuing authority, and expiration status. This information is retrieved from the sub-participant's identity records, blockchain wallet, or institutional key management system. Next, the system determines the first key requirement for the first participant group, specifying the cryptographic standards and security policies that must be met for participation in the multi-party validation action. The requirement may include constraints such as key strength (e.g., 256-bit elliptic curve keys), algorithm type, expiration policies, compliance with regulatory security standards (e.g., FIPS 140-2, ISO 27001), and whether the key must be generated and stored within a trusted execution environment. The system retrieves these requirements from the network security policies, compliance databases, or institutional governance frameworks. The system then determines whether the first key corresponds to the first key requirement by performing a cryptographic validation check. This involves verifying the integrity and validity of the key, checking that it has not been revoked or compromised, ensuring it is properly linked to the sub-participant, and confirming that it meets the necessary security requirements. If the key meets or exceeds the required standards—such as using an approved cryptographic algorithm, being issued by a trusted certificate authority, and being stored securely—the system approves the sub-participant's participation in the multi-party validation action. This allows the sub-participant to contribute to generating the MPC signature component or signing the transaction as part of the bifurcated digital signing process. However, if the key does not satisfy the requirement—such as being expired, issued from an untrusted source, using outdated encryption, or failing integrity checks—the system may take corrective actions. These actions could include requesting a key update, triggering re-authentication, requiring additional validation from a trusted authority, or rejecting the transaction entirely. By enforcing strict cryptographic key validation, the system ensures the security, integrity, and compliance of the multi-party validation action, preventing unauthorized access and maintaining the robustness of the digital signing process.

In some embodiments, the system may perform the first multi-party validation action by determining a first identity for a first sub-participant in the first participant group, determining a labeled identity for the first sub-participant known by a first participant in the first participant group, and determining whether the first identity corresponds to the labeled identity. For example, the system may perform the first multi-party validation action, the system ensures that the first sub-participant in the first participant group is properly identified and corresponds to a recognized entity within the participant group. The process begins with the system determining the first identity for the first sub-participant, which involves extracting identity credentials from authentication records, blockchain-based identity attestations, or institutional databases. The identity may include verifiable attributes such as a digital signature, government-issued identification, biometric data, an enterprise-issued certificate, or a blockchain wallet address linked to a known entity. The system retrieves this identity from secure storage, decentralized identity (DID) frameworks, or cryptographic verification mechanisms. Next, the system determines the labeled identity for the first sub-participant, which is the pre-verified and trusted identity known by the first partici-pant in the participant group. This labeled identity represents the officially recognized identity stored within the system's participant group registry and is used to ensure consistency and prevent unauthorized access. It may be derived from prior KYC (Know-Your-Customer) verification, institu-tional account records, digital ledger registrations, or cryp-tographic binding mechanisms, ensuring that the sub-par-ticipant is a legitimate and authorized entity within the participant group. The system then determines whether the first identity corresponds to the labeled identity by perform-ing a structured verification check. This includes comparing cryptographic signatures, matching identity attributes, veri-fying authentication timestamps, and ensuring that the sub-participant's credentials align with the pre-registered iden-tity. If the first identity matches the labeled identity—such as through a valid cryptographic proof, biometric confirmation, or successful institutional record lookup—the system con-firms that the sub-participant is authorized to participate in the first multi-party validation action. This allows the sub-participant to contribute to cryptographic signing processes, such as generating a Multi-Party Computation (MPC) sig-nature component or approving a transaction as part of the bifurcated digital signing process. However, if the identity does not match—such as an unrecognized signature, a revoked identity certificate, or a mismatch in authentication records—the system may take corrective actions. These actions could include requesting additional verification from the sub-participant, escalating the identity check for manual review, or rejecting the request entirely to prevent unauthor-ized participation. By enforcing strong identity validation, the system ensures that only legitimate and authorized entities participate in the multi-party validation action, enhancing security, trust, and compliance in the digital signing process.

At step 906, process 900 (e.g., using one or more com-ponents described above) determines that the MPC signature components correspond to respective participant groups. For example, the system may determine that the first MPC signature component corresponds to the first participant group and that the second MPC signature component cor-responds to the second participant group. To determine that the first MPC signature component corresponds to the first participant group and that the second MPC signature com-ponent corresponds to the second participant group, the system performs a structured validation process that links each signature component to its respective participant group. The process begins with the system receiving the first and second MPC signature components, which are generated as part of the bifurcated digital signing process. Each MPC signature component is a cryptographic proof that multiple entities within a participant group have independently veri-fied and approved the transaction. The system then validates the first MPC signature component by checking its associ-ated metadata, which includes a group address or unique identifier that links the signature to the first participant group. This group address may be a blockchain-based iden-tifier, a cryptographic key namespace, or a digital ledger entry that ties the signature to the specific network or institutional entity that generated it. The system cross-references this group address with the registered details of the first participant group, ensuring that the first MPC signature component was created by the correct set of authorized validators within that group. Similarly, the sys-tem validates the second MPC signature component by extracting and analyzing its associated metadata to confirm that it originates from the second participant group. The system verifies that the second MPC signature component was generated using the correct cryptographic processes and threshold signing mechanisms required by the second par-ticipant group. This verification process may involve check-ing digital certificates, validating cryptographic proofs, and ensuring that the second participant group's pre-approved validators contributed to the signature. Once both MPC signature components are validated and linked to their respective participant groups, the system ensures that they collectively contribute to the formation of a composite MPC signature required for cross-network transaction finalization. If the validation is successful, the system proceeds with processing the transaction, ensuring that both participant groups have properly authenticated the request. However, if either MPC signature component fails to correspond to its respective participant group—due to mismatched group addresses, invalid cryptographic proofs, or unauthorized key usage—the system may reject the transaction, request addi-tional verification, or flag it for further review. By enforcing this structured validation, the system ensures security, integ-rity, and compliance in the multi-party digital signing pro-cess.

At step 908, process 900 (e.g., using one or more com-ponents described above) using the MPC signature compo-nents to generate a composite MPC signature. For example, the system may, in response to determining that the first MPC signature component corresponds to the first partici-pant group and that the second MPC signature component corresponds to the second participant group, use the first MPC signature component and the second MPC signature component to generate the composite MPC signature. In response to determining that the first MPC signature com-ponent corresponds to the first participant group and that the second MPC signature component corresponds to the second participant group, the system proceeds to generate the com-posite MPC signature, which serves as the final crypto-graphic proof required for transaction authorization. The composite MPC signature is constructed by securely aggre-gating the individual MPC signature components while ensuring that the integrity, authenticity, and security of the signing process are maintained. To generate the composite MPC signature, the system first retrieves and validates both the first and second MPC signature components, ensuring that they were independently generated by their respective participant groups following the multi-party validation pro-cess. Each component is a partial cryptographic signature produced using a distributed key-sharing scheme, such as threshold cryptography or Shamir's Secret Sharing, ensuring that no single participant has full control over the final signature. Next, the system performs a cryptographic aggre-gation process, which involves combining the first and second MPC signature components using a secure crypto-graphic scheme, such as Lagrange interpolation for thresh-old signatures or homomorphic encryption techniques that allow for the secure merging of partial signatures without exposing private key material. The system ensures that the composite signature maintains the necessary cryptographic properties, such as non-repudiation, authenticity, and resis-tance to tampering, by verifying that the aggregated result correctly aligns with the underlying transaction data. Once the aggregation process is complete, the system generates the final composite MPC signature, which now represents the collective approval of both participant groups. This composite signature is then used as a proof of authorization for the cross-network action, such as a stablecoin redemption, cross-chain asset transfer, or interbank settlement. The system may then record the composite signature on a blockchain ledger, institutional transaction log, or decentralized verification registry to provide an immutable audit trail of the validated transaction. If at any stage the system detects an inconsistency—such as an invalid MPC component, a mismatched threshold signature, or an unauthorized participant attempt—it may trigger an error-handling routine, requiring revalidation, additional authentication, or rejection of the transaction. By leveraging a structured cryptographic aggregation process, the system ensures that the final composite MPC signature upholds security, privacy, and integrity while enabling seamless multi-party validation in decentralized or cross-network financial environments.

At step 910, process 900 (e.g., using one or more components described above) complete a bifurcated digital signing process using the composite MPC signature. For example, the system may complete a bifurcated digital signing process for a first cross-network action based on the composite MPC signature. For example, to complete the bifurcated digital signing process for a first cross-network action, the system finalizes the transaction authorization based on the composite MPC signature, ensuring that all required parties have securely validated and approved the action. The process begins with the system retrieving and verifying the composite MPC signature, which serves as the final cryptographic proof generated from the aggregated MPC signature components contributed by multiple participant groups. The system checks that the composite signature maintains cryptographic integrity, confirming that it meets the required security properties such as authenticity, non-repudiation, and resistance to forgery.

Once the composite MPC signature is validated, the system links it to the first cross-network action, ensuring that the transaction details match the original request that was signed by the participant groups. This step prevents signature reuse or unauthorized alterations to the transaction. The system then records the composite MPC signature on a secure registry, which could be a blockchain ledger, institutional transaction log, or decentralized identity verification system, providing an immutable proof of authorization. Next, the system executes the cross-network action, leveraging the validated composite MPC signature as authorization. Depending on the nature of the action, this may involve transferring digital assets, executing a stablecoin redemption, settling an interbank transaction, or triggering a smart contract function across multiple networks. The system ensures that the execution follows predefined rules, including compliance checks, network compatibility requirements, and real-time reconciliation mechanisms. Finally, the system confirms the completion of the bifurcated digital signing process by broadcasting the finalized transaction to all relevant stakeholders. This may include notifying participant groups, updating transaction status records, or synchronizing changes across different networks. If required, the system may also trigger an audit or compliance report, ensuring that all validation steps align with regulatory requirements. If any inconsistencies arise—such as an invalid composite MPC signature, a failed transaction execution, or a mismatch in participant authorization—the system initiates an error-handling routine, which could involve retrying the validation process, requesting additional approvals, or rejecting the transaction. By structuring the bifurcated digital signing process in this way, the system ensures secure, decentralized, and privacy-preserving authorization for complex cross-network actions, maintaining trust and compliance in multi-party financial and digital transactions.

In some embodiments, the system may complete the bifurcated digital signing process for the first cross-network action based on the composite MPC signature by generating a first notification to the first participant to complete a first multi-party action and generating a second notification to the second participant to complete a second multi-party action. For example, once the composite MPC signature is verified, the system generates a first notification to the first participant, instructing them to complete a first multi-party action as part of the transaction finalization. This notification serves as an authorization trigger, confirming that the first participant group's validation is complete and that they can proceed with their designated role in executing the cross-network action. The notification may contain key transaction details, a cryptographic reference to the validated composite signature, and any additional instructions required to fulfill compliance and operational requirements. Simultaneously, the system generates a second notification to the second participant, instructing them to complete a second multi-party action. This notification ensures that the second participant group, which contributed to the multi-party validation process, now executes their portion of the transaction. The system synchronizes these notifications to ensure that both participant groups act in coordination, preventing inconsistencies or unauthorized modifications to the transaction. As each participant completes their respective multi-party action—such as finalizing a stablecoin redemption, executing an asset transfer, or settling an interbank payment—the system monitors execution progress and records transaction finalization. If both participants successfully complete their actions, the system updates transaction status logs, provides confirmations to relevant stakeholders, and optionally records the final transaction state on a blockchain ledger or compliance registry for transparency and auditability.

In some embodiments, the system may execute first cross-network action by receiving a first instruction comprising a transaction request from a first account, freezing a source account, receive a second instruction comprising a receive request from a second account, matching the first instruction to the second instruction, and completing the transaction request using the source account. To execute the first cross-network action, the system follows a structured process to ensure secure and synchronized transaction execution between multiple accounts. The process begins with the system receiving a first instruction, which includes a transaction request from a first account. This instruction contains key transaction details such as the asset type, transaction amount, destination details, and authentication credentials. The system verifies the validity of the transaction request by checking the first account's authorization, balance availability, and compliance status. Once the transaction request is validated, the system freezes the source account to ensure that the requested assets or funds are securely held and cannot be altered or spent elsewhere before the transaction is finalized. This freezing mechanism prevents double-spending and ensures that the transaction process maintains integrity. The system may also create a temporary transaction lock on the blockchain or within the financial network to reserve the necessary assets while waiting for the corresponding action from the receiving party. Next, the system receives a second instruction, which consists of a receive request from a second account. This receive request serves as confirmation that the second account is prepared to accept the transaction, whether it be in the form of digital assets, stablecoins, fiat currency, or tokenized securities. The system verifies that the second account meets the required conditions, such as compliance checks, account status validation, and security authentication. The system then matches the first instruction to the second instruction by ensuring that both transaction parameters align, including asset type, transaction amount, sender-receiver pair, and network compatibility. If the system detects inconsistencies—such as mismatched transaction details, an unauthorized recipient, or a compliance issue—it may trigger additional validation steps, request manual review, or reject the transaction. Once the system confirms a successful match, it completes the transaction request using the source account by finalizing the asset transfer from the frozen source account to the receiving account. This step involves executing the transaction on the appropriate financial network or blockchain, updating account balances, and recording the transaction details in an immutable ledger for auditability. The system then notifies both the sender and receiver of the completed transaction, unlocking any temporary freezes or transaction locks on the source account.

In some embodiments, the system may receive a first cross-network action request to perform the first cross-network action, wherein the first cross-network action comprises performing a blockchain action using a first resource, in response to receiving the first cross-network action request, determine a condition for performing the blockchain action, receive a tokenized availability of the first resource from a blockchain network, determine whether to perform the blockchain action based on the tokenized availability, and execute the blockchain action. For example, to process a first cross-network action request, the system begins by receiving a request to perform a blockchain action that involves utilizing a first resource within a blockchain network. This request may come from a financial institution, a decentralized application, or an automated smart contract and includes essential details such as the requested blockchain operation, the identity of the requesting entity, and transaction parameters. The first resource may represent tokenized assets, liquidity reserves, computational resources, or off-chain assets linked to the blockchain network.

Upon receiving the request, the system determines a condition for performing the blockchain action. This condition may include compliance with predefined policies, the availability of required funds or assets, network consensus requirements, or regulatory restrictions. For example, a stablecoin redemption transaction may require sufficient liquidity reserves, whereas a cross-chain token transfer may require interoperability validation between networks. The system checks smart contract rules, external regulatory conditions, or predefined governance policies to establish whether the requested blockchain action can proceed. Next, the system receives a tokenized availability of the first resource from the blockchain network. This involves querying a distributed ledger, blockchain oracle, or smart contract to verify the on-chain representation of the resource. The tokenized availability may reflect real-time asset balances, staking positions, liquidity reserves, or any other blockchain-based proof that confirms whether the requested resource is available. This step ensures that the system can validate the state of the blockchain before proceeding with the action. The system then determines whether to perform the blockchain action based on the tokenized availability. This involves comparing the available on-chain resource with the amount or condition specified in the cross-network action request. If the available resource meets or exceeds the required amount and satisfies all security, compliance, and governance conditions, the system approves the blockchain action. If the tokenized availability does not meet the requirement—such as insufficient liquidity, invalid asset ownership, or an expired smart contract condition—the system may reject the request, prompt additional verification, or delay execution until conditions are met.

Once all validation checks are successfully completed, the system executes the blockchain action. This execution may involve transferring tokenized assets, executing a smart contract function, settling a cross-chain transaction, or performing a staking or governance-related action. The system signs the transaction using a secure cryptographic mechanism, submits it to the blockchain network for finalization, and records the completed transaction in an immutable ledger. Finally, the system notifies the requesting entity of the execution status, updating transaction logs, and ensuring transparency across all involved networks. If any issues arise during execution—such as network congestion, failed smart contract execution, or consensus rejection—the system may initiate a rollback mechanism, retry the transaction, or escalate the issue for manual review. By structuring the process in this way, the system ensures secure, efficient, and transparent execution of blockchain actions while maintaining compliance and operational integrity in cross-network transactions.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood in reference to the following enumerated embodiments:

1. A method for executing multi-party validations for complex communications across multiple computer networks using bifurcated digital signing processes and/or executing bifurcated digital signing processes for complex communications across multiple computer networks using separate request addressing.

2. The method of the preceding embodiment, the method comprising: receiving a first request, at a bifurcated digital signing process, to perform a first multi-party validation action, wherein the first request has a first processing characteristic; in response to receiving the first request, processing the first request with a first signing routine of the bifurcated digital signing process; determining, based on the first signing routine, whether the first processing characteristic corresponds to a predetermined processing characteristic; and in response to determining that the first processing characteristic corresponds to the predetermined processing characteristic, processing the first request with a second signing routine of the bifurcated digital signing process to perform the first multi-party validation action.

3. The method of any one of the preceding embodiments, wherein processing the first request with the first signing routine of the bifurcated digital signing process further comprises: determining a first participant group corresponding to the first signing routine; and verifying a first sub-participant and a first participant corresponding to the first participant group.

4. The method of any one of the preceding embodiments, wherein determining whether the first processing characteristic corresponds to the predetermined processing characteristic comprises: determining, based on the first processing characteristic, a security certificate for the first request; determining, based on the predetermined processing characteristic, a security certificate requirement for the bifurcated digital signing process; and determining whether the security certificate corresponds to the security certificate requirement.

5. The method of any one of the preceding embodiments, wherein determining whether the first processing characteristic corresponds to the predetermined processing characteristic comprises: determining, based on the first processing characteristic, a request origination for the first request; determining, based on the predetermined processing characteristic, a request origination requirement for the bifurcated digital signing process; and determining whether the request origination corresponds to the request origination requirement.

6. The method of any one of the preceding embodiments, wherein determining whether the first processing characteristic corresponds to the predetermined processing characteristic comprises: determining, based on the first processing characteristic, a request validator for the first request; determining, based on the predetermined processing characteristic, a request validator requirement for the bifurcated digital signing process; and determining whether the request validator corresponds to the request validator requirement.

7. The method of any one of the preceding embodiments, wherein determining whether the first processing characteristic corresponds to the predetermined processing characteristic comprises: determining, based on the first processing characteristic, a request validation procedure for the first request; determining, based on the predetermined processing characteristic, a request validation procedure requirement for the bifurcated digital signing process; and determining whether the request validation procedure corresponds to the request validation procedure requirement.

8. The method of any one of the preceding embodiments, wherein determining whether the first processing characteristic corresponds to the predetermined processing characteristic comprises: determining, based on the first processing characteristic, a request testing protocol procedure for the first request; determining, based on the predetermined processing characteristic, a request testing protocol requirement for the bifurcated digital signing process; and determining whether the request testing protocol corresponds to the request testing protocol requirement.

9. The method of any one of the preceding embodiments, wherein determining whether the first processing characteristic corresponds to the predetermined processing characteristic comprises: determining, based on the first processing characteristic, a notification requirement for the first request, wherein the notification requirement notifies an entity of the first request; receiving a confirmation that the notification requirement has been satisfied; and determining that the response satisfies the predetermined processing characteristic.

10. The method of any one of the preceding embodiments, wherein determining whether the first processing characteristic corresponds to the predetermined processing characteristic comprises: determining, based on the first processing characteristic, a supported protocol for the first request; determining, based on the predetermined processing characteristic, a protocol requirement for the bifurcated digital signing process; and determining whether the supported protocol corresponds to the protocol requirement.

11. The method of any one of the preceding embodiments, wherein determining whether the first processing characteristic corresponds to the predetermined processing characteristic comprises: determining, based on the first processing characteristic, a digital asset type for the first request; determining, based on the predetermined processing characteristic, a digital asset type requirement for the bifurcated digital signing process; and determining whether the digital asset type corresponds to the digital asset type requirement.

12. The method of any one of the preceding embodiments, wherein determining whether the first processing characteristic corresponds to the predetermined processing characteristic comprises: determining, based on the first processing characteristic, a Know-Your-Customer metric for a first sub-participant of a first participant group; determining, based on the predetermined processing characteristic, a Know-Your-Customer requirement for the first participant group; and determining whether the Know-Your-Customer metric corresponds to the Know-Your-Customer requirement.

13. The method of any one of the preceding embodiments, wherein determining whether the first processing characteristic corresponds to the predetermined processing characteristic comprises: determining, based on the first processing characteristic, a first key for a first sub-participant in a first participant group in the multi-party validation action; determining, based on the predetermined processing characteristic, a first key requirement for the first participant group; and determining whether the first key corresponds to the first key requirement.

14. The method of any one of the preceding embodiments, wherein determining whether the first processing characteristic corresponds to the predetermined processing characteristic comprises: determining, based on the first processing characteristic, a first identity for a first sub-participant in a first participant group in the multi-party validation action; determining, based on the predetermined processing characteristic, a labeled identity for the first sub-participant known by a first participant in the first participant group; and determining whether the first identity corresponds to the labeled identity.

15. The method of any one of the preceding embodiments, wherein processing the first request with the second signing routine of the bifurcated digital signing process to perform the first multi-party validation action comprises: determining a Multi-Party Computation (MPC) signature component for the first multi-party validation action corresponding to the first request; and submitting the Multi-Party Computation (MPC) signature component to complete the first multi-party validation action.

16. The method of any one of the preceding embodiments, wherein the bifurcated digital signing process is generated based on: receiving a first uncompiled version of the first signing routine; receiving a second uncompiled version of the second signing routine; and compiling the first uncompiled version of the first signing routine and the second uncompiled version of the second signing routine to generate the bifurcated digital signing process.

17. The method of any one of the preceding embodiments, further comprising: receiving a first Multi-Party Computation (MPC) signature component, wherein the first MPC signature component comprises a first signature address corresponding to a composite MPC signature and a first group address corresponding to a first participant group, and wherein the first MPC signature component is based on a first multi-party validation action between a first participant and a first sub-participant in the first participant group; receiving a second MPC signature component, wherein the second MPC signature component comprises a second signature address corresponding to the composite MPC signature and a second group address corresponding to a second participant group, and wherein the second MPC signature component is based on a second multi-party validation action between a second participant and a second sub-participant in the second participant group; determining that the first MPC signature component corresponds to the first participant group and that the second MPC signature component corresponds to the second participant group; in response to determining that the first MPC signature component corresponds to the first participant group and that the second MPC signature component corresponds to the second participant group, using the first MPC signature component and the second MPC signature component to generate the composite MPC signature; and completing a bifurcated digital signing process for a first cross-network action based on the composite MPC signature.

18. The method of any one of the preceding embodiments, further comprising: receiving a first cross-network action request to perform the first cross-network action; in response to receiving the first cross-network action request, determining a first network corresponding to the first cross-network action; determining the first participant group corresponding to the first network; and generating a first request for a first MPC signature component.

19. The method of any one of the preceding embodiments, wherein receiving the first MPC signature component is further comprises: determining a first network required by the first cross-network action; determining the first participant group corresponding to the first cross-network action; and determining the first group address based on the first participant group.

20. The method of any one of the preceding embodiments, wherein completing the bifurcated digital signing process for the first cross-network action based on the composite MPC signature further comprises: generating a first notification to the first participant to complete a first multi-party action; and generating a second notification to the second participant to complete a second multi-party action.

21. The method of any one of the preceding embodiments, wherein the first multi-party validation action comprises: receiving a first request, at a bifurcated digital signing process, to perform the first multi-party validation action, wherein the first request has a first processing characteristic; in response to receiving the first request, processing the first request with a first signing routine of the bifurcated digital signing process; determining, based on the first signing routine, whether the first processing characteristic corresponds to a predetermined processing characteristic; and in response to determining that the first processing characteristic corresponds to the predetermined processing characteristic, processing the first request with a second signing routine of the bifurcated digital signing process to perform the first multi-party validation action.

22. The method of any one of the preceding embodiments, wherein receiving the first MPC signature component further comprises: receiving a first request; processing the first request with a first self-executing program of a bifurcated self-executing program; determining whether a first processing characteristic of the first request corresponds to a predetermined processing characteristic; and processing the first request with a second self-executing program of the bifurcated self-executing program.

23. The method of any one of the preceding embodiments, wherein executing first cross-network action further comprises: receiving a first instruction comprising a transaction request from a first account; freezing a source account; receive a second instruction comprising a receive request from a second account; matching the first instruction to the second instruction; and completing the transaction request using the source account.

24. The method of any one of the preceding embodiments, further comprising: receiving a first cross-network action request to perform the first cross-network action, wherein the first cross-network action comprises performing a blockchain action using a first resource; in response to receiving the first cross-network action request, determining a condition for performing the blockchain action; receiving a tokenized availability of the first resource from a blockchain network; determining whether to perform the blockchain action based on the tokenized availability; and executing the blockchain action.

25. The method of any one of the preceding embodiments, wherein the first multi-party validation action comprises: receiving a self-validating digital record; receiving off-chain data; validating the self-validating digital record based on the off-chain data; and providing the self-validating digital record to a cross-network registry.

26. The method of any one of the preceding embodiments, wherein the first multi-party validation action comprises: determining a security certificate for the first sub-participant of the first participant group; determining a security certificate requirement for a bifurcated digital signing process for the first participant group; and determining whether the security certificate corresponds to the security certificate requirement.

27. The method of any one of the preceding embodiments, wherein the first multi-party validation action comprises: determining a request origination for a first sub-participant of the first participant group; determining a request origination requirement for the bifurcated digital signing process for the first participant group; and determining whether the request origination corresponds to the request origination requirement.

28. The method of any one of the preceding embodiments, wherein the first multi-party validation action comprises: determining a notification requirement for the first multi-party validation action, wherein the notification requirement notifies a first sub-participant of the first participant group; and receiving a confirmation that the notification requirement has been satisfied.

29. The method of any one of the preceding embodiments, the method of claim 2, wherein the first multi-party validation action comprises: determining a digital asset type for the first multi-party validation action; determining a digital asset type requirement for the first multi-party validation action; and determining whether the digital asset type corresponds to the digital asset type requirement.

30. The method of any one of the preceding embodiments, wherein the first multi-party validation action comprises: determining a Know-Your-Customer metric for the first sub-participant of the first participant group; determining a Know-Your-Customer requirement for the first participant group; and determining whether the Know-Your-Customer metric corresponds to the Know-Your-Customer requirement.

31. The method of any one of the preceding embodiments, wherein the first multi-party validation action comprises: determining a first key for the first sub-participant in the first participant group; determining a first key requirement for the first participant group; and determining whether the first key corresponds to the first key requirement.

32. The method of any one of the preceding embodiments, wherein the first multi-party validation action comprises: determining a first identity for a first sub-participant in the first participant group; determining a labeled identity for the first sub-participant known by a first participant in the first participant group; and determining whether the first identity corresponds to the labeled identity.

33. The method of any one of the preceding embodiments, wherein the first multi-party validation action comprises: determining the first MPC signature component; and submitting the first MPC signature component.

34. A non-transitory, computer-readable medium storing instructions that, when executed by a data processing apparatus, cause the data processing apparatus to perform operations comprising those of any of embodiments 1-33.

35 A system comprising one or more processors; and memory storing instructions that, when executed by the processors, cause the processors to effectuate operations comprising those of any of embodiments 1-33.

36. A system comprising means for performing any of embodiments 1-33.

What is claimed is:

1. A method for executing bifurcated digital signing processes for complex communications across multiple computer networks using separate request addressing, the method comprising:

receiving a first cross-network action request to perform a first cross-network action, wherein the first cross-network action comprises performing a blockchain action using a first resource, and wherein the blockchain action comprises determining whether a tokenized availability at the first resource corresponds to a condition;

in response to receiving the first cross-network action request, receiving a first Multi-Party Computation (MPC) signature component, wherein the first MPC signature component comprises a first signature address corresponding to a composite MPC signature and a first group address corresponding to a first participant group, and wherein the first MPC signature component is based on a first multi-party validation action between a first participant and a first sub-participant in the first participant group;

receiving a second MPC signature component, wherein the second MPC signature component comprises a second signature address corresponding to the composite MPC signature and a second group address corresponding to a second participant group, and wherein the second MPC signature component is based on a second multi-party validation action between a second participant and a second sub-participant in the second participant group;

determining that the first MPC signature component corresponds to the first participant group and that the second MPC signature component corresponds to the second participant group;

in response to determining that the first MPC signature component corresponds to the first participant group and that the second MPC signature component corresponds to the second participant group, using the first MPC signature component and the second MPC signature component to generate the composite MPC signature;

completing a bifurcated digital signing process for the first cross-network action based on the composite MPC signature; and performing the blockchain action.

2. The method of claim 1, further comprising:

receiving the first cross-network action request to perform the first cross-network action;

in response to receiving the first cross-network action request, determining a first network corresponding to the first cross-network action;

determining the first participant group corresponding to the first network; and generating a first request for a first MPC signature component.

3. The method of claim 1, wherein receiving the first MPC signature component further comprises:

determining a first network required by the first cross-network action;

determining the first participant group corresponding to the first cross-network action; and determining the first group address based on the first participant group.

4. The method of claim 1, wherein completing the bifurcated digital signing process for the first cross-network action based on the composite MPC signature further comprises:

generating a first notification to the first participant to complete a first multi-party action; and generating a second notification to the second participant to complete a second multi-party action.

5. The method of claim 1, wherein receiving the first MPC signature component further comprises:

receiving a first request;

processing the first request with a first self-executing program of a bifurcated self-executing program;

determining whether a first processing characteristic of the first request corresponds to a predetermined processing characteristic; and processing the first request with a second self-executing program of the bifurcated self-executing program.

6. The method of claim 1, wherein executing the first cross-network action further comprises:

receiving a first instruction comprising a transaction request from a first account;

freezing a source account;

receive a second instruction comprising a receive request from a second account;

matching the first instruction to the second instruction; and completing the transaction request using the source account.

7. The method of claim 1, wherein the first multi-party validation action comprises:
receiving a self-validating digital record;
receiving off-chain data;
validating the self-validating digital record based on the off-chain data; and
providing the self-validating digital record to a cross-network registry.

8. The method of claim 1, wherein the first multi-party validation action comprises:
determining a security certificate for the first sub-participant of the first participant group;
determining a security certificate requirement for the bifurcated digital signing process for the first participant group; and
determining whether the security certificate corresponds to the security certificate requirement.

9. The method of claim 1, wherein the first multi-party validation action comprises:
determining a request origination for the first sub-participant of the first participant group;
determining a request origination requirement for the bifurcated digital signing process for the first participant group; and
determining whether the request origination corresponds to the request origination requirement.

10. The method of claim 1, wherein the first multi-party validation action comprises:
determining a notification requirement for the first multi-party validation action, wherein the notification requirement notifies the first sub-participant of the first participant group; and
receiving a confirmation that the notification requirement has been satisfied.

11. The method of claim 1, wherein the first multi-party validation action comprises:
determining a digital asset type for the first multi-party validation action;
determining a digital asset type requirement for the first multi-party validation action; and
determining whether the digital asset type corresponds to the digital asset type requirement.

12. The method of claim 1, wherein the first multi-party validation action comprises:
determining a Know-Your-Customer metric for the first sub-participant of the first participant group;
determining a Know-Your-Customer requirement for the first participant group; and
determining whether the Know-Your-Customer metric corresponds to the Know-Your-Customer requirement.

13. The method of claim 1, wherein the first multi-party validation action comprises:
determining a first key for the first sub-participant in the first participant group;
determining a first key requirement for the first participant group; and
determining whether the first key corresponds to the first key requirement.

14. The method of claim 1, wherein the first multi-party validation action comprises:
determining a first identify for the first sub-participant in the first participant group;
determining a labeled identity for the first sub-participant known by the first participant in the first participant group; and determining whether the first identify corresponds to the labeled identity.

15. The method of claim 1, wherein the first multi-party validation action comprises:
determining the first MPC signature component; and
submitting the first MPC signature component.

16. The method of claim 1, wherein the first multi-party validation action comprises:
receiving a first request, at the bifurcated digital signing process, to perform the first multi-party validation action, wherein the first request has a first processing characteristic;
in response to receiving the first request, processing the first request with a first signing routine of the bifurcated digital signing process;
determining, based on the first signing routine, whether the first processing characteristic corresponds to a predetermined processing characteristic; and
in response to determining that the first processing characteristic corresponds to the predetermined processing characteristic, processing the first request with a second signing routine of the bifurcated digital signing process to perform the first multi-party validation action.

17. The method of claim 16, wherein the bifurcated digital signing process is generated based on:
receiving a first uncompiled version of the first signing routine;
receiving a second uncompiled version of the second signing routine; and
compiling the first uncompiled version of the first signing routine and the second uncompiled version of the second signing routine to generate the bifurcated digital signing process.

18. A system for executing bifurcated digital signing processes for complex communications across multiple computer networks using separate request addressing, the system comprising:
a first node of a cryptographically secure network corresponding to a first user;
a second node of the cryptographically secure network corresponding to a first bifurcated digital signing platform; and
a non-transitory computer-readable medium having instructions recorded thereon that when executed by one or more processors causes operations comprising:
receiving a first cross-network action request, at the second node, from the first node, wherein the first cross-network action comprises performing a blockchain action using a first resource, and wherein the blockchain action comprises determining whether a tokenized availability at the first resource corresponds to a condition;
in response to receiving the first cross-network action request, determining a first network and a second network corresponding to the first cross-network action;
determining a first participant group corresponding to the first network and a second participant group corresponding to the second network;
generating a first request for a first Multi-Party Computation (MPC) signature component from the first participant group and a second request for a second MPC signature component from the second participant group;
receiving the first MPC signature component, wherein the first MPC signature component comprises a first signature address corresponding to a composite MPC signature and a first group address corresponding to the first participant group, and wherein the first MPC signature component is based on a first multi-party validation action between a first participant and a first sub-participant in the first participant group;

receiving the second MPC signature component, wherein the second MPC signature component comprises a second signature address corresponding to the composite MPC signature and a second group address corresponding to the second participant group, and wherein the second MPC signature component is based on a second multi-party validation action between a second participant and a second sub-participant in the second participant group;

determining that the first MPC signature component corresponds to the first participant group and that the second MPC signature component corresponds to the second participant group;

in response to determining that the first MPC signature component corresponds to the first participant group and that the second MPC signature component corresponds to the second participant group, using the first MPC signature component and the second MPC signature component to complete a bifurcated digital signing process for the first cross-network action; and performing the blockchain action.

19. One or more non-transitory, computer-readable media, comprising instructions that, when executed by one or more processors, cause operations comprising:

receiving a first cross-network action request to perform a first cross-network action, wherein the first cross-network action comprises performing a blockchain action using a first resource, and wherein the blockchain action comprises determining whether a tokenized availability at the first resource corresponds to a condition;

in response to receiving the first cross-network action request, receiving a first Multi-Party Computation (MPC) signature component, wherein the first MPC signature component comprises a first signature address corresponding to a composite MPC signature and a first group address corresponding to a first participant group, and wherein the first MPC signature component is based on a first multi-party validation action between a first participant and a first sub-participant in the first participant group;

receiving a second MPC signature component, wherein the second MPC signature component comprises a second signature address corresponding to the composite MPC signature and a second group address corresponding to a second participant group, and wherein the second MPC signature component is based on a second multi-party validation action between a second participant and a second sub-participant in the second participant group;

determining that the first MPC signature component corresponds to the first participant group and that the second MPC signature component corresponds to the second participant group;

in response to determining that the first MPC signature component corresponds to the first participant group and that the second MPC signature component corresponds to the second participant group, using the first MPC signature component and the second MPC signature component to complete a bifurcated digital signing process for the first cross-network action; and performing the blockchain action.

* * * * *